(12) United States Patent
Pawlicki et al.

(10) Patent No.: US 9,834,216 B2
(45) Date of Patent: Dec. 5, 2017

(54) VEHICULAR CONTROL SYSTEM USING CAMERAS AND RADAR SENSOR

(71) Applicant: Magna Electronics Inc., Auburn Hills, MI (US)

(72) Inventors: John A. Pawlicki, Warren, MI (US); Martha A. McMahon, Ann Arbor, MI (US); Steven G. Chinn, Rochester Hills, MI (US); Joel S. Gibson, Linden, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/413,462

(22) Filed: Jan. 24, 2017

(65) Prior Publication Data

US 2017/0129489 A1     May 11, 2017

Related U.S. Application Data

(60) Continuation of application No. 15/155,350, filed on May 16, 2016, now Pat. No. 9,555,803, which is a
(Continued)

(51) Int. Cl.
*B60Q 1/00* (2006.01)
*B60W 30/18* (2012.01)
(Continued)

(52) U.S. Cl.
CPC ............. *B60W 30/18* (2013.01); *B60R 11/04* (2013.01); *B60W 30/09* (2013.01);
(Continued)

(58) Field of Classification Search
CPC ..... G06K 9/00825; G08G 1/16; B60W 30/09; B60R 11/04
(Continued)

(56) References Cited

U.S. PATENT DOCUMENTS

| 1,472,509 A | 10/1923 | Bitter |
| 2,074,251 A | 3/1937 | Braun |

(Continued)

FOREIGN PATENT DOCUMENTS

| AT | 519193 | 8/2011 |
| BE | 1008142 | 1/1996 |

(Continued)

OTHER PUBLICATIONS

"All-seeing screens for tomorrow's cars", Southend Evening Echo, Oct. 4, 1991.

(Continued)

*Primary Examiner* — Toan N Pham
(74) *Attorney, Agent, or Firm* — Gardner, Linn, Burkhart & Flory, LLP

(57) ABSTRACT

A vehicular control system includes a plurality of cameras that capture image data, at least one radar sensor that senses radar data and a control that processes image data captured by the cameras and sensed radar data. The control, responsive to processing of captured image data, detects lane markers and/or road edges and determines curvature of the road being traveled by the equipped vehicle. The control processes captured image data and sensed radar data to detect vehicles. The control, based on processing of captured image data and/or sensed radar data, detects another vehicle and determines distance from the equipped vehicle to the detected other vehicle. The control may, based at least in part on the detection of another vehicle and the determination of distance from the equipped vehicle to the detected other vehicle, determine whether it is safe for the equipped vehicle to execute a lane change maneuver.

54 Claims, 14 Drawing Sheets

Related U.S. Application Data continuation of application No. 14/922,640, filed on Oct. 26, 2015, now Pat. No. 9,643,605, which is a continuation of application No. 14/195,137, filed on Mar. 3, 2014, now Pat. No. 9,171,217, which is a continuation of application No. 13/651,659, filed on Oct. 15, 2012, now Pat. No. 8,665,079, which is a continuation of application No. 12/559,856, filed on Sep. 15, 2009, now Pat. No. 8,289,142, which is a division of application No. 12/329,029, filed on Dec. 5, 2008, now Pat. No. 7,679,498, which is a division of application No. 11/408,776, filed on Apr. 21, 2006, now Pat. No. 7,463,138, which is a division of application No. 10/427,051, filed on Apr. 30, 2003, now Pat. No. 7,038,577.

(60) Provisional application No. 60/433,700, filed on Dec. 16, 2002, provisional application No. 60/377,524, filed on May 3, 2002.

(51) Int. Cl.
| | |
|---|---|
| *B60W 50/14* | (2012.01) |
| *B60R 11/04* | (2006.01) |
| *B60W 30/09* | (2012.01) |
| *B60W 30/14* | (2006.01) |
| *G06T 7/13* | (2017.01) |
| *G06T 7/174* | (2017.01) |
| *G06K 9/00* | (2006.01) |
| *G01S 13/86* | (2006.01) |
| *G01S 13/93* | (2006.01) |
| *B60R 11/00* | (2006.01) |
| *B60W 10/04* | (2006.01) |
| *B60W 10/20* | (2006.01) |
| *G08G 1/16* | (2006.01) |

(52) U.S. Cl.
CPC .......... *B60W 30/143* (2013.01); *B60W 50/14* (2013.01); *G01S 13/867* (2013.01); *G01S 13/931* (2013.01); *G06K 9/00798* (2013.01); *G06K 9/00805* (2013.01); *G06K 9/00818* (2013.01); *G06K 9/00825* (2013.01); *G06T 7/13* (2017.01); *G06T 7/174* (2017.01); *B60R 2011/004* (2013.01); *B60W 10/04* (2013.01); *B60W 10/20* (2013.01); *B60W 2050/143* (2013.01); *B60W 2420/42* (2013.01); *B60W 2420/52* (2013.01); *B60W 2550/30* (2013.01); *B60W 2550/406* (2013.01); *B60W 2710/20* (2013.01); *B60W 2720/10* (2013.01); *G06K 2209/27* (2013.01); *G06T 2207/30256* (2013.01); *G06T 2207/30261* (2013.01); *G08G 1/167* (2013.01)

(58) Field of Classification Search
USPC .... 340/435, 425.5, 901, 461, 438, 937, 933, 340/935, 938, 436; 359/601, 604, 603, 359/265; 348/148, 151
See application file for complete search history.

(56) References Cited

U.S. PATENT DOCUMENTS

| | | |
|---|---|---|
| 2,148,119 A | 2/1939 | Grist |
| 2,240,843 A | 5/1941 | Gillespie |
| 2,317,400 A | 4/1943 | Paulus et al. |
| 2,331,144 A | 10/1943 | Sitter |
| 2,339,291 A | 1/1944 | Paulus et al. |
| 2,424,288 A | 7/1947 | Severy |
| 2,598,420 A | 5/1952 | Onksen, Jr. et al. |
| 2,632,040 A | 3/1953 | Rabinow |
| 2,827,594 A | 3/1953 | Rabinow |
| 2,750,583 A | 6/1956 | McCullough |
| 2,762,932 A | 9/1956 | Falge |
| 2,907,920 A | 10/1956 | McIlvane |
| 2,855,523 A | 10/1958 | Berger |
| 2,856,146 A | 10/1958 | Lehder |
| 2,863,064 A | 12/1958 | Rabinow |
| 2,892,094 A | 6/1959 | Lehovec |
| 2,912,593 A | 11/1959 | Deuth |
| 2,934,676 A | 4/1960 | Miller |
| 2,959,709 A | 11/1960 | Vanaman et al. |
| 3,008,532 A | 11/1961 | Reed |
| 3,011,580 A | 12/1961 | Reid |
| 3,069,654 A | 12/1962 | Hough |
| 3,085,646 A | 4/1963 | Paufve |
| 3,158,835 A | 11/1964 | Hipkins |
| 3,172,496 A | 3/1965 | Rabinow et al. |
| 3,179,845 A | 4/1965 | Kulwiec |
| 3,201,750 A | 8/1965 | Morin |
| 3,208,070 A | 9/1965 | Boicey |
| 3,249,761 A | 5/1966 | Baumanns |
| 3,271,577 A | 9/1966 | Miller et al. |
| 3,325,680 A | 6/1967 | Amacher |
| 3,367,616 A | 2/1968 | Bausch et al. |
| 3,411,843 A | 11/1968 | Moller |
| 3,486,066 A | 12/1969 | Jones et al. |
| 3,515,472 A | 6/1970 | Schwitzgebel |
| 3,572,428 A | 3/1971 | Monaco |
| 3,623,671 A | 11/1971 | Hargroves |
| 3,673,560 A | 6/1972 | Barsh et al. |
| 3,680,951 A | 8/1972 | Jordan et al. |
| 3,689,695 A | 9/1972 | Rosenfield et al. |
| 3,708,668 A | 1/1973 | Tilley |
| 3,751,711 A | 8/1973 | Schick |
| 3,845,572 A | 11/1974 | McCanney |
| 3,876,940 A | 4/1975 | Wickord et al. |
| 3,971,065 A | 7/1976 | Bayer |
| 3,985,424 A | 10/1976 | Steinacher |
| 3,986,022 A | 10/1976 | Hyatt |
| 4,003,445 A | 1/1977 | De Bruine |
| 4,037,134 A | 7/1977 | Loper |
| 4,044,853 A | 8/1977 | Melke |
| 4,049,961 A | 9/1977 | Marcy |
| 4,058,796 A | 11/1977 | Oishi et al. |
| 4,093,364 A | 6/1978 | Miller |
| 4,127,778 A | 11/1978 | Leitz |
| 4,139,801 A | 2/1979 | Linares |
| 4,143,264 A | 3/1979 | Gilbert et al. |
| 4,176,728 A | 12/1979 | Otteblad et al. |
| 4,200,361 A | 4/1980 | Malvano et al. |
| 4,209,853 A | 6/1980 | Hyatt |
| 4,214,266 A | 7/1980 | Myers |
| 4,218,698 A | 8/1980 | Bart et al. |
| 4,236,099 A | 11/1980 | Rosenblum |
| 4,238,778 A | 12/1980 | Ohsumi |
| 4,243,196 A | 1/1981 | Toda et al. |
| 4,247,870 A | 1/1981 | Gabel et al. |
| 4,249,160 A | 2/1981 | Chilvers |
| 4,254,931 A | 3/1981 | Aikens |
| 4,257,703 A | 3/1981 | Goodrich |
| 4,266,856 A | 5/1981 | Wainwright |
| 4,277,804 A | 7/1981 | Robison |
| 4,278,142 A | 7/1981 | Kono |
| 4,281,898 A | 8/1981 | Ochiai |
| 4,288,814 A | 9/1981 | Talley et al. |
| RE30,835 E | 12/1981 | Giglia |
| 4,348,652 A | 9/1982 | Barnes et al. |
| 4,348,653 A | 9/1982 | Tsuzuki et al. |
| 4,355,271 A | 10/1982 | Noack |
| 4,357,558 A | 11/1982 | Massoni et al. |
| 4,357,594 A | 11/1982 | Ehrlich et al. |
| 4,381,888 A | 5/1983 | Momiyama |
| 4,389,537 A | 6/1983 | Tsunoda et al. |
| 4,389,639 A | 6/1983 | Torii et al. |
| 4,390,742 A | 6/1983 | Wideman |
| 4,390,895 A | 6/1983 | Sato et al. |
| 4,401,181 A | 8/1983 | Schwarz |
| 4,403,208 A | 9/1983 | Hodgson et al. |

(56) References Cited

U.S. PATENT DOCUMENTS

| | | |
|---|---|---|
| 4,420,238 A | 12/1983 | Felix |
| 4,431,896 A | 2/1984 | Lodetti |
| 4,441,125 A | 4/1984 | Parkinson |
| 4,443,057 A | 4/1984 | Bauer et al. |
| 4,460,831 A | 7/1984 | Oettinger et al. |
| 4,464,789 A | 8/1984 | Sternberg |
| 4,471,228 A | 9/1984 | Nishizawa et al. |
| 4,481,450 A | 11/1984 | Watanabe et al. |
| 4,483,011 A | 11/1984 | Brown |
| 4,485,402 A | 11/1984 | Searby |
| 4,491,390 A | 1/1985 | Tong-Shen |
| 4,495,589 A | 1/1985 | Hirzel |
| 4,512,637 A | 4/1985 | Ballmer |
| 4,521,804 A | 6/1985 | Bendell |
| 4,529,275 A | 7/1985 | Ballmer |
| 4,529,873 A | 7/1985 | Ballmer et al. |
| 4,532,550 A | 7/1985 | Bendell et al. |
| 4,538,181 A | 8/1985 | Taylor |
| 4,546,551 A | 10/1985 | Franks |
| 4,549,208 A | 10/1985 | Kamejima et al. |
| 4,564,833 A | 1/1986 | Seko et al. |
| 4,566,032 A | 1/1986 | Hirooka et al. |
| 4,571,082 A | 2/1986 | Downs |
| 4,572,619 A | 2/1986 | Reininger et al. |
| 4,580,875 A | 4/1986 | Bechtel et al. |
| 4,587,522 A | 5/1986 | Warren |
| 4,588,041 A | 5/1986 | Tsuchuhashi |
| 4,599,544 A | 7/1986 | Martin |
| 4,600,913 A | 7/1986 | Caine |
| 4,601,053 A | 7/1986 | Grumet |
| 4,603,946 A | 8/1986 | Kato et al. |
| 4,614,415 A | 9/1986 | Hyatt |
| 4,620,141 A | 10/1986 | McCumber |
| 4,623,222 A | 11/1986 | Ito et al. |
| 4,625,329 A | 11/1986 | Ishikawa et al. |
| 4,626,850 A | 12/1986 | Chey |
| 4,629,941 A | 12/1986 | Ellis et al. |
| 4,630,109 A | 12/1986 | Barton |
| 4,632,509 A | 12/1986 | Ohmi et al. |
| 4,638,287 A | 1/1987 | Umebayashi et al. |
| 4,645,320 A | 2/1987 | Muelling et al. |
| 4,645,975 A | 2/1987 | Meitzler et al. |
| 4,647,161 A | 3/1987 | Müller |
| 4,647,975 A | 3/1987 | Alston et al. |
| 4,653,316 A | 3/1987 | Fukuhara |
| 4,665,321 A | 5/1987 | Chang et al. |
| 4,669,825 A | 6/1987 | Itoh et al. |
| 4,671,614 A | 6/1987 | Catalano |
| 4,671,615 A | 6/1987 | Fukada et al. |
| 4,672,457 A | 6/1987 | Hyatt |
| 4,676,601 A | 6/1987 | Itoh et al. |
| 4,679,077 A | 7/1987 | Yuasa et al. |
| 4,681,431 A | 7/1987 | Sims et al. |
| 4,688,085 A | 8/1987 | Imaide |
| 4,690,508 A | 9/1987 | Jacob |
| 4,692,798 A | 9/1987 | Seko et al. |
| 4,693,788 A | 9/1987 | Berg et al. |
| 4,697,883 A | 10/1987 | Suzuki et al. |
| 4,699,484 A | 10/1987 | Howell et al. |
| 4,701,022 A | 10/1987 | Jacob |
| 4,701,613 A | 10/1987 | Watanbe et al. |
| 4,713,685 A | 12/1987 | Nishimura et al. |
| 4,717,830 A | 1/1988 | Botts |
| 4,727,290 A | 2/1988 | Smith et al. |
| 4,728,804 A | 3/1988 | Norsworthy |
| 4,731,669 A | 3/1988 | Hayashi et al. |
| 4,731,769 A | 3/1988 | Schaefer et al. |
| 4,741,603 A | 5/1988 | Miyagi et al. |
| 4,755,664 A | 7/1988 | Holmes et al. |
| 4,758,883 A | 7/1988 | Kawahara et al. |
| 4,768,135 A | 8/1988 | Kretschmer et al. |
| 4,772,942 A | 9/1988 | Tuck |
| 4,779,095 A | 10/1988 | Guerreri |
| 4,785,280 A | 11/1988 | Fubini et al. |
| 4,789,904 A | 12/1988 | Peterson |
| 4,793,690 A | 12/1988 | Gahan et al. |
| 4,799,267 A | 1/1989 | Kamejima et al. |
| 4,805,015 A | 2/1989 | Copeland |
| 4,816,828 A | 3/1989 | Feher |
| 4,817,948 A | 4/1989 | Simonelli |
| 4,820,933 A | 4/1989 | Hong |
| 4,825,232 A | 4/1989 | Howdle |
| 4,833,469 A | 5/1989 | David |
| 4,833,534 A | 5/1989 | Paff et al. |
| 4,838,650 A | 6/1989 | Stewart et al. |
| 4,839,749 A | 6/1989 | Franklin |
| 4,841,348 A | 6/1989 | Shizukuishi et al. |
| 4,843,463 A | 6/1989 | Michetti |
| 4,847,489 A | 7/1989 | Dietrich |
| 4,847,772 A | 7/1989 | Michalopoulos et al. |
| 4,849,731 A | 7/1989 | Melocik |
| 4,855,822 A | 8/1989 | Narendra et al. |
| 4,859,031 A | 8/1989 | Berman et al. |
| 4,862,037 A | 8/1989 | Farber et al. |
| 4,863,130 A | 9/1989 | Marks, Jr. |
| 4,867,561 A | 9/1989 | Makino et al. |
| 4,870,264 A | 9/1989 | Beha |
| 4,871,917 A | 10/1989 | O'Farrell et al. |
| 4,872,051 A | 10/1989 | Dye |
| 4,881,019 A | 11/1989 | Shiraishi et al. |
| 4,882,466 A | 11/1989 | Friel |
| 4,882,565 A | 11/1989 | Gallmeyer |
| 4,883,349 A | 11/1989 | Mittelhauser |
| 4,884,055 A | 11/1989 | Memmola |
| 4,886,960 A | 12/1989 | Molyneux et al. |
| 4,891,559 A | 1/1990 | Matsumoto et al. |
| 4,892,345 A | 1/1990 | Rachael |
| 4,895,790 A | 1/1990 | Swanson et al. |
| 4,896,030 A | 1/1990 | Miyaji |
| 4,899,296 A | 2/1990 | Khattak |
| 4,900,133 A | 2/1990 | Berman |
| 4,905,151 A | 2/1990 | Weiman et al. |
| 4,906,940 A | 3/1990 | Green et al. |
| 4,907,870 A | 3/1990 | Brucker |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,346 A | 5/1990 | Yokoyama |
| 4,930,742 A | 6/1990 | Schofield et al. |
| 4,931,937 A | 6/1990 | Kakinami et al. |
| 4,936,533 A | 6/1990 | Adams et al. |
| 4,937,796 A | 6/1990 | Tendler |
| 4,948,246 A | 8/1990 | Shigematsu |
| 4,949,186 A | 8/1990 | Peterson |
| 4,953,305 A | 9/1990 | Van Lente et al. |
| 4,954,962 A | 9/1990 | Evans et al. |
| 4,956,591 A | 9/1990 | Schierbeek et al. |
| 4,961,625 A | 10/1990 | Wood et al. |
| 4,963,788 A | 10/1990 | King et al. |
| 4,966,441 A | 10/1990 | Conner |
| 4,967,319 A | 10/1990 | Seko |
| 4,970,509 A | 11/1990 | Kissinger |
| 4,970,589 A | 11/1990 | Hanson |
| 4,970,653 A | 11/1990 | Kenue |
| 4,971,405 A | 11/1990 | Hwang |
| 4,971,430 A | 11/1990 | Lynas |
| 4,974,078 A | 11/1990 | Tsai |
| 4,975,703 A | 12/1990 | Delisle et al. |
| 4,985,847 A | 1/1991 | Shioya et al. |
| 4,987,357 A | 1/1991 | Masaki |
| 4,987,410 A | 1/1991 | Berman et al. |
| 4,991,054 A | 2/1991 | Walters |
| 5,001,558 A | 3/1991 | Burley et al. |
| 5,003,288 A | 3/1991 | Wilhelm |
| 5,003,339 A | 3/1991 | Kikuchi et al. |
| 5,008,739 A | 4/1991 | D'Luna et al. |
| 5,008,946 A | 4/1991 | Ando |
| 5,012,082 A | 4/1991 | Watanabe |
| 5,012,092 A | 4/1991 | Kobayashi |
| 5,012,335 A | 4/1991 | Cohodar |
| 5,016,977 A | 5/1991 | Baude et al. |
| 5,020,114 A | 5/1991 | Fujioka et al. |
| 5,027,001 A | 6/1991 | Torbert |
| 5,027,104 A | 6/1991 | Reid |

(56) References Cited

U.S. PATENT DOCUMENTS

| | | |
|---|---|---|
| 5,027,200 A | 6/1991 | Petrossian et al. |
| 5,031,101 A | 7/1991 | Kamimura et al. |
| 5,036,437 A | 7/1991 | Macks |
| 5,044,706 A | 9/1991 | Chen |
| 5,044,956 A | 9/1991 | Behensky et al. |
| 5,050,966 A | 9/1991 | Berman |
| 5,051,906 A | 9/1991 | Evans, Jr. et al. |
| 5,055,668 A | 10/1991 | French |
| 5,059,877 A | 10/1991 | Teder |
| 5,059,947 A | 10/1991 | Chen |
| 5,063,603 A | 11/1991 | Burt |
| 5,064,274 A | 11/1991 | Alten |
| 5,072,154 A | 12/1991 | Chen |
| 5,075,768 A | 12/1991 | Wirtz et al. |
| 5,080,207 A | 1/1992 | Horneffer |
| 5,080,309 A | 1/1992 | Ivins |
| 5,081,585 A | 1/1992 | Kurami et al. |
| 5,086,253 A | 2/1992 | Lawler |
| 5,086,510 A | 2/1992 | Guenther et al. |
| 5,087,969 A | 2/1992 | Kamada et al. |
| 5,096,287 A | 3/1992 | Kakinami et al. |
| 5,097,362 A | 3/1992 | Lynas |
| 5,100,093 A | 3/1992 | Rawlinson |
| 5,101,351 A | 3/1992 | Hattori |
| 5,111,289 A | 5/1992 | Lucas et al. |
| 5,113,721 A | 5/1992 | Polly |
| 5,115,398 A | 5/1992 | De Jong |
| 5,121,200 A | 6/1992 | Choi |
| 5,122,957 A | 6/1992 | Hattori |
| 5,124,549 A | 6/1992 | Michaels et al. |
| 5,128,769 A | 7/1992 | Ari |
| 5,130,709 A | 7/1992 | Toyama et al. |
| 5,133,605 A | 7/1992 | Nakamura |
| 5,137,238 A | 8/1992 | Hutten |
| 5,139,327 A | 8/1992 | Tanaka |
| 5,144,685 A | 9/1992 | Nasar et al. |
| 5,146,340 A | 9/1992 | Dickerson |
| 5,148,014 A | 9/1992 | Lynam |
| 5,153,760 A | 10/1992 | Ahmed |
| 5,155,426 A | 10/1992 | Kurami |
| 5,155,775 A | 10/1992 | Brown |
| 5,159,557 A | 10/1992 | Ogawa |
| 5,160,780 A | 11/1992 | Ono et al. |
| 5,160,971 A | 11/1992 | Koshizawa et al. |
| 5,161,632 A | 11/1992 | Asayama et al. |
| 5,162,841 A | 11/1992 | Terashita |
| 5,162,861 A | 11/1992 | Tamburino |
| 5,163,002 A | 11/1992 | Kurami |
| 5,165,108 A | 11/1992 | Asayama |
| 5,166,681 A | 11/1992 | Bottesch et al. |
| 5,168,355 A | 12/1992 | Asayama |
| 5,168,378 A | 12/1992 | Black et al. |
| 5,170,374 A | 12/1992 | Shimohigashi et al. |
| 5,172,235 A | 12/1992 | Wilm et al. |
| 5,172,317 A | 12/1992 | Asanuma et al. |
| 5,173,881 A | 12/1992 | Sindle |
| 5,177,462 A | 1/1993 | Kajiwara |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,185,812 A | 2/1993 | Yamashita et al. |
| 5,187,383 A | 2/1993 | Taccetta et al. |
| 5,189,561 A | 2/1993 | Hong |
| 5,193,000 A | 3/1993 | Lipton et al. |
| 5,193,029 A | 3/1993 | Schofield et al. |
| 5,193,894 A | 3/1993 | Lietar et al. |
| 5,204,536 A | 4/1993 | Vardi |
| 5,204,778 A | 4/1993 | Bechtel |
| 5,208,701 A | 5/1993 | Maeda |
| 5,208,750 A | 5/1993 | Kurami et al. |
| 5,212,468 A | 5/1993 | Adell |
| 5,214,408 A | 5/1993 | Asayama |
| 5,216,408 A | 6/1993 | Shirakawa |
| 5,218,414 A | 6/1993 | Kajiwara et al. |
| 5,220,508 A | 6/1993 | Ninomiya et al. |
| 5,223,814 A | 6/1993 | Suman |
| 5,223,907 A | 6/1993 | Asayama |
| 5,225,827 A | 7/1993 | Persson |
| 5,229,941 A | 7/1993 | Hattori |
| 5,230,400 A | 7/1993 | Kakinami et al. |
| 5,231,379 A | 7/1993 | Wood et al. |
| 5,233,527 A | 8/1993 | Shinnosuke |
| 5,234,070 A | 8/1993 | Noah et al. |
| 5,235,178 A | 8/1993 | Hegyi |
| 5,237,249 A | 8/1993 | Levers |
| 5,243,524 A | 9/1993 | Ishida et al. |
| 5,245,422 A | 9/1993 | Borcherts et al. |
| 5,246,193 A | 9/1993 | Faidley |
| 5,249,126 A | 9/1993 | Hattori |
| 5,249,128 A | 9/1993 | Markandey et al. |
| 5,249,157 A | 9/1993 | Taylor |
| 5,251,680 A | 10/1993 | Miezawa et al. |
| 5,253,050 A | 10/1993 | Karasudani |
| 5,253,109 A | 10/1993 | O'Farrell et al. |
| 5,265,172 A | 11/1993 | Markandey et al. |
| 5,266,873 A | 11/1993 | Arditi et al. |
| 5,267,160 A | 11/1993 | Ito et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,291,424 A | 3/1994 | Asayama et al. |
| 5,293,162 A | 3/1994 | Bachalo |
| 5,298,732 A | 3/1994 | Chen |
| 5,301,115 A | 4/1994 | Nouso et al. |
| 5,302,956 A | 4/1994 | Asbury et al. |
| 5,304,980 A | 4/1994 | Maekawa |
| 5,305,012 A | 4/1994 | Faris |
| 5,307,136 A | 4/1994 | Saneyoshi |
| 5,307,419 A | 4/1994 | Tsujino et al. |
| 5,309,137 A | 5/1994 | Kajiwara |
| 5,313,072 A | 5/1994 | Vachss |
| 5,318,143 A | 6/1994 | Parker et al. |
| 5,321,556 A | 6/1994 | Joe |
| 5,325,096 A | 6/1994 | Pakett |
| 5,325,386 A | 6/1994 | Jewell et al. |
| 5,327,288 A | 7/1994 | Wellington et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,343,206 A | 8/1994 | Ansaldi et al. |
| 5,345,266 A | 9/1994 | Denyer |
| 5,347,456 A | 9/1994 | Zhang et al. |
| 5,351,044 A | 9/1994 | Mathur et al. |
| D351,370 S | 10/1994 | Lawlor et al. |
| 5,355,118 A | 10/1994 | Fukuhara |
| 5,359,666 A | 10/1994 | Nakayama et al. |
| 5,367,457 A | 11/1994 | Ishida et al. |
| 5,369,590 A | 11/1994 | Karasudani |
| 5,371,535 A | 12/1994 | Takizawa |
| 5,373,911 A | 12/1994 | Yasui |
| 5,374,852 A | 12/1994 | Parkes |
| 5,379,196 A | 1/1995 | Kobayashi et al. |
| 5,379,353 A | 1/1995 | Hasegawa et al. |
| 5,381,338 A | 1/1995 | Wysocki et al. |
| 5,386,285 A | 1/1995 | Asayama |
| 5,388,048 A | 2/1995 | Yavnayi et al. |
| 5,394,333 A | 2/1995 | Kao |
| 5,398,041 A | 3/1995 | Hyatt |
| 5,406,395 A | 4/1995 | Wilson et al. |
| 5,406,414 A | 4/1995 | O'Farrell et al. |
| 5,408,330 A | 4/1995 | Squicciarini |
| 5,408,346 A | 4/1995 | Trissel et al. |
| 5,410,346 A | 4/1995 | Saneyoshi et al. |
| 5,414,257 A | 5/1995 | Stanton |
| 5,414,439 A | 5/1995 | Groves et al. |
| 5,414,461 A | 5/1995 | Kishi et al. |
| 5,414,625 A | 5/1995 | Hattori |
| 5,416,313 A | 5/1995 | Larson et al. |
| 5,416,318 A | 5/1995 | Hegyi |
| 5,416,478 A | 5/1995 | Morinaga |
| 5,416,711 A | 5/1995 | Gran et al. |

(56) References Cited

U.S. PATENT DOCUMENTS

| | | |
|---|---|---|
| 5,424,952 A | 6/1995 | Asayama |
| 5,426,294 A | 6/1995 | Kobayashi et al. |
| 5,430,431 A | 7/1995 | Nelson |
| 5,430,450 A | 7/1995 | Holmes |
| 5,434,407 A | 7/1995 | Bauer et al. |
| 5,434,927 A | 7/1995 | Brady et al. |
| 5,436,839 A | 7/1995 | Dausch et al. |
| 5,440,428 A | 8/1995 | Hegg et al. |
| 5,444,478 A | 8/1995 | Lelong et al. |
| 5,448,180 A | 9/1995 | Kienzler et al. |
| 5,450,057 A | 9/1995 | Watanabe |
| 5,451,822 A | 9/1995 | Bechtel et al. |
| 5,457,493 A | 10/1995 | Leddy et al. |
| 5,459,660 A | 10/1995 | Berra |
| 5,461,357 A | 10/1995 | Yoshioka et al. |
| 5,461,361 A | 10/1995 | Moore |
| 5,465,079 A | 11/1995 | Bouchard et al. |
| 5,467,284 A | 11/1995 | Yoshioka et al. |
| 5,469,298 A | 11/1995 | Suman et al. |
| 5,471,515 A | 11/1995 | Fossum et al. |
| 5,473,515 A | 12/1995 | Liu |
| 5,475,366 A | 12/1995 | Van Lente et al. |
| 5,475,494 A | 12/1995 | Nishida et al. |
| 5,481,257 A | 1/1996 | Brubaker et al. |
| 5,482,133 A | 1/1996 | Iwata et al. |
| 5,483,060 A | 1/1996 | Sugiura et al. |
| 5,483,168 A | 1/1996 | Reid |
| 5,483,453 A | 1/1996 | Uemura et al. |
| 5,487,116 A | 1/1996 | Nakano et al. |
| 5,488,496 A | 1/1996 | Pine |
| 5,493,269 A | 2/1996 | Durley et al. |
| 5,493,392 A | 2/1996 | Blackmon et al. |
| 5,498,866 A | 3/1996 | Bendicks et al. |
| 5,500,766 A | 3/1996 | Stonecypher |
| 5,508,592 A | 4/1996 | Lapatovich et al. |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,330 A | 6/1996 | Baiden et al. |
| 5,530,420 A | 6/1996 | Tsuchiya et al. |
| 5,530,771 A | 6/1996 | Maekawa |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,545,960 A | 8/1996 | Ishikawa |
| 5,550,677 A | 8/1996 | Schofield et al. |
| 5,555,136 A | 9/1996 | Waldmann et al. |
| 5,555,312 A | 9/1996 | Shima et al. |
| 5,555,503 A | 9/1996 | Kyrtsos et al. |
| 5,555,555 A | 9/1996 | Sato et al. |
| 5,558,123 A | 9/1996 | Castel et al. |
| 5,559,695 A | 9/1996 | Daily |
| 5,562,336 A | 10/1996 | Gotou et al. |
| 5,566,224 A | 10/1996 | ul Azam et al. |
| 5,568,027 A | 10/1996 | Teder |
| 5,568,316 A | 10/1996 | Schrenck et al. |
| 5,572,315 A | 11/1996 | Krell |
| 5,574,443 A | 11/1996 | Hsieh |
| 5,576,687 A | 11/1996 | Blank et al. |
| 5,581,464 A | 12/1996 | Woll et al. |
| 5,582,383 A | 12/1996 | Mertens et al. |
| 5,588,123 A | 12/1996 | Loibl |
| 5,594,222 A | 1/1997 | Caldwell |
| 5,596,319 A | 1/1997 | Spry et al. |
| 5,596,382 A | 1/1997 | Bamford |
| 5,598,164 A | 1/1997 | Reppas et al. |
| 5,602,457 A | 2/1997 | Anderson et al. |
| 5,612,686 A | 3/1997 | Takano et al. |
| 5,612,883 A | 3/1997 | Shaffer et al. |
| 5,614,788 A | 3/1997 | Mullins |
| 5,614,885 A | 3/1997 | Van Lente et al. |
| 5,615,857 A | 4/1997 | Hook |
| 5,619,370 A | 4/1997 | Guinosso |
| 5,627,586 A | 5/1997 | Yamasaki |
| 5,633,944 A | 5/1997 | Guibert et al. |
| 5,634,709 A | 6/1997 | Iwama |
| 5,638,116 A | 6/1997 | Shimoura et al. |
| 5,642,299 A | 6/1997 | Hardin et al. |
| 5,646,612 A | 7/1997 | Byon |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,667,896 A | 9/1997 | Carter et al. |
| 5,668,663 A | 9/1997 | Varaprasad et al. |
| 5,670,935 A | 9/1997 | Schofield et al. |
| 5,673,019 A | 9/1997 | Dantoni |
| 5,675,489 A | 10/1997 | Pomerleau |
| 5,676,484 A | 10/1997 | Chamberlin et al. |
| 5,677,851 A | 10/1997 | Kingdon et al. |
| 5,677,979 A | 10/1997 | Squicciarini et al. |
| 5,680,263 A | 10/1997 | Zimmermann et al. |
| D388,107 S | 12/1997 | Huckins |
| 5,699,044 A | 12/1997 | Van Lente et al. |
| 5,699,057 A | 12/1997 | Ikeda et al. |
| 5,699,149 A | 12/1997 | Kuroda et al. |
| 5,706,355 A | 1/1998 | Raboisson et al. |
| 5,707,129 A | 1/1998 | Kobayashi |
| 5,708,410 A | 1/1998 | Blank et al. |
| 5,710,633 A | 1/1998 | Klappenbach et al. |
| 5,715,093 A | 2/1998 | Schierbeek et al. |
| 5,719,551 A | 2/1998 | Flick |
| 5,724,187 A | 3/1998 | Varaprasad et al. |
| 5,724,316 A | 3/1998 | Brunts |
| 5,737,226 A | 4/1998 | Olson et al. |
| 5,757,949 A | 5/1998 | Kinoshita et al. |
| 5,760,826 A | 6/1998 | Nayer |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,764,139 A | 6/1998 | Nojima et al. |
| 5,765,116 A | 6/1998 | Wilson-Jones et al. |
| 5,765,940 A | 6/1998 | Levy et al. |
| 5,781,105 A | 7/1998 | Bitar et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,804,719 A | 9/1998 | Didelot et al. |
| 5,808,589 A | 9/1998 | Fergason |
| 5,811,888 A | 9/1998 | Hsieh |
| 5,820,097 A | 10/1998 | Spooner |
| 5,835,255 A | 11/1998 | Miles |
| 5,835,613 A | 11/1998 | Breed et al. |
| 5,835,614 A | 11/1998 | Aoyama et al. |
| 5,837,994 A | 11/1998 | Stam et al. |
| 5,841,126 A | 11/1998 | Fossum et al. |
| 5,844,505 A | 12/1998 | Van Ryzin |
| 5,844,682 A | 12/1998 | Kiyomoto et al. |
| 5,845,000 A | 12/1998 | Breed et al. |
| 5,847,755 A | 12/1998 | Wixson et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,193 A | 3/1999 | Karim |
| 5,883,684 A | 3/1999 | Millikan et al. |
| 5,883,739 A | 3/1999 | Ashihara et al. |
| 5,884,212 A | 3/1999 | Lion |
| 5,890,021 A | 3/1999 | Onoda |

(56) References Cited

U.S. PATENT DOCUMENTS

| | | |
|---|---|---|
| 5,890,083 A | 3/1999 | Franke et al. |
| 5,896,085 A | 4/1999 | Mori et al. |
| 5,899,956 A | 5/1999 | Chan |
| 5,904,725 A | 5/1999 | Iisaka et al. |
| 5,905,457 A | 5/1999 | Rashid |
| 5,912,534 A | 6/1999 | Benedict |
| 5,914,815 A | 6/1999 | Bos |
| 5,920,367 A | 7/1999 | Kajimoto et al. |
| 5,922,036 A | 7/1999 | Yasui |
| 5,923,027 A | 7/1999 | Stam et al. |
| 5,929,784 A | 7/1999 | Kawaziri et al. |
| 5,929,786 A | 7/1999 | Schofield et al. |
| 5,938,320 A | 8/1999 | Crandall |
| 5,938,810 A | 8/1999 | DeVries, Jr. et al. |
| 5,940,120 A | 8/1999 | Frankhouse et al. |
| 5,942,853 A | 8/1999 | Piscart |
| 5,949,331 A | 9/1999 | Schofield et al. |
| 5,955,941 A | 9/1999 | Pruksch et al. |
| 5,956,181 A | 9/1999 | Lin |
| 5,959,367 A | 9/1999 | O'Farrell et al. |
| 5,959,555 A | 9/1999 | Furuta |
| 5,961,571 A | 10/1999 | Gorr |
| 5,963,247 A | 10/1999 | Banitt |
| 5,964,822 A | 10/1999 | Alland et al. |
| 5,971,552 A | 10/1999 | O'Farrell et al. |
| 5,982,288 A | 11/1999 | Sawatari et al. |
| 5,986,796 A | 11/1999 | Miles |
| 5,990,469 A | 11/1999 | Bechtel et al. |
| 5,990,649 A | 11/1999 | Nagao et al. |
| 5,991,427 A | 11/1999 | Kakinami et al. |
| 6,001,486 A | 12/1999 | Varaprasad et al. |
| 6,009,336 A | 12/1999 | Harris et al. |
| 6,020,704 A | 2/2000 | Buschur |
| 6,028,537 A | 2/2000 | Suman et al. |
| 6,031,484 A | 2/2000 | Bullinger |
| 6,037,860 A | 3/2000 | Zander et al. |
| 6,037,975 A | 3/2000 | Aoyama |
| 6,049,171 A | 4/2000 | Stam et al. |
| 6,052,124 A | 4/2000 | Stein et al. |
| 6,057,754 A | 5/2000 | Kinoshita et al. |
| 6,066,933 A | 5/2000 | Ponziana |
| 6,084,519 A | 7/2000 | Coulling et al. |
| 6,087,953 A | 7/2000 | Deline et al. |
| 6,091,833 A | 7/2000 | Yasui et al. |
| 6,094,198 A | 7/2000 | Shashua |
| 6,097,023 A | 8/2000 | Schofield et al. |
| 6,097,024 A | 8/2000 | Stam et al. |
| 6,100,811 A | 8/2000 | Hsu et al. |
| 6,107,939 A | 8/2000 | Sorden |
| 6,116,743 A | 9/2000 | Hoek |
| 6,122,597 A | 9/2000 | Saneyoshi et al. |
| 6,124,647 A | 9/2000 | Marcus et al. |
| 6,124,886 A | 9/2000 | DeLine et al. |
| 6,139,172 A | 10/2000 | Bos et al. |
| 6,140,980 A | 10/2000 | Spitzer et al. |
| 6,144,022 A | 11/2000 | Tenenbaum et al. |
| 6,144,158 A | 11/2000 | Beam |
| 6,150,014 A | 11/2000 | Chu et al. |
| 6,150,930 A | 11/2000 | Cooper |
| 6,151,065 A | 11/2000 | Steed et al. |
| 6,151,539 A | 11/2000 | Bergholz et al. |
| 6,158,655 A | 12/2000 | DeVries, Jr. et al. |
| 6,166,628 A | 12/2000 | Andreas |
| 6,170,955 B1 | 1/2001 | Campbell et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,590 B1 | 1/2001 | Prevost et al. |
| 6,188,939 B1 | 2/2001 | Morgan et al. |
| 6,198,409 B1 | 3/2001 | Schofield et al. |
| 6,201,642 B1 | 3/2001 | Bos |
| 6,211,907 B1 | 4/2001 | Scaman et al. |
| 6,218,934 B1 | 4/2001 | Regan |
| 6,219,444 B1 | 4/2001 | Shashua et al. |
| 6,222,447 B1 | 4/2001 | Schofield et al. |
| 6,222,460 B1 | 4/2001 | DeLine et al. |
| 6,226,061 B1 | 5/2001 | Tagusa |
| 6,229,319 B1 | 5/2001 | Johnson |
| 6,243,003 B1 | 6/2001 | DeLine et al. |
| 6,247,819 B1 | 6/2001 | Turnbull et al. |
| 6,250,148 B1 | 6/2001 | Lynam |
| 6,259,412 B1 | 7/2001 | Duroux |
| 6,259,423 B1 | 7/2001 | Tokito et al. |
| 6,266,082 B1 | 7/2001 | Yonezawa et al. |
| 6,266,442 B1 | 7/2001 | Laumeyer et al. |
| 6,278,377 B1 | 8/2001 | DeLine et al. |
| 6,281,804 B1 | 8/2001 | Haller et al. |
| 6,285,393 B1 | 9/2001 | Shimoura et al. |
| 6,285,778 B1 | 9/2001 | Nakajima et al. |
| 6,291,905 B1 | 9/2001 | Drummond et al. |
| 6,291,906 B1 | 9/2001 | Marcus et al. |
| 6,292,752 B1 | 9/2001 | Franke et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,311,119 B2 | 10/2001 | Sawamoto et al. |
| 6,313,454 B1 | 11/2001 | Bos et al. |
| 6,315,421 B1 | 11/2001 | Apfelbeck et al. |
| 6,317,057 B1 | 11/2001 | Lee |
| 6,318,870 B1 | 11/2001 | Spooner et al. |
| 6,320,176 B1 | 11/2001 | Schofield et al. |
| 6,320,282 B1 | 11/2001 | Caldwell |
| 6,324,450 B1 | 11/2001 | Iwama |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,359,392 B1 | 3/2002 | He |
| 6,362,729 B1 | 3/2002 | Hellmann et al. |
| 6,366,213 B2 | 4/2002 | DeLine et al. |
| 6,366,236 B1 | 4/2002 | Farmer et al. |
| 6,370,329 B1 | 4/2002 | Teuchert |
| 6,388,565 B1 | 5/2002 | Bernhard et al. |
| 6,388,580 B1 | 5/2002 | Graham |
| 6,389,340 B1 | 5/2002 | Rayner |
| 6,392,218 B1 | 5/2002 | Kuehnle |
| 6,396,397 B1 | 5/2002 | Bos et al. |
| 6,396,408 B2 | 5/2002 | Drummond et al. |
| 6,411,204 B1 | 6/2002 | Bloomfield et al. |
| 6,411,328 B1 | 6/2002 | Franke et al. |
| 6,420,975 B1 | 7/2002 | DeLine et al. |
| 6,424,273 B1 | 7/2002 | Gutta et al. |
| 6,428,172 B1 | 8/2002 | Hutzel et al. |
| 6,429,594 B1 | 8/2002 | Stam et al. |
| 6,430,303 B1 | 8/2002 | Naoi et al. |
| 6,433,676 B2 | 8/2002 | DeLine et al. |
| 6,433,817 B1 | 8/2002 | Guerra |
| 6,441,748 B1 | 8/2002 | Takagi et al. |
| 6,442,465 B2 | 8/2002 | Breed et al. |
| 6,445,287 B1 | 9/2002 | Schofield et al. |
| 6,445,809 B1 | 9/2002 | Sasaki et al. |
| 6,449,540 B1 | 9/2002 | Raynar |
| 6,452,148 B1 | 9/2002 | Bendicks et al. |
| 6,466,136 B2 | 10/2002 | DeLine et al. |
| 6,466,684 B1 | 10/2002 | Sasaki et al. |
| 6,469,739 B1 | 10/2002 | Bechtel et al. |
| 6,472,977 B1 | 10/2002 | Poechmueller |
| 6,472,979 B2 | 10/2002 | Schofield et al. |
| 6,477,260 B1 | 11/2002 | Shimomura |
| 6,477,464 B2 | 11/2002 | McCarthy et al. |
| 6,483,438 B2 | 11/2002 | DeLine et al. |
| 6,485,155 B1 | 11/2002 | Duroux et al. |
| 6,497,503 B1 | 12/2002 | Dassanayake et al. |
| 6,498,620 B2 | 12/2002 | Schofield et al. |
| 6,509,832 B1 | 1/2003 | Bauer et al. |
| 6,513,252 B1 | 2/2003 | Schierbeek et al. |
| 6,515,378 B2 | 2/2003 | Drummond et al. |
| 6,516,272 B2 | 2/2003 | Lin |
| 6,516,664 B2 | 2/2003 | Lynam |
| 6,523,964 B2 | 2/2003 | Schofield et al. |
| 6,534,884 B2 | 3/2003 | Marcus et al. |
| 6,535,242 B1 | 3/2003 | Strumolo et al. |

(56) References Cited

U.S. PATENT DOCUMENTS

| | | |
|---|---|---|
| 6,539,306 B2 | 3/2003 | Turnbull |
| 6,540,193 B1 | 4/2003 | DeLine |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,570,998 B1 | 5/2003 | Ohtsuka et al. |
| 6,574,033 B1 | 6/2003 | Chui et al. |
| 6,577,334 B1 | 6/2003 | Kawai et al. |
| 6,578,017 B1 | 6/2003 | Ebersole et al. |
| 6,587,573 B1 | 7/2003 | Stam et al. |
| 6,587,968 B1 | 7/2003 | Leyva |
| 6,589,625 B1 | 7/2003 | Kothari et al. |
| 6,593,011 B2 | 7/2003 | Liu et al. |
| 6,593,565 B2 | 7/2003 | Heslin et al. |
| 6,593,698 B2 | 7/2003 | Stam et al. |
| 6,593,960 B1 | 7/2003 | Sugimoto et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,614,579 B2 | 9/2003 | Roberts et al. |
| 6,617,564 B2 | 9/2003 | Ockerse et al. |
| 6,627,918 B2 | 9/2003 | Getz et al. |
| 6,631,316 B2 | 10/2003 | Stam et al. |
| 6,631,994 B2 | 10/2003 | Suzuki et al. |
| 6,636,258 B2 | 10/2003 | Strumolo |
| 6,648,477 B2 | 11/2003 | Hutzel et al. |
| 6,650,233 B2 | 11/2003 | DeLine et al. |
| 6,650,455 B2 | 11/2003 | Miles |
| 6,653,614 B2 | 11/2003 | Stam et al. |
| 6,672,731 B2 | 1/2004 | Schnell et al. |
| 6,674,562 B1 | 1/2004 | Miles |
| 6,674,878 B2 | 1/2004 | Retterath et al. |
| 6,678,056 B2 | 1/2004 | Downs |
| 6,678,590 B1 | 1/2004 | Burchfiel |
| 6,678,614 B2 | 1/2004 | McCarthy et al. |
| 6,680,792 B2 | 1/2004 | Miles |
| 6,681,163 B2 | 1/2004 | Stam et al. |
| 6,690,268 B2 | 2/2004 | Schofield et al. |
| 6,700,605 B1 | 3/2004 | Toyoda et al. |
| 6,703,925 B2 | 3/2004 | Steffel |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,524 B2 | 4/2004 | DeLine et al. |
| 6,717,610 B1 | 4/2004 | Bos et al. |
| 6,728,393 B2 | 4/2004 | Stam et al. |
| 6,728,623 B2 | 4/2004 | Takenaga et al. |
| 6,735,506 B2 | 5/2004 | Breed et al. |
| 6,738,088 B1 | 5/2004 | Uskolovsky et al. |
| 6,741,186 B2 | 5/2004 | Ross |
| 6,741,377 B2 | 5/2004 | Miles |
| 6,744,353 B2 | 6/2004 | Sjönell |
| 6,754,367 B1 | 6/2004 | Ito et al. |
| 6,757,109 B2 | 6/2004 | Bos |
| 6,762,867 B2 | 7/2004 | Lippert et al. |
| 6,764,210 B2 | 7/2004 | Akiyama |
| 6,765,480 B2 | 7/2004 | Tseng |
| 6,774,988 B2 | 8/2004 | Stam et al. |
| 6,784,828 B2 | 8/2004 | Delcheccolo et al. |
| 6,794,119 B2 | 9/2004 | Miles |
| 6,795,221 B1 | 9/2004 | Urey |
| 6,801,127 B2 | 10/2004 | Mizusawa |
| 6,801,244 B2 | 10/2004 | Takeda et al. |
| 6,802,617 B2 | 10/2004 | Schofield et al. |
| 6,806,452 B2 | 10/2004 | Bos et al. |
| 6,807,287 B1 | 10/2004 | Hermans |
| 6,811,330 B1 | 11/2004 | Tozawa |
| 6,812,463 B2 | 11/2004 | Okada |
| 6,813,545 B2 | 11/2004 | Stromme |
| 6,819,231 B2 | 11/2004 | Berberich et al. |
| 6,819,779 B1 | 11/2004 | Nichani |
| 6,822,563 B2 | 11/2004 | Bos et al. |
| 6,823,241 B2 | 11/2004 | Shirato et al. |
| 6,823,261 B2 | 11/2004 | Sekiguchi |
| 6,824,281 B2 | 11/2004 | Schofield et al. |
| 6,831,261 B2 | 12/2004 | Schofield et al. |
| 6,838,980 B2 | 1/2005 | Gloger et al. |
| 6,842,189 B2 | 1/2005 | Park |
| 6,847,487 B2 | 1/2005 | Burgner |
| 6,850,629 B2 | 2/2005 | Jeon |
| 6,853,738 B1 | 2/2005 | Nishigaki et al. |
| 6,859,148 B2 | 2/2005 | Miller et al. |
| 6,861,809 B2 | 3/2005 | Stam |
| 6,864,930 B2 | 3/2005 | Matsushita et al. |
| 6,873,253 B2 | 3/2005 | Veziris |
| 6,882,287 B2 | 4/2005 | Schofield |
| 6,888,447 B2 | 5/2005 | Hori et al. |
| 6,889,161 B2 | 5/2005 | Winner et al. |
| 6,891,563 B2 | 5/2005 | Schofield et al. |
| 6,898,518 B2 | 5/2005 | Padmanabhan |
| 6,906,620 B2 | 6/2005 | Nakai et al. |
| 6,906,639 B2 | 6/2005 | Lemelson et al. |
| 6,909,753 B2 | 6/2005 | Meehan et al. |
| 6,914,521 B2 | 7/2005 | Rothkop |
| 6,928,180 B2 | 8/2005 | Stam et al. |
| 6,932,669 B2 | 8/2005 | Lee et al. |
| 6,933,837 B2 | 8/2005 | Gunderson et al. |
| 6,940,423 B2 | 9/2005 | Takagi et al. |
| 6,946,978 B2 | 9/2005 | Schofield |
| 6,950,035 B2 | 9/2005 | Tanaka et al. |
| 6,953,253 B2 | 10/2005 | Schofield et al. |
| 6,956,469 B2 | 10/2005 | Hirvonen et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,661 B1 | 11/2005 | Hattori et al. |
| 6,967,569 B2 | 11/2005 | Weber et al. |
| 6,968,736 B2 | 11/2005 | Lynam |
| 6,975,775 B2 | 12/2005 | Rykowski et al. |
| 6,980,092 B2 | 12/2005 | Turnbull et al. |
| 6,989,736 B2 | 1/2006 | Berberich et al. |
| 6,990,397 B2 | 1/2006 | Albou et al. |
| 6,995,687 B2 | 2/2006 | Lang et al. |
| 7,004,593 B2 | 2/2006 | Weller et al. |
| 7,004,606 B2 | 2/2006 | Schofield |
| 7,005,974 B2 | 2/2006 | McMahon et al. |
| 7,012,507 B2 | 3/2006 | DeLine et al. |
| 7,012,727 B2 | 3/2006 | Hutzel et al. |
| 7,023,331 B2 | 4/2006 | Kodama |
| 7,027,387 B2 | 4/2006 | Reinold et al. |
| 7,027,615 B2 | 4/2006 | Chen |
| 7,030,738 B2 | 4/2006 | Ishii |
| 7,030,775 B2 | 4/2006 | Sekiguchi |
| 7,030,778 B2 | 4/2006 | Ra |
| 7,038,577 B2 | 5/2006 | Pawlicki et al. |
| 7,046,448 B2 | 5/2006 | Burgner |
| 7,057,505 B2 | 6/2006 | Iwamoto |
| 7,057,681 B2 | 6/2006 | Hinata et al. |
| 7,062,300 B1 | 6/2006 | Kim |
| 7,065,432 B2 | 6/2006 | Moisel et al. |
| 7,068,289 B2 | 6/2006 | Satoh et al. |
| 7,068,844 B1 | 6/2006 | Javidi et al. |
| 7,085,633 B2 | 8/2006 | Nishira et al. |
| 7,085,637 B2 | 8/2006 | Breed et al. |
| 7,091,837 B2 | 8/2006 | Nakai et al. |
| 7,092,548 B2 | 8/2006 | Laumeyer et al. |
| 7,095,432 B2 | 8/2006 | Nakayama et al. |
| 7,106,213 B2 | 9/2006 | White |
| 7,110,021 B2 | 9/2006 | Nobori et al. |
| 7,110,156 B2 | 9/2006 | Lawlor et al. |
| 7,113,867 B1 | 9/2006 | Stein |
| 7,116,246 B2 | 10/2006 | Winter et al. |
| 7,121,028 B2 | 10/2006 | Shoen et al. |
| 7,123,168 B2 | 10/2006 | Schofield |
| 7,133,661 B2 | 11/2006 | Hatae et al. |
| 7,149,613 B2 | 12/2006 | Stam et al. |
| 7,151,996 B2 | 12/2006 | Stein |
| 7,167,796 B2 | 1/2007 | Taylor et al. |
| 7,171,027 B2 | 1/2007 | Satoh |
| 7,184,585 B2 | 2/2007 | Hamza et al. |
| 7,187,498 B2 | 3/2007 | Bengoechea et al. |
| 7,188,963 B2 | 3/2007 | Schofield et al. |
| 7,195,381 B2 | 3/2007 | Lynam et al. |

(56) References Cited

U.S. PATENT DOCUMENTS

| | | |
|---|---|---|
| 7,202,776 B2 | 4/2007 | Breed |
| 7,202,987 B2 | 4/2007 | Varaprasad et al. |
| 7,205,904 B2 | 4/2007 | Schofield |
| 7,221,363 B2 | 5/2007 | Roberts et al. |
| 7,224,324 B2 | 5/2007 | Quist et al. |
| 7,227,459 B2 | 6/2007 | Bos et al. |
| 7,227,611 B2 | 6/2007 | Hull et al. |
| 7,235,918 B2 | 6/2007 | McCullough et al. |
| 7,248,283 B2 | 7/2007 | Takagi et al. |
| 7,248,344 B2 | 7/2007 | Morcom |
| 7,249,860 B2 | 7/2007 | Kulas et al. |
| 7,253,723 B2 | 8/2007 | Lindahl et al. |
| 7,255,451 B2 | 8/2007 | McCabe et al. |
| 7,271,951 B2 | 9/2007 | Weber et al. |
| 7,304,661 B2 | 12/2007 | Ishikura |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,337,055 B2 | 2/2008 | Matsumoto et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,360,932 B2 | 4/2008 | Uken et al. |
| 7,362,883 B2 | 4/2008 | Otsuka et al. |
| 7,370,983 B2 | 5/2008 | DeWind et al. |
| 7,375,803 B1 | 5/2008 | Bamji |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,403,659 B2 | 7/2008 | Das et al. |
| 7,420,756 B2 | 9/2008 | Lynam |
| 7,423,248 B2 | 9/2008 | Schofield et al. |
| 7,423,821 B2 | 9/2008 | Bechtel et al. |
| 7,425,076 B2 | 9/2008 | Schofield et al. |
| 7,429,998 B2 | 9/2008 | Kawauchi et al. |
| 7,432,248 B2 | 10/2008 | Roberts et al. |
| 7,432,967 B2 | 10/2008 | Bechtel et al. |
| 7,446,924 B2 | 11/2008 | Schofield et al. |
| 7,459,664 B2 | 12/2008 | Schofield et al. |
| 7,460,007 B2 | 12/2008 | Schofield et al. |
| 7,463,138 B2 | 12/2008 | Pawlicki et al. |
| 7,468,652 B2 | 12/2008 | DeLine et al. |
| 7,474,963 B2 | 1/2009 | Taylor et al. |
| 7,480,149 B2 | 1/2009 | DeWard et al. |
| 7,489,374 B2 | 2/2009 | Utsumi et al. |
| 7,495,719 B2 | 2/2009 | Adachi et al. |
| 7,525,604 B2 | 4/2009 | Xue |
| 7,526,103 B2 | 4/2009 | Schofield et al. |
| 7,533,998 B2 | 5/2009 | Schofield et al. |
| 7,541,743 B2 | 6/2009 | Salmeen et al. |
| 7,543,946 B2 | 6/2009 | Ockerse et al. |
| 7,545,429 B2 | 6/2009 | Travis |
| 7,548,291 B2 | 6/2009 | Lee et al. |
| 7,551,103 B2 | 6/2009 | Schofield |
| 7,561,181 B2 | 7/2009 | Schofield et al. |
| 7,565,006 B2 | 7/2009 | Stam et al. |
| 7,566,639 B2 | 7/2009 | Kohda |
| 7,566,851 B2 | 7/2009 | Stein et al. |
| 7,567,291 B2 | 7/2009 | Bechtel et al. |
| 7,605,856 B2 | 10/2009 | Imoto |
| 7,613,327 B2 | 11/2009 | Stam et al. |
| 7,616,781 B2 | 11/2009 | Schofield et al. |
| 7,619,508 B2 | 11/2009 | Lynam et al. |
| 7,629,996 B2 | 12/2009 | Rademacher et al. |
| 7,633,383 B2 | 12/2009 | Dunsmoir et al. |
| 7,639,149 B2 | 12/2009 | Katoh |
| 7,650,030 B2 | 1/2010 | Shan et al. |
| 7,653,215 B2 | 1/2010 | Stam |
| 7,655,894 B2 | 2/2010 | Schofield et al. |
| 7,663,798 B2 | 2/2010 | Tonar et al. |
| 7,676,087 B2 | 3/2010 | Dhua et al. |
| 7,679,498 B2 | 3/2010 | Pawlicki et al. |
| 7,683,326 B2 | 3/2010 | Stam et al. |
| 7,702,133 B2 | 4/2010 | Muramatsu et al. |
| 7,719,408 B2 | 5/2010 | DeWard et al. |
| 7,720,580 B2 | 5/2010 | Higgins-Luthman |
| 7,724,434 B2 | 5/2010 | Cross et al. |
| 7,731,403 B2 | 6/2010 | Lynam et al. |
| 7,742,864 B2 | 6/2010 | Sekiguchi |
| 7,786,898 B2 | 8/2010 | Stein et al. |
| 7,791,694 B2 | 9/2010 | Molsen et al. |
| 7,792,329 B2 | 9/2010 | Schofield et al. |
| 7,825,600 B2 | 11/2010 | Stam et al. |
| 7,842,154 B2 | 11/2010 | Lynam |
| 7,843,451 B2 | 11/2010 | Lafon |
| 7,854,514 B2 | 12/2010 | Conner et al. |
| 7,855,755 B2 | 12/2010 | Weller et al. |
| 7,855,778 B2 | 12/2010 | Yung et al. |
| 7,859,565 B2 | 12/2010 | Schofield et al. |
| 7,873,187 B2 | 1/2011 | Schofield et al. |
| 7,877,175 B2 | 1/2011 | Higgins-Luthman |
| 7,881,496 B2 | 2/2011 | Camilleri et al. |
| 7,903,324 B2 | 3/2011 | Kobayashi et al. |
| 7,903,335 B2 | 3/2011 | Nieuwkerk et al. |
| 7,914,187 B2 | 3/2011 | Higgins-Luthman et al. |
| 7,914,188 B2 | 3/2011 | DeLine et al. |
| 7,930,160 B1 | 4/2011 | Hosagrahara et al. |
| 7,949,152 B2 | 5/2011 | Schofield et al. |
| 7,965,357 B2 | 6/2011 | Van De Witte et al. |
| 7,972,045 B2 | 7/2011 | Schofield |
| 7,991,522 B2 | 8/2011 | Higgins-Luthman |
| 7,994,462 B2 | 8/2011 | Schofield et al. |
| 7,995,067 B2 | 8/2011 | Navon |
| 8,004,392 B2 | 8/2011 | DeLine et al. |
| 8,017,898 B2 | 9/2011 | Lu et al. |
| 8,027,691 B2 | 9/2011 | Bernas et al. |
| 8,045,760 B2 | 10/2011 | Stam et al. |
| 8,063,759 B2 | 11/2011 | Bos et al. |
| 8,064,643 B2 | 11/2011 | Stein et al. |
| 8,082,101 B2 | 12/2011 | Stein et al. |
| 8,090,153 B2 | 1/2012 | Schofield et al. |
| 8,094,002 B2 | 1/2012 | Schofield et al. |
| 8,095,310 B2 | 1/2012 | Taylor et al. |
| 8,098,142 B2 | 1/2012 | Schofield et al. |
| 8,100,568 B2 | 1/2012 | DeLine et al. |
| 8,116,929 B2 | 2/2012 | Higgins-Luthman |
| 8,120,652 B2 | 2/2012 | Bechtel et al. |
| 8,162,518 B2 | 4/2012 | Schofield |
| 8,164,628 B2 | 4/2012 | Stein et al. |
| 8,179,437 B2 | 5/2012 | Schofield et al. |
| 8,184,159 B2 | 5/2012 | Luo |
| 8,203,440 B2 | 6/2012 | Schofield et al. |
| 8,203,443 B2 | 6/2012 | Bos et al. |
| 8,222,588 B2 | 7/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,288,711 B2 | 10/2012 | Heslin et al. |
| 8,289,142 B2 | 10/2012 | Pawlicki et al. |
| 8,289,430 B2 | 10/2012 | Bechtel et al. |
| 8,300,058 B2 | 10/2012 | Navon et al. |
| 8,305,471 B2 | 11/2012 | Bechtel et al. |
| 8,308,325 B2 | 11/2012 | Takayanazi et al. |
| 8,314,689 B2 | 11/2012 | Schofield et al. |
| 8,324,552 B2 | 12/2012 | Schofield et al. |
| 8,325,028 B2 | 12/2012 | Schofield et al. |
| 8,325,986 B2 | 12/2012 | Schofield et al. |
| 8,339,526 B2 | 12/2012 | Minikey, Jr. et al. |
| 8,350,683 B2 | 1/2013 | DeLine et al. |
| 8,362,883 B2 | 1/2013 | Hale et al. |
| 8,378,851 B2 | 2/2013 | Stein et al. |
| 8,386,114 B2 | 2/2013 | Higgins-Luthman |
| 8,405,726 B2 | 3/2013 | Schofield et al. |
| 8,414,137 B2 | 4/2013 | Quinn et al. |
| 8,434,919 B2 | 5/2013 | Schofield |
| 8,452,055 B2 | 5/2013 | Stein et al. |
| 8,481,910 B2 | 7/2013 | Schofield et al. |
| 8,481,916 B2 | 7/2013 | Heslin et al. |
| 8,492,698 B2 | 7/2013 | Schofield et al. |
| 8,508,593 B1 | 8/2013 | Schofield et al. |
| 8,513,590 B2 | 8/2013 | Heslin et al. |
| 8,531,278 B2 | 9/2013 | DeWard et al. |
| 8,531,279 B2 | 9/2013 | DeLine et al. |

(56) References Cited

U.S. PATENT DOCUMENTS

| | | |
|---|---|---|
| 8,534,887 B2 | 9/2013 | DeLine et al. |
| 8,538,205 B2 | 9/2013 | Sixsou et al. |
| 8,543,330 B2 | 9/2013 | Taylor et al. |
| 8,553,088 B2 | 10/2013 | Stein et al. |
| 8,593,521 B2 | 11/2013 | Schofield et al. |
| 8,599,001 B2 | 12/2013 | Schofield et al. |
| 8,629,768 B2 | 1/2014 | Bos et al. |
| 8,636,393 B2 | 1/2014 | Schofield |
| 8,637,801 B2 | 1/2014 | Schofield et al. |
| 8,643,724 B2 | 2/2014 | Schofield et al. |
| 8,656,221 B2 | 2/2014 | Sixsou et al. |
| 8,665,079 B2 | 3/2014 | Pawlicki et al. |
| 8,676,491 B2 | 3/2014 | Taylor et al. |
| 8,686,840 B2 | 4/2014 | Drummond et al. |
| 8,692,659 B2 | 4/2014 | Schofield et al. |
| 8,818,042 B2 | 8/2014 | Schofield et al. |
| 9,008,369 B2 | 4/2015 | Schofield et al. |
| 9,171,217 B2 | 10/2015 | Pawlicki et al. |
| 9,191,634 B2 | 11/2015 | Schofield et al. |
| 9,428,192 B2 | 8/2016 | Schofield et al. |
| 9,555,803 B2 | 1/2017 | Pawlicki et al. |
| 2001/0002451 A1 | 5/2001 | Breed |
| 2002/0003571 A1 | 1/2002 | Schofield et al. |
| 2002/0005778 A1 | 1/2002 | Breed |
| 2002/0011611 A1 | 1/2002 | Huang et al. |
| 2002/0029103 A1 | 3/2002 | Breed et al. |
| 2002/0060522 A1 | 5/2002 | Stam et al. |
| 2002/0080235 A1 | 6/2002 | Jeon |
| 2002/0113873 A1 | 8/2002 | Williams |
| 2002/0116106 A1 | 8/2002 | Breed et al. |
| 2002/0126002 A1 | 9/2002 | Patchell |
| 2002/0126875 A1 | 9/2002 | Naoi et al. |
| 2002/0135468 A1 | 9/2002 | Bos et al. |
| 2003/0040864 A1 | 2/2003 | Stein |
| 2003/0070741 A1 | 4/2003 | Rosenberg et al. |
| 2003/0103142 A1 | 6/2003 | Hitomi et al. |
| 2003/0122930 A1 | 7/2003 | Schofield |
| 2003/0125855 A1 | 7/2003 | Breed et al. |
| 2003/0128106 A1 | 7/2003 | Ross |
| 2003/0137586 A1 | 7/2003 | Lewellen |
| 2003/0191568 A1 | 10/2003 | Breed |
| 2003/0202683 A1 | 10/2003 | Ma et al. |
| 2003/0209893 A1 | 11/2003 | Breed et al. |
| 2003/0222982 A1 | 12/2003 | Hamdan et al. |
| 2004/0016870 A1 | 1/2004 | Pawlicki et al. |
| 2004/0021947 A1 | 2/2004 | Schofield |
| 2004/0022416 A1 | 2/2004 | Lemelson |
| 2004/0086153 A1 | 5/2004 | Tsai et al. |
| 2004/0096082 A1 | 5/2004 | Nakai et al. |
| 2004/0146184 A1 | 7/2004 | Hamza et al. |
| 2004/0148063 A1 | 7/2004 | Patchell |
| 2004/0164228 A1 | 8/2004 | Fogg et al. |
| 2004/0200948 A1 | 10/2004 | Bos et al. |
| 2005/0036325 A1 | 2/2005 | Furusawa et al. |
| 2005/0073853 A1 | 4/2005 | Stam |
| 2005/0131607 A1 | 6/2005 | Breed |
| 2005/0219852 A1 | 10/2005 | Stam et al. |
| 2005/0226490 A1 | 10/2005 | Phillips et al. |
| 2005/0237385 A1 | 10/2005 | Kosaka et al. |
| 2006/0018511 A1 | 1/2006 | Stam et al. |
| 2006/0018512 A1 | 1/2006 | Stam et al. |
| 2006/0050018 A1 | 3/2006 | Hutzel et al. |
| 2006/0091813 A1 | 5/2006 | Stam et al. |
| 2006/0095175 A1 | 5/2006 | deWaal et al. |
| 2006/0103727 A1 | 5/2006 | Tseng |
| 2006/0250224 A1 | 11/2006 | Steffel et al. |
| 2006/0250501 A1 | 11/2006 | Wildmann et al. |
| 2007/0024724 A1 | 2/2007 | Stein et al. |
| 2007/0104476 A1 | 5/2007 | Yasutomi et al. |
| 2007/0109406 A1 | 5/2007 | Schofield et al. |
| 2007/0115357 A1 | 5/2007 | Stein et al. |
| 2007/0120657 A1 | 5/2007 | Schofield et al. |
| 2007/0154063 A1 | 7/2007 | Breed |
| 2007/0154068 A1 | 7/2007 | Stein et al. |
| 2007/0193811 A1 | 8/2007 | Breed et al. |
| 2007/0221822 A1 | 9/2007 | Stein et al. |
| 2007/0229238 A1 | 10/2007 | Boyles et al. |
| 2007/0230792 A1 | 10/2007 | Shashua et al. |
| 2007/0242339 A1 | 10/2007 | Bradley |
| 2008/0036576 A1 | 2/2008 | Stein et al. |
| 2008/0043099 A1 | 2/2008 | Stein et al. |
| 2008/0137908 A1 | 6/2008 | Stein |
| 2008/0147321 A1 | 6/2008 | Howard et al. |
| 2008/0231710 A1 | 9/2008 | Asari et al. |
| 2008/0234899 A1 | 9/2008 | Breed et al. |
| 2008/0239393 A1 | 10/2008 | Navon |
| 2008/0266396 A1 | 10/2008 | Stein |
| 2009/0052003 A1 | 2/2009 | Schofield et al. |
| 2009/0066065 A1 | 3/2009 | Breed et al. |
| 2009/0113509 A1 | 4/2009 | Tseng et al. |
| 2009/0143986 A1 | 6/2009 | Stein et al. |
| 2009/0182690 A1 | 7/2009 | Stein |
| 2009/0190015 A1 | 7/2009 | Bechtel et al. |
| 2009/0201137 A1 | 8/2009 | Weller et al. |
| 2009/0243824 A1 | 10/2009 | Peterson et al. |
| 2009/0256938 A1 | 10/2009 | Bechtel et al. |
| 2009/0300629 A1 | 12/2009 | Navon et al. |
| 2010/0125717 A1 | 5/2010 | Navon |
| 2010/0172547 A1 | 7/2010 | Akutsu |
| 2011/0018700 A1 | 1/2011 | Stein et al. |
| 2011/0219217 A1 | 9/2011 | Sixsou et al. |
| 2011/0280495 A1 | 11/2011 | Sixsou et al. |
| 2011/0307684 A1 | 12/2011 | Kreinin et al. |
| 2012/0002053 A1 | 1/2012 | Stein et al. |
| 2012/0045112 A1 | 2/2012 | Lundblad et al. |
| 2012/0056735 A1 | 3/2012 | Stein et al. |
| 2012/0069185 A1 | 3/2012 | Stein |
| 2012/0105639 A1 | 5/2012 | Stein et al. |
| 2012/0140076 A1 | 6/2012 | Rosenbaum et al. |
| 2012/0200707 A1 | 8/2012 | Stein et al. |
| 2012/0212593 A1 | 8/2012 | Na'aman et al. |
| 2012/0233841 A1 | 9/2012 | Stein |
| 2012/0314071 A1 | 12/2012 | Rosenbaum et al. |
| 2013/0135444 A1 | 5/2013 | Stein et al. |
| 2013/0141580 A1 | 6/2013 | Stein et al. |
| 2013/0147957 A1 | 6/2013 | Stein |
| 2013/0169536 A1 | 7/2013 | Wexler et al. |
| 2013/0271584 A1 | 10/2013 | Wexler et al. |
| 2013/0308828 A1 | 11/2013 | Stein et al. |
| 2014/0015976 A1 | 1/2014 | DeLine et al. |
| 2014/0033203 A1 | 1/2014 | Dogon et al. |
| 2014/0049648 A1 | 2/2014 | Stein et al. |
| 2014/0082307 A1 | 3/2014 | Kreinin et al. |
| 2014/0093132 A1 | 4/2014 | Stein et al. |
| 2014/0122551 A1 | 5/2014 | Dogon et al. |
| 2014/0125799 A1 | 5/2014 | Bos et al. |
| 2014/0156140 A1 | 6/2014 | Stein et al. |
| 2014/0160244 A1 | 6/2014 | Berberian et al. |
| 2014/0161323 A1 | 6/2014 | Livyatan et al. |
| 2014/0198184 A1 | 7/2014 | Stein et al. |

FOREIGN PATENT DOCUMENTS

| | | |
|---|---|---|
| CA | 1101522 | 5/1981 |
| CA | 2392578 | 5/2001 |
| CA | 2392652 | 5/2001 |
| CH | 644315 | 7/1984 |
| CN | 2074262 | 4/1991 |
| CN | 2185701 | 12/1994 |
| CN | 1104741 | 7/1995 |
| CN | 2204254 | 8/1995 |
| CN | 1194056 | 9/1998 |
| CN | 1235913 | 11/1999 |
| CN | 1383032 | 12/2002 |
| CN | 102193852 | 9/2011 |
| CN | 102542256 | 7/2012 |
| DE | 1152627 | 8/1963 |
| DE | 1182971 | 12/1964 |
| DE | 1190413 | 4/1965 |
| DE | 1196598 | 7/1965 |
| DE | 1214174 | 4/1966 |
| DE | 2064839 | 7/1972 |
| DE | 3004247 | 8/1981 |
| DE | 3040555 | 5/1982 |

(56) References Cited

FOREIGN PATENT DOCUMENTS

| | | |
|---|---|---|
| DE | 3101855 | 8/1982 |
| DE | 3240498 | 5/1984 |
| DE | 3248511 | 7/1984 |
| DE | 3433671 | 3/1985 |
| DE | 3515116 | 10/1986 |
| DE | 3528220 | 2/1987 |
| DE | 3535588 | 4/1987 |
| DE | 3601388 | 7/1987 |
| DE | 3637165 | 5/1988 |
| DE | 3636946 | 6/1988 |
| DE | 3642196 | 6/1988 |
| DE | 3734066 | 4/1989 |
| DE | 3737395 | 5/1989 |
| DE | 3838365 | 6/1989 |
| DE | 3833022 | 4/1990 |
| DE | 3839512 | 5/1990 |
| DE | 3839513 | 5/1990 |
| DE | 3937576 | 5/1990 |
| DE | 3840425 | 6/1990 |
| DE | 3844364 | 7/1990 |
| DE | 9010196 | 10/1990 |
| DE | 4015927 | 11/1990 |
| DE | 3932216 | 4/1991 |
| DE | 4007646 | 9/1991 |
| DE | 4107965 | 9/1991 |
| DE | 4111993 | 10/1991 |
| DE | 4015959 | 11/1991 |
| DE | 4116255 | 12/1991 |
| DE | 4023952 | 2/1992 |
| DE | 4130010 | 3/1992 |
| DE | 4032927 | 4/1992 |
| DE | 4133882 | 4/1992 |
| DE | 4035956 | 5/1992 |
| DE | 4122531 | 1/1993 |
| DE | 4124654 | 1/1993 |
| DE | 4137551 | 3/1993 |
| DE | 4136427 | 5/1993 |
| DE | 4300941 | 7/1993 |
| DE | 4206142 | 9/1993 |
| DE | 4214223 | 11/1993 |
| DE | 4231137 | 2/1994 |
| DE | 4328304 | 3/1994 |
| DE | 4328902 | 3/1994 |
| DE | 4332612 | 4/1994 |
| DE | 4238599 | 6/1994 |
| DE | 4337756 | 6/1994 |
| DE | 4344485 | 6/1994 |
| DE | 4304005 | 8/1994 |
| DE | 4332836 | 9/1994 |
| DE | 4407082 | 9/1994 |
| DE | 4407757 | 9/1994 |
| DE | 4411179 | 10/1994 |
| DE | 4412669 | 10/1994 |
| DE | 4418122 | 12/1994 |
| DE | 4423966 | 1/1995 |
| DE | 4336288 | 3/1995 |
| DE | 4428069 | 3/1995 |
| DE | 4434698 | 3/1995 |
| DE | 4341409 | 6/1995 |
| DE | 4446452 | 6/1995 |
| DE | 69107283 | 7/1995 |
| DE | 4403937 | 8/1995 |
| DE | 19505487 | 9/1995 |
| DE | 19518978 | 11/1995 |
| DE | 4480341 | 3/1996 |
| DE | 069302975 | 12/1996 |
| DE | 29703084 | 6/1997 |
| DE | 29805142 | 6/1998 |
| DE | 19755008 | 7/1999 |
| DE | 19829162 | 1/2000 |
| DE | 10237554 | 3/2004 |
| DE | 000010251949 | 5/2004 |
| DE | 19530617 | 2/2009 |
| EP | 0048492 | 3/1982 |
| EP | 0049722 | 4/1982 |
| EP | 0072406 | 2/1983 |
| EP | 0176615 | 4/1986 |
| EP | 0202460 | 11/1986 |
| EP | 0169734 | 10/1989 |
| EP | 0340735 | 11/1989 |
| EP | 0341985 | 11/1989 |
| EP | 0348691 | 1/1990 |
| EP | 0353200 | 1/1990 |
| EP | 0354561 | 2/1990 |
| EP | 0360880 | 4/1990 |
| EP | 0361914 | 4/1990 |
| EP | 0387817 | 9/1990 |
| EP | 0527665 | 2/1991 |
| EP | 0426503 | 5/1991 |
| EP | 0433538 | 6/1991 |
| EP | 0450553 | 10/1991 |
| EP | 0454516 | 10/1991 |
| EP | 0455524 | 11/1991 |
| EP | 0459433 | 12/1991 |
| EP | 473866 | 3/1992 |
| EP | 0477986 | 4/1992 |
| EP | 0479271 | 4/1992 |
| EP | 0487100 | 5/1992 |
| EP | 0487465 | 5/1992 |
| EP | 0492591 | 7/1992 |
| EP | 0495508 | 7/1992 |
| EP | 0496411 | 7/1992 |
| EP | 0501345 | 9/1992 |
| EP | 0505237 | 9/1992 |
| EP | 0513476 | 11/1992 |
| EP | 0514343 | 11/1992 |
| EP | 529346 | 3/1993 |
| EP | 0532379 | 3/1993 |
| EP | 0533508 | 3/1993 |
| EP | 0550397 | 7/1993 |
| EP | 0558027 | 9/1993 |
| EP | 0564858 | 10/1993 |
| EP | 0567059 | 10/1993 |
| EP | 0582236 | 2/1994 |
| EP | 0586857 | 3/1994 |
| EP | 0588815 | 3/1994 |
| EP | 0590588 | 4/1994 |
| EP | 0591743 | 4/1994 |
| EP | 0602962 | 6/1994 |
| EP | 0605045 | 7/1994 |
| EP | 0606586 | 7/1994 |
| EP | 0617296 | 9/1994 |
| EP | 0626654 | 11/1994 |
| EP | 0640903 | 3/1995 |
| EP | 0642950 | 3/1995 |
| EP | 0654392 | 5/1995 |
| EP | 0667708 | 8/1995 |
| EP | 0677428 | 10/1995 |
| EP | 0686865 | 12/1995 |
| EP | 0687594 | 12/1995 |
| EP | 0697641 | 2/1996 |
| EP | 733252 | 9/1996 |
| EP | 0756968 | 2/1997 |
| EP | 0788947 | 8/1997 |
| EP | 0487332 | 10/1997 |
| EP | 0874331 | 10/1998 |
| EP | 0889801 | 1/1999 |
| EP | 0893308 | 1/1999 |
| EP | 0899157 | 3/1999 |
| EP | 0913751 | 5/1999 |
| EP | 0949818 | 10/1999 |
| EP | 1022903 | 7/2000 |
| EP | 1257971 | 11/2000 |
| EP | 1058220 | 12/2000 |
| EP | 1065642 | 1/2001 |
| EP | 1074430 | 2/2001 |
| EP | 1115250 | 7/2001 |
| EP | 0830267 | 12/2001 |
| EP | 1170173 | 1/2002 |
| EP | 1236126 | 9/2002 |
| EP | 0860325 | 11/2002 |
| EP | 1359557 | 11/2003 |
| EP | 1727089 | 11/2006 |
| EP | 1748644 | 1/2007 |

(56) References Cited

FOREIGN PATENT DOCUMENTS

| | | |
|---|---|---|
| EP | 1754179 | 2/2007 |
| EP | 1790541 | 5/2007 |
| EP | 1806595 | 7/2007 |
| EP | 1837803 | 9/2007 |
| EP | 1887492 | 2/2008 |
| EP | 1741079 | 5/2008 |
| EP | 1930863 | 6/2008 |
| EP | 1978484 | 10/2008 |
| EP | 2068269 | 6/2009 |
| EP | 2101258 | 9/2009 |
| EP | 2131278 | 12/2009 |
| EP | 2150437 | 2/2010 |
| EP | 2172873 | 4/2010 |
| EP | 2187316 | 5/2010 |
| EP | 2365441 | 9/2011 |
| EP | 2377094 | 10/2011 |
| EP | 2383679 | 11/2011 |
| EP | 2383713 | 11/2011 |
| EP | 2395472 | 12/2011 |
| EP | 2431917 | 3/2012 |
| EP | 2448251 | 5/2012 |
| EP | 2463843 | 6/2012 |
| EP | 2602741 | 6/2013 |
| EP | 2605185 | 6/2013 |
| EP | 2629242 | 8/2013 |
| EP | 2674323 | 12/2013 |
| EP | 2690548 | 1/2014 |
| EP | 2709020 | 3/2014 |
| EP | 2728462 | 5/2014 |
| ES | 2250218 | 4/2006 |
| FR | 2610401 | 8/1988 |
| FR | 2641237 | 7/1990 |
| FR | 2646383 | 11/1990 |
| FR | 2674201 | 9/1992 |
| FR | 2674354 | 9/1992 |
| FR | 2687000 | 8/1993 |
| FR | 2706211 | 12/1994 |
| FR | 2721872 | 1/1996 |
| GB | 914827 | 1/1963 |
| GB | 1000265 | 8/1965 |
| GB | 1008411 | 10/1965 |
| GB | 1054064 | 1/1967 |
| GB | 1098608 | 1/1968 |
| GB | 1098610 | 1/1968 |
| GB | 1106339 | 3/1968 |
| GB | 1178416 | 1/1970 |
| GB | 1197710 | 7/1970 |
| GB | 2210835 | 6/1989 |
| GB | 2233530 | 1/1991 |
| GB | 2255649 | 11/1992 |
| GB | 2261339 | 5/1993 |
| GB | 2262829 | 6/1993 |
| GB | 9310728 | 7/1993 |
| GB | 2267341 | 12/1993 |
| GB | 2271139 | 4/1994 |
| GB | 2275452 | 8/1994 |
| GB | 2280810 | 2/1995 |
| GB | 2289332 | 11/1995 |
| IE | 970014 | 7/1998 |
| JP | S5539843 | 3/1980 |
| JP | 55156901 | 12/1980 |
| JP | S5685110 | 7/1981 |
| JP | S5871230 | 4/1983 |
| JP | 58110334 | 6/1983 |
| JP | 58122421 | 7/1983 |
| JP | 59114139 | 7/1984 |
| JP | 59127200 | 7/1984 |
| JP | S6047737 | 3/1985 |
| JP | 6079889 | 5/1985 |
| JP | 6080953 | 5/1985 |
| JP | S6078312 | 5/1985 |
| JP | S60206746 | 10/1985 |
| JP | 60240545 | 11/1985 |
| JP | S60219133 | 11/1985 |
| JP | S60255537 | 12/1985 |
| JP | S6141929 | 2/1986 |
| JP | S6185238 | 4/1986 |
| JP | S61105245 | 5/1986 |
| JP | S61191937 | 8/1986 |
| JP | 61260217 | 11/1986 |
| JP | S61285151 | 12/1986 |
| JP | S61285152 | 12/1986 |
| JP | 62001652 | 1/1987 |
| JP | S6221010 | 1/1987 |
| JP | S6226141 | 2/1987 |
| JP | 62080143 | 4/1987 |
| JP | S6216073 | 4/1987 |
| JP | 6272245 | 5/1987 |
| JP | S62115600 | 5/1987 |
| JP | 62131837 | 6/1987 |
| JP | S62253543 | 11/1987 |
| JP | S62253546 | 11/1987 |
| JP | S62287164 | 12/1987 |
| JP | 63011446 | 1/1988 |
| JP | 63258236 | 10/1988 |
| JP | 63258237 | 10/1988 |
| JP | 63192788 U | 12/1988 |
| JP | 6414700 | 1/1989 |
| JP | 01123587 | 5/1989 |
| JP | H1168538 | 7/1989 |
| JP | 01242917 | 9/1989 |
| JP | H01233129 | 9/1989 |
| JP | H01265400 | 10/1989 |
| JP | H01275237 | 11/1989 |
| JP | H0268237 | 3/1990 |
| JP | 02190978 | 7/1990 |
| JP | H236417 | 8/1990 |
| JP | H02212232 | 8/1990 |
| JP | H2117935 | 9/1990 |
| JP | H0314739 | 1/1991 |
| JP | H0374231 | 3/1991 |
| JP | 03099952 | 4/1991 |
| JP | 03266739 | 5/1991 |
| JP | H03246413 | 11/1991 |
| JP | H05137144 | 11/1991 |
| JP | 03282707 | 12/1991 |
| JP | 03282709 | 12/1991 |
| JP | 03286399 | 12/1991 |
| JP | H03273953 | 12/1991 |
| JP | H042909 | 1/1992 |
| JP | H0410200 | 1/1992 |
| JP | 04114587 | 4/1992 |
| JP | 04127280 | 4/1992 |
| JP | 04137014 | 5/1992 |
| JP | H04137112 | 5/1992 |
| JP | H04194827 | 7/1992 |
| JP | 04239400 | 8/1992 |
| JP | 04242391 | 8/1992 |
| JP | H04238219 | 8/1992 |
| JP | 04250786 | 9/1992 |
| JP | 04291405 | 10/1992 |
| JP | H04303047 | 10/1992 |
| JP | H0516722 | 1/1993 |
| JP | H0538977 | 2/1993 |
| JP | H06229759 | 2/1993 |
| JP | 0577657 | 3/1993 |
| JP | 05050883 | 3/1993 |
| JP | H06332370 | 5/1993 |
| JP | H05155287 | 6/1993 |
| JP | 05189694 | 7/1993 |
| JP | H05172638 | 7/1993 |
| JP | 05213113 | 8/1993 |
| JP | H05201298 | 8/1993 |
| JP | 05244596 | 9/1993 |
| JP | H05229383 | 9/1993 |
| JP | 05298594 | 11/1993 |
| JP | 05313736 | 11/1993 |
| JP | H05297141 | 11/1993 |
| JP | 06048247 | 2/1994 |
| JP | H0640286 | 2/1994 |
| JP | 06076200 | 3/1994 |
| JP | H0672234 | 3/1994 |
| JP | 06107035 | 4/1994 |
| JP | 06113215 | 4/1994 |

(56) References Cited

FOREIGN PATENT DOCUMENTS

| | | |
|---|---|---|
| JP | 06117924 | 4/1994 |
| JP | 06150198 | 5/1994 |
| JP | H06162398 | 6/1994 |
| JP | H06174845 | 6/1994 |
| JP | H06191344 | 7/1994 |
| JP | 06215291 | 8/1994 |
| JP | 6227318 | 8/1994 |
| JP | 06230115 | 8/1994 |
| JP | H06229739 | 8/1994 |
| JP | 06247246 | 9/1994 |
| JP | 6266825 | 9/1994 |
| JP | 06267304 | 9/1994 |
| JP | 06270733 | 9/1994 |
| JP | 06274626 | 9/1994 |
| JP | 06276524 | 9/1994 |
| JP | H06262963 | 9/1994 |
| JP | H06267303 | 9/1994 |
| JP | H06275104 | 9/1994 |
| JP | 06295601 | 10/1994 |
| JP | H06289138 | 10/1994 |
| JP | H06293236 | 10/1994 |
| JP | 05093981 | 11/1994 |
| JP | 06310740 | 11/1994 |
| JP | 06321007 | 11/1994 |
| JP | H06321010 | 11/1994 |
| JP | H06324144 | 11/1994 |
| JP | 06337938 | 12/1994 |
| JP | 06341821 | 12/1994 |
| JP | 07002021 | 1/1995 |
| JP | 07004170 | 1/1995 |
| JP | 07025286 | 1/1995 |
| JP | H072022 A | 1/1995 |
| JP | 732936 | 2/1995 |
| JP | 07032935 | 2/1995 |
| JP | 07047878 | 2/1995 |
| JP | 07052706 | 2/1995 |
| JP | H0737180 | 2/1995 |
| JP | H0740782 | 2/1995 |
| JP | H0746460 | 2/1995 |
| JP | 07069125 | 3/1995 |
| JP | 07078240 | 3/1995 |
| JP | H0764632 | 3/1995 |
| JP | H0771916 | 3/1995 |
| JP | H07057200 | 3/1995 |
| JP | H07078258 | 3/1995 |
| JP | 07105496 | 4/1995 |
| JP | H07101291 | 4/1995 |
| JP | H07105487 | 4/1995 |
| JP | H07108873 | 4/1995 |
| JP | H07108874 | 4/1995 |
| JP | 07125571 | 5/1995 |
| JP | 07137574 | 5/1995 |
| JP | H07125570 | 5/1995 |
| JP | H730149 | 6/1995 |
| JP | H07141588 | 6/1995 |
| JP | H07144577 | 6/1995 |
| JP | 07186818 | 7/1995 |
| JP | 07192192 | 7/1995 |
| JP | 06000927 | 8/1995 |
| JP | 07242147 | 9/1995 |
| JP | H07239714 | 9/1995 |
| JP | H07249128 | 9/1995 |
| JP | H07280563 | 10/1995 |
| JP | H07315122 | 12/1995 |
| JP | H0840138 | 2/1996 |
| JP | H0840140 | 2/1996 |
| JP | H0843082 | 2/1996 |
| JP | H0844999 | 2/1996 |
| JP | H0850697 | 2/1996 |
| JP | H08138036 | 5/1996 |
| JP | 08166221 | 6/1996 |
| JP | 08235484 | 9/1996 |
| JP | H08320997 | 12/1996 |
| JP | 02630604 | 4/1997 |
| JP | H0991596 | 4/1997 |
| JP | 09330415 | 12/1997 |
| JP | 10038562 | 2/1998 |
| JP | 10063985 | 3/1998 |
| JP | H1090188 | 4/1998 |
| JP | 10134183 | 5/1998 |
| JP | 10171966 | 6/1998 |
| JP | H10222792 | 8/1998 |
| JP | 10261189 | 9/1998 |
| JP | 11069211 | 3/1999 |
| JP | 11078737 | 3/1999 |
| JP | H1178693 | 3/1999 |
| JP | H1178717 | 3/1999 |
| JP | H1123305 | 7/1999 |
| JP | 11250228 | 9/1999 |
| JP | H11259634 | 9/1999 |
| JP | 11345392 | 12/1999 |
| JP | 2000016352 | 1/2000 |
| JP | 2000085474 | 3/2000 |
| JP | 2000113374 | 4/2000 |
| JP | 2000127849 | 5/2000 |
| JP | 2000207575 | 7/2000 |
| JP | 2000215299 | 8/2000 |
| JP | 2000305136 | 11/2000 |
| JP | 2000311289 | 11/2000 |
| JP | 2001001832 | 1/2001 |
| JP | 2001092970 | 4/2001 |
| JP | 2001180401 | 7/2001 |
| JP | 2001188988 | 7/2001 |
| JP | 2001297397 | 10/2001 |
| JP | 2001351107 | 12/2001 |
| JP | 2002022439 | 1/2002 |
| JP | 2002046506 | 2/2002 |
| JP | 2002074339 | 3/2002 |
| JP | 2002079895 | 3/2002 |
| JP | 2002084533 | 3/2002 |
| JP | 2002099908 | 4/2002 |
| JP | 2002109699 | 4/2002 |
| JP | 2002175534 | 6/2002 |
| JP | 2002211428 | 7/2002 |
| JP | 2002341432 | 11/2002 |
| JP | 2003030665 | 1/2003 |
| JP | 2003076987 | 3/2003 |
| JP | 2003083742 | 3/2003 |
| JP | 3395289 | 4/2003 |
| JP | 2003123058 | 4/2003 |
| JP | 2003150938 | 5/2003 |
| JP | 2003168197 | 6/2003 |
| JP | 2003178397 | 6/2003 |
| JP | 2003217099 | 7/2003 |
| JP | 2003248895 | 9/2003 |
| JP | 2003259361 | 9/2003 |
| JP | 2003281700 | 10/2003 |
| JP | 20041658 | 1/2004 |
| JP | 2004032460 | 1/2004 |
| JP | 2004146904 | 5/2004 |
| JP | 2004336613 | 11/2004 |
| JP | 2004355139 | 12/2004 |
| JP | 2005182158 | 7/2005 |
| KR | 2000883510000 | 3/1995 |
| KR | 1020010018981 | 10/2002 |
| KR | 1004124340000 | 3/2004 |
| SE | 336535 | 7/1971 |
| WO | WO1986005147 | 9/1986 |
| WO | WO1988009023 | 11/1988 |
| WO | WO1990004528 | 5/1990 |
| WO | WO1993000647 | 1/1993 |
| WO | WO1993004556 | 3/1993 |
| WO | WO1993010550 | 5/1993 |
| WO | WO1993011631 | 6/1993 |
| WO | WO1993021596 | 10/1993 |
| WO | WO1994019212 | 9/1994 |
| WO | WO1995018979 | 7/1995 |
| WO | WO1995023082 | 8/1995 |
| WO | WO1996002817 | 2/1996 |
| WO | WO1996015921 | 5/1996 |
| WO | WO1996018275 | 6/1996 |
| WO | WO1996021581 | 7/1996 |
| WO | WO1996034365 | 10/1996 |
| WO | WO1996038319 | 12/1996 |

(56) References Cited

FOREIGN PATENT DOCUMENTS

| WO | WO1997001246 | 1/1997 |
|---|---|---|
| WO | WO1997029926 | 8/1997 |
| WO | WO1997035743 | 10/1997 |
| WO | WO1997048134 | 12/1997 |
| WO | WO1998010246 | 3/1998 |
| WO | WO1998014974 | 4/1998 |
| WO | WO1999043242 | 2/1999 |
| WO | WO1999023828 | 5/1999 |
| WO | WO1999059100 | 11/1999 |
| WO | WO2000015462 | 3/2000 |
| WO | WO2001026332 | 4/2001 |
| WO | WO2001039018 | 5/2001 |
| WO | WO2001039120 | 5/2001 |
| WO | WO2001064481 | 9/2001 |
| WO | WO2001070538 | 9/2001 |
| WO | WO2001077763 | 10/2001 |
| WO | WO2001080068 | 10/2001 |
| WO | WO2001080353 | 10/2001 |
| WO | WO2002071487 | 9/2002 |
| WO | WO2003065084 | 8/2003 |
| WO | WO2003093857 | 11/2003 |
| WO | WO2004004320 | 1/2004 |
| WO | WO2004005073 | 1/2004 |
| WO | WO2005098751 | 10/2005 |
| WO | WO2005098782 | 10/2005 |
| WO | WO2008134715 | 11/2008 |
| WO | WO2013121357 | 8/2013 |

OTHER PUBLICATIONS

"Final Report of the Working Group on Advanced Vehicle Control Systems (AVCS)" Mobility 2000, Mar. 1990.
"How does an image intensifier work?" accessed at http://www.nightvision.nl/faq-reader/how-does-an-imageintensifier-work.html.
"Image intensified CCD high speed cameras," Stanford Computer Optics, Inc., accessed at http://www.stanfordcomputeroptics.com/technology/iccd-systemoverview.html.
"Magic Eye on safety", Western Daily Press, Oct. 10, 1991.
"On-screen technology aims at safer driving", Kent Evening Post Oct. 4, 1991.
"Versatile LEDs Drive Machine vision in Automated Manufacture," http://www.digikey.ca/en/articles/techzone/2012/jan/versatileleds-drive-machine-vision-in-automated-manufacture.
3M, "Automotive Rear View Mirror Button Repair System", Automotive Engineered Systems Division, Jun. 1996.
Abshire et al., "Confession Session: Learning from Others Mistakes," 2011 IEEE International Symposium on Circuits and Systems (ISCAS), 2011.
Achler et al., "Vehicle Wheel Detector using 2D Filter Banks," IEEE Intelligent Vehicles Symposium of Jun. 2004.
Ackland et al., "Camera on a chip", Digest of Technical Papers of the 42nd Solid-State Circuits Conference (ISSCC), Paper TA 1.2, 1996.
Alley, "Algorithms for automatic guided vehicle navigation and guidance based on Linear Image Array sensor data", Masters or PhD. Thesis, Dec. 31, 1988.
Altan, "LaneTrak: a vision-based automatic vehicle steering system", Applications in Optical Science and Engineering. International Society for Optics and Photonics, 1993, Abstract.
Amidi, "Integrated Mobile Robot Control", M.S. Thesis, Carnegie Mellon University, May 1990.
An et al., "Aspects of Neural Networks in Intelligent Collision Avoidance Systems for Prometheus", JFIT 93, pp. 129-135, Mar. 1993.
Arain et al., "Action planning for the collision avoidance system using neural networks", Intelligent Vehicle Symposium, Tokyo, Japan, Jul. 1993.
Arain et al., "Application of Neural Networks for Traffic Scenario Identification", 4th Prometheus Workshop, University of Compiegne, Paris, France, pp. 102-111, Sep. 1990.

Ashley, "Smart Cars and Automated Highways", Mechanical Engineering 120.5 (1998): 58, Abstract.
Aufrere et al., "A model-driven approach for real-time road recognition", Machine Vision and Applications 13, 2001, pp. 95-107.
Auty et al., "Image acquisition system for traffic monitoring applications" IS&T/SPIE's Symposium on Electronic Imaging: Science & Technology. International Society for Optics and Photonics, Mar. 14, 1995.
Aw et al., "A 128×128 Pixel Standard-CMOS Image Sensor with Electronic Shutter," IEEE Journal of Solid-State Circuits, vol. 31, No. 12, Dec. 1996.
Ballard et al., "Computer Vision", 1982, p. 88-89, sect. 3.4.1.
Barron et al., "The role of electronic controls for future automotive mechatronic systems", IEEE/ASME Transactions on mechatronics 1.1, Mar. 1996, pp. 80-88.
Batavia et al., "Overtaking vehicle detection using implicit optical flow", Proceedings of the IEEE Transportation Systems Conference, Nov., 1997, pp. 729-734.
Batavia, "Driver-Adaptive Lane Departure Warning Systems", The Robotics Institute Carnegie Mellon University Pittsburgh, Pennsylvania, 15213, Sep. 20, 1999.
Bederson, "A miniature Space-Variant Active Vision System: Cortex-I", Masters or Ph.D. Thesis, Jun. 10, 1992.
Begault, "Head-Up Auditory Displays for Traffic Collision Avoidance System Advisories: A Preliminary Investigation", Human Factors, 35(4), Dec. 1993, pp. 707-717.
Behringer et al., "Simultaneous Estimation of Pitch Angle and Lane Width from the Video Image of a Marked Road," pp. 966-973, Sep. 12-16, 1994.
Behringer, "Road recognition from multifocal vision", Intelligent Vehicles' 94 Symposium, Proceedings of the. IEEE, 1994, Abstract.
Belt et al., "See-Through Turret Visualization Program", No. NATICK/TR-02/005. Honeywell Inc., Minn, MN Sensors and Guidance Products, 2002.
Bensrhair et al., "A cooperative approach to vision-based vehicle detection" Intelligent Transportation Systems, IEEE, 2001.
Bertozzi et al., "Obstacle and lane detection on ARGO", IEEE Transactions on Image Processing, 7(1):62-81, Jan. 1998, pp. 62-81.
Bertozzi et al., "Performance analysis of a low-cost solution to vision-based obstacle detection", Intelligent Transportation Systems, 1999. Proc., Oct. 5-8, 1999, pp. 350-355.
Bertozzi et al., "Vision-based intelligent vehicles: State of the art and perspectives" Robotics and Autonomous Systems, 32, 2000 pp. 1-16.
Bertozzi et al., "GOLD: a parallel real-time stereo vision system for generic obstacle and lane detection", IEEE transactions on image processing 7.1 (1998): 62-81.
Betke et al., "Real-time multiple vehicle detection and tracking from a moving vehicle", Machine Vision and Applications, 2000.
Beucher et al., "Road Segmentation and Obstacle Detection by a Fast Watershed Transformation", Intelligent Vehicles' 94 Symposium, Proceedings of the. IEEE, 1994.
Blomberg et al., "NightRider Thermal Imaging Camera and HUD Development Program for Collision Avoidance Applications", Raytheon Commercial Infrared and ELCAN—Texas Optical Technologies, 2000, Abstract.
Borenstein et al., "Where am I? Sensors and Method for Mobile Robot Positioning", University of Michigan, Apr. 1996, pp. 2, 125-128.
Bosch, "CAN Specification", Version 2.0, Sep. 1991.
Bow, "Pattern Recognition and Image Preprocessing (Signal Processing and Communications)", CRC Press, Jan. 15, 2002, pp. 557-559.
Brackstone et al., "Dynamic Behavioral Data Collection Using an Instrumented Vehicle", Transportation Research Record: Journal of the Transportation Research Board, vol. 1689, Paper 99-2535, 1999.
Brandt, "A CRT Display System for a Concept Vehicle", SAE Paper No. 890283, published Feb. 1, 1989.
Brauckmann et al., "Towards all around automatic visual obstacle sensing for cars", Intelligent Vehicles' 94 Symposium, Proceedings of the. IEEE, 1994.
Britell et al., "Collision avoidance through improved communication between tractor and trailer" Proceedings: International Tech-

(56) References Cited

OTHER PUBLICATIONS nical Conference on the Enhanced Safety of Vehicles. vol. 1998. National Highway Traffic Safety Administration, 1998.
Broggi et al., "ARGO and the MilleMiglia in Automatico Tour", IEEE Intelligent Systems, Jan.-Feb. 1999, pp. 55-64.
Broggi et al., "Architectural Issues on Vision-based automatic vehicle guidance: The experience of the ARGO Project", Academic Press, 2000.
Broggi et al., "Automatic Vehicle Guidance: The Experience of the ARGO Vehicle", World Scientific Publishing Co., 1999.
Broggi et al., "Multi-Resolution Vehicle Detection using Artificial Vision," IEEE Intelligent Vehicles Symposium of Jun. 14-17, 2004.
Broggi et al., "Vision-based Road Detection in Automotive Systems: A real-time expectation-driven approach", Journal of Artificial Intelligence Research, 1995.
Broggi, "Robust Real-time Lane and Road Detection in Critical Shadow Conditions", International Symposium on Computer Vision, IEEE, 1995, pp. 21-23.
Brown, "A Survey of Image Registration Techniques", vol. 24, ACM Computing Surveys, pp. 325-376, Dec. 4, 1992.
Brown, "Scene Segmentation and Definition for Autonomous Robotic Navigation Using Structured Light Processing", Doctoral Dissertation, University of Delaware, Army Science Conference Proceedings, Jun. 22-25, 1992, vol. 1, Dec. 31, 1988, pp. 189-203, Abstract.
Brunelli et al., "Template Matching: Matched Spatial Filters and Beyond," Pattern Recognition, vol. 30, No. 5, 1997.
Bucher et al., "Image processing and behavior planning for intelligent vehicles", IEEE Transactions on Industrial electronics 50.1 (2003): 62-75.
Burger et al., "Estimating 3-D Egomotion from Perspective Image Sequences", IEEE Transactions on Pattern Analysis and Machine Intelligence, vol. 12, No. 11, pp. 1040-1058, Nov. 1990.
Burt et al., "A Multiresolution Spline with Application to Image Mosaics", ACM Transactions on Graphics, vol. 2. No. 4, pp. 217-236, Oct. 1983.
Cardiles, "Implementation de la commande d'un vehicule electrique autonome grace a un capteur de distance et d'angle base sur une camera lineaire" IUP de Mathematiques Appliquees et Industrielles, May 8, 1998.
Carley et al., "Synthesis Tools for Mixed-Signal ICs: Progress on Frontend and Backend Strategies," Proceedings of the 33rd Design Automation Conference, 1996.
Cartledge, "Jaguar gives cat more lives", Birmingham Post, Oct. 10, 1991.
Cassiano et al., "Review of filtering methods in mobile vision from ground vehicles in low light conditions", Proc. SPIE 1613, Mobile Robots VI, 322, Feb. 14, 1992.
Chapuis et al., "Road Detection and Vehicles Tracking by Vision for an On-Board ACC System in the VELAC Vehicle", 2000.
Charkari et al., "A new approach for real time moving vehicle detection", Proceedings of the 1993 IEEE/RSJ International Conference on Intelligent Robots and Systems, Yokohama, JP, Jul. 26-30, 1993.
Chern et al., "The lane recognition and vehicle detection at night for a camera-assisted car on highway", Robotics and Automation, 2003. Proceedings. ICRA'03. IEEE International Conference on. vol. 2. IEEE, 2003, Abstract.
Chien et al., "Efficient moving object segmentation algorithm using background registration technique", IEEE Transactions on Circuits and Systems for Video Technology, vol. 12., No. 7, Jul. 2002.
Clune et al., "Implementation and performance of a complex vision system on a systolic array machine", Carnegie Mellon University, Jun. 15, 1987.
CMOS sensor page of University of Edinburgh, 2015.
Coghill, "Digital Imaging Technology 101", Albert Theuwissen, Dalsa Corp, 2003.
Coifman et al., "A real-time computer vision system for vehicle tracking and traffic surveillance", Transportation Research Part C 6, pp. 271-288, 1998.

Corsi, "Reconfigurable Displays Used as Primary Automotive Instrumentation", SAE Paper No. 890282, published Feb. 1, 1989.
Crisman et al., "Color Vision for Road Following", Robotics Institute at Carnegie Mellon University, Proceedings of SPIE Conference on Mobile Robots Nov. 11, 1988, pp. 1-10, Oct. 12, 1988.
Crisman et al., "UNSCARF, A Color Vision System for the Detection of Unstructured Roads" IEEE Paper 1991.
Crisman et al., "Vision and Navigation—The Carnegie Mellon Navlab" Carnegie Mellon University, edited by Charles E. Thorpe, 1990.
Crisman, "SCARF: Color vision system that tracks roads and intersections", IEEE, 1993.
Crossland, "Beyond Enforcement: In-Car Video Keeps Officers on the Streets", Traffic technology international. Annual review, 1998, Abstract.
Cucchiara et al., "Vehicle Detection under Day and Night Illumination", Proceedings of 3rd International ICSC Symposium on Intelligent Industrial Automation (IIA 99), 1999.
Cucchiara et al., "Detecting moving objects, ghosts, and shadows in video streams", IEEE Transactions on Pattern Analysis and Machine Intelligence, vol. 25, No. 10, 2003.
Cucchiara et al., "Improving Shadow Suppression in Moving Object Detection with HSV Color Information", Proceeding of IEEE International Conference on Intelligent Transportation Systems, 2001.
Curry et al., "The Lancashire telemedicine ambulance", Journal of Telemedicine and telecare 4.4 (1998): 231-238, Dec. 1, 1998, Abstract.
Dagan et al., "Forward collision warning with a single camera", IEEE Intelligent Vehicles Symposium, 2004.
Dally et al., "Digital Systems Engineering", The University of Cambridge, United Kingdom, 1998.
Davis et al., "Road Boundary Detection for Autonomous Vehicle Navigation", Optical Engineering, vol. 25, No. 3, Mar. 1986, pp. 409-414.
Davis, "Vision-Based Navigation for Autonomous Ground Vehicles" Defense Advanced Research Projects Agency, Jul. 18, 1988.
De la Escalera et al., "Neural traffic sign recognition for autonomous vehicles" IEEE, 1994.
De la Escalera et al., "Traffic sign recognition and analysis for intelligent vehicles", Division of Systems Engineering and Automation, Madrid, Spain, 2003.
Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Pat. No. 5,837,994, issued to Stam et al.
DeFauw, "A System for Small Target Detection, Tracking, and Classification, Intelligent Transportation System", Intelligent Transportation Systems, 1999. Proceedings. 1999 IEEE/IEEJ/JSAI International Conference on. IEEE, 1999, Abstract.
Denes et al., "Assessment of driver vision enhancement technologies," Proceedings of SPIE: Collision Avoidance and Automated Traffic Management Sensors, vol. 2592, Oct. 1995.
DeNuto et al., "LIN Bus and its Potential for use in Distributed Multiplex Applications", SAE Technical Paper 2001-01-0072, Mar. 5-8, 2001.
Denyer et al., "On-Chip CMOS Sensors for VLSI Imaging Systems", Dept. of Elect. Engineering, University of Edinburgh, pp. 4b1.1-4b1.5, 1991.
Dérutin et al., "Real-time collision avoidance at road-crossings on board the Prometheus-ProLab 2 vehicle", Intelligent Vehicles' 94 Symposium, Proceedings of the. IEEE, 1994, Abstract.
Devlin, "The Eyellipse and Considerations in the Driver's Forward Field of View," Society of Automotive Engineers, Inc., Detroit, MI, Jan. 8-12, 1968.
Dickinson et al., "CMOS Digital Camera with Parallel Analog-to-Digital Conversion Architecture", Apr. 1995.
Dickmanns et al., "A Curvature-based Scheme for Improving Road Vehicle Guidance by Computer Vision," University of Bundeswehr München, 1986.

(56) References Cited

OTHER PUBLICATIONS

Dickmanns et al., "Recursive 3-D road and relative ego-state recognition," IEEE Transactions on Pattern Analysis and Machine Intelligence, vol. 14, No. 2, Feb. 1992.
Dickmanns et al., "An integrated spatio-temporal approach to automatic visual guidance of autonomous vehicles," IEEE Transactions on Systems, Man, and Cybernetics, vol. 20, No. 6, Nov./Dec. 1990.
Dickmanns, "Vehicles Capable of Dynamic Vision", Aug. 23, 1997.
Dickmanns, "4-D dynamic vision for intelligent motion control", Universitat der Bundeswehr Munich, 1991.
Dickmanns et al., "The seeing passenger car 'VaMoRs-P'", Oct. 24, 1994.
Dingus et al., "TRAVTEK Evaluation Task C3—Camera Car Study" Final Report/ 9-92 to 5-94. Jun. 1995.
Donnelly Panoramic Vision™ on Renault Talisman Concept Car at Frankfort Motor Show, PR Newswire, Frankfort, Germany Sep. 10, 2001.
Doudoumopoulos et al., "CMOS Active Pixel Sensor Technology for High Performance Machine Vision Applications," SME Applied Machine Vision '96—Emerging Smart Vision Sensors, Jun. 1996.
Draves, "A Video Graphics Controller for Reconfigurable Automotive Displays", No. 970193. SAE Technical Paper Feb. 24, 1997, Abstract.
Dubrovin et al., "Application of real-time lighting simulation for intelligent front-lighting studies", 2000 pp. 333-343.
Dubuisson-Jolly, "Vehicle segmentation and classification using deformable templates", IEEE Transactions on Pattern Analysis and Machine Intelligence, Mar. 1996.
Easton, "Jaguar Adapts Pilot's Night Sights for safer driving", The Times, Sep. 28, 1991.
Eaton, "Video Incident Capture System", Technical Memorandum, OIC General Enforcement Branch, Sep. 1991.
Eaton, "An RS-170 Camera for the Military Environment", Proc. SPIE 0979, Airborne Reconnaissance XII, Feb. 23, 1989, Abstract.
Eid et al., "A 256×256 CMOS Active Pixel Image Sensor," Proceedings of SPIE: Charge-Coupled Devices and Solid State Optical Sensors V, vol. 2415, 1995.
Elwell et al., "Near Infrared Spectroscopy," accessed at http://www.ucl.ac.uk/medphys/research/borl/intro/nirs, Jan. 6, 1999.
Ernst et al., "Camera calibration for lane and obstacle detection" Intelligent Transportation Systems, 1999 pp. 356-361.
Fancher et al. "Intelligent Cruise Control Field Operational Test (Final Report)", Final Report, vol. I: Technical Report, May 1998.
Fancher et al., "Fostering Development, Evaluation, and Deployment of Forward Crash Avoidance Systems (FOCAS)" Annual Research Report DOT HS 808 437, May 1995.
Ferryman et al., "Visual Surveillance for Moving Vehicles", Secure Project, 2000.
Fletcher, "CMOS light-sensor process makes possible low-cost smart machine-vision systems" Penton Media, Inc. et al., 1993.
Forsyth, "A System for Finding Changes in Colour", Oxford University, Jul. 23, 1987.
Fossum, "Active Pixel Sensors: Are CCD's dinosaurs?" Proceedings of SPIE, Charge-Coupled Devices and Solid-State Optical Sensors III, vol. 1900, 1993.
Fossum, "CMOS Active Pixel Sensor (APS) Technology for Multimedia Image Capture," 1997 Multimedia Technology & Applications Conference (MTAC97), 1997.
Fossum, "Low power camera-on-a-chip using CMOS active pixel sensor technology", 1995 Symposium on Low Power Electronics, San Jose, CA, Oct. 9-10, 1995.
Fowler et al., "A CMOS Area Image Sensor With Pixel-Level A/D Conversion," Digest of Technical Papers of the 41st Solid-State Circuits Conference (ISSCC), 2001.
Franke et al., "Autonomous driving approaches downtown", IEEE Intelligent Systems, vol. 13, Nr. 6, 1999.
French et al., "A comparison of IVHS progress in the United States, Europe, and Japan", IVHA America, Dec. 31, 1993.

Fujimori, "CMOS Passive Pixel Imager Design Techniques", Massachusetts Institute of Technology, Ph.D. Dissertation for Electrical Engineering and Computer Science, Feb. 2002.
Fung et al., "Effective moving cast shadow detection for monocular color image sequences", The 11th International Conference on Image Analysis and Processing Proceedings, Palermo, Italy, Sep. 26-28, 2001,p. 404-409.
Gat et al., "A Monocular Vision Advance Warning System for the Automotive Aftermarket", Aftermarket SAE World Congress & Exhibition, No. 2005-01-1470. SAE Technical Paper, Jan. 1, 2005.
Gavrila et al., "Real-Time Vision for Intelligent Vehicles" IEEE Instrumentation & Measurement Magazine, Jun. 2001, pp. 22-27.
Gavrila, et al., "Real-time object detection for "smart" vehicles", 1999.
Geary et al., "Passive Optical Lane Position Monitor" Idea Project Final Report Contract ITS-24, Jan. 15, 1996.
Gehrig, "Design, simulation, and implementation of a vision-based vehicle-following system" Doctoral Dissertation, Jul. 31, 2000.
GEM Muon Review Meeting—SSCL Abstract; GEM TN-03-433, Jun. 30, 1993.
Goesch et al., "The First Head Up Display Introduced by General Motors", SAE Paper No. 890288, published Feb. 1, 1989.
Goldbeck et al., "Lane detection and tracking by video sensors" Intelligent Transportation Systems, 1999. Proc., Oct. 5-8, 1999.
Graefe et al., "Dynamic Vision for Precise Depth Measurement and Robot Control", Computer Vision for Industry, Jun. 1993.
Graefe, "Vision for Intelligent Road Vehicles", Universität de Bundeswehr Müchen, 1993, pp. 135-140.
Greene et al., "Creating Raster Omnimax Images from Multiple Perspective Views Using the Elliptical Weighted Average Filter", IEEE Computer Graphics and Applications, vol. 6, No. 6, pp. 21-27, Jun. 1986.
Gruss et al., "Integrated sensor and range-finding analog signal processor", IEEE Journal of Solid-State Circuits, vol. 26, No. 3, Mar. 1991.
Gumkowski et al., "Reconfigurable Automotive Display System", SAE Paper No. 930456 to Gumkowski, published Mar. 1, 1993.
Hall, "Why I Dislike auto-Dimming Rearview Mirrors," accessed at http://blog.consumerguide.com/why-i-dislike-autodimming-rear-view-mirrors/, Dec. 21, 2012.
Hamit, "360-Degree Interactivity: New Video and Still Cameras Provide a Global Roaming Viewpoint", Advanced Imaging, Mar. 1997, p. 50.
Haritaoglu et al., "W4: Real-Time Surveillance of People and Their Activities", IEEE Transactions Patter Analysis and Machine Intelligence, vol. 22, No. 8, Aug. 2000.
Hebert et al., "3-D Vision Techniques for Autonomous Vehicles", Defense Advanced Research Projects Agency, Carnegie Mellon University, Feb. 1, 1988.
Hebert et al., "Local Perception for Mobile Robot Navigation in Natural Terrain: Two Approaches", The Robotics Institute, Carnegie Mellon University, Abstract; Workshop on Computer Vision for Space Applications, Antibes, Sep. 22,24, 1993, pp. 24-31.
Hebert, "Intelligent unmanned ground vehicles: autonomous navigation research", Carnegie Mellon (Kluwer Academic Publishers), Boston, 1997, Excerpt.
Herbert et al., "3-D Vision Techniques for Autonomous Vehicles", Technical Report, Carnegie Mellon University, Aug. 1988.
Hess et al., "A Control Theoretic Model of Driver Steering Behavior," IEEE Control Systems Magazine, vol. 10, No. 5, Aug. 1990, pp. 3-8.
Hessburg et al., "An Experimental Study on Lateral Control of a Vehicle," California Partners for Advanced Transit and Highways (PATH), Jan. 1, 1991.
Hillebrand et al., "High speed camera system using a CMOS image sensor", IEEE Intelligent Vehicles Symposium., Oct. 3-5, 1999, pp. 656-661, Abstract.
Ho et al., "Automatic spacecraft docking using computer vision-based guidance and control techniques", Journal of Guidance, Control, and Dynamics, vol. 16, No. 2 Mar.-Apr. 1993.
Hock et al., "Intelligent Navigation for Autonomous Robots Using Dynamic Vision", XVIIth ISPRS Congress, pp. 900-915, Aug. 14, 1992.

(56) References Cited

OTHER PUBLICATIONS

Holst, "CCD Arrays, Cameras, and Displays", Second Edition, Bellingham, WA: SPIE Optical Engineering Press, 1998; pp. v-xxiii, 7-12, 45-101, and 176-179, excerpts.

Honda Worldwide, "Honda Announces a Full Model Change for the Inspire." Jun. 18, 2003.

Horprasert et al., "A Statistical Approach for Real-Time Robust Background Subtraction and Shadow Detection", Proceeding of IEEE International Conference on Computer vision Frame-Rate Workshop, 1999.

Hsieh et al., "Shadow elimination for effective moving object detection by Gaussian shadow modeling", Image and Vision Computing, vol. 21, No. 6, 505-516, 2003.

Hsieh et al., "A shadow elimination method for vehicle analysis", Proceeding of IEEE International Conference on Pattern Recognition, vol. 4, 2004.

Hu et al., "Action-based Road Horizontal Shape Recognition", SBA Controle & Automacao, vol. 10, No. 2, May 1999.

Huertgen et al., "Vehicle Environment Sensing by Video Sensors", No. 1999-01-0932. SAE Technical Paper, 1999, Abstract.

Huijsing, "Integrated smart sensors", Sensors and Actuators A, vol. 30, Issues 1-2, pp. 167-174, Jan. 1992.

Hutber et al., "Multi-sensor multi-target tracking strategies for events that become invisible" BMVC '95 Proc. of the 6th British conference on Machine vision, V2, 1995, pp. 463-472.

IEEE 100—The Authoritative Dictionary of IEEE Standards Terms, $7^{th}$ Ed. (2000).

Ientilucci, "Synthetic Simulation and Modeling of Image Intensified CCDs (IICCD)", Master Thesis for Rochester Inst. of Tech., Mar. 31, 2000.

Ishida et al., "Development of a Driver Assistance System", No. 2003-01-0279. SAE Technical Paper, 2002, Abstract.

Ishihara et al., "Interline CCD Image Sensor with an Anti Blooming Structure," IEEE International Solid-State Circuits Conference, Session XIII: Optoelectronic Circuits, THPM 13.6, Feb. 11, 1982.

Ishikawa et al., "Visual Navigation of an Autonomous Vehicle Using White Line Recognition", IEEE Transactions on Pattern Analysis and Machine Intelligence, 1988, Abst.

Jaguar Press Releases Autumn 1991 "Jaguar Displays 21st Century Car Technologies", Jaguar Communications & Public Affairs Dept.

Janssen et al., "Hybrid Approach for Traffic Sign Recognition", Program for a European Traffic with Highest Efficiency and Unprecendented Safety, Nov. 28, 1993.

Japanese Article "Television Image Engineering Handbook, The Institute of Television Engineers of Japan", Jan. 17, 1981.

Jochem et al., "PANS: a portable navigation platform", 1995 IEEE Symposium on Intelligent Vehicles, Detroit, MI, Sep. 25-26, 1995.

Jochem et al., "Life in the Fast Lane", AI Magazine, vol. 17, No. 2, pp. 11-50, Summer 1996.

Johannes, "A New Microchip Ushers in Cheaper Digital Cameras", The Wall Street Journal, Aug. 21, 1998, p. B1.

Johnson, "Georgia State Patrol's In-Car Video System", Council of State Governments, 1992, Abstract.

Juberts et al., "Development and Test Results for a Vision-Based Approach to AVCS." in Proceedings of the 26th International Symposium on Automotive Technology and Automation, Aachen, Germany, Sep. 1993, pp. 1-9.

Kakinami et al., "Autonomous Vehicle Control System Using an Image Processing Sensor", No. 950470. SAE Technical Paper, Feb. 1, 1995, Abstract.

Kan et al., "Model-based vehicle tracking from image sequences with an application to road surveillance," Purdue University, XP000630885, vol. 35, No. 6, Jun. 1996.

Kang et al., "High Dynamic Range Video", ACM Transactions on Graphics, vol. 22, No. 3, 2003.

Kassel, "Lunokhod-1 Soviet Lunar Surface Vehicle", Advanced Research Projects Agency, ARPA Order No. 189-1, Dec. 9, 1971.

Kastrinaki et al., "A survey of video processing techniques for traffic applications", Image and Computing 21, 2003.

Kehtarnavaz et al., "Traffic sign recognition in noisy outdoor scenes", 1995.

Kehtarnavaz, "Visual control of an autonomous vehicle (BART)—the vehicle-following problem", IEEE Transactions on Vehicular Technology, Aug. 31, 1991, Abstract.

Kemeny et al., "Multiresolution Image Sensor," IEEE Transactions on Circuits and Systems for Video Technology, vol. 7, No. 4, Aug. 1997.

Kenue et al., "LaneLok: Robust Line and Curve Fitting of Lane Boundaries", Applications in Optical Science and Engineering, International Society for Optics and Photonics, 1993, Abstract.

Kenue, "Lanelok: Detection of Lane Boundaries and Vehicle Tracking Using Image-Processing Techniques," SPIE Conference on Mobile Robots IV, 1989.

Kidd et al., "Speed Over Ground Measurement", SAE Technical Paper Series, No. 910272, pp. 29-36, Feb.-Mar. 1991.

Kiencke et al., "Automotive Serial controller Area Network," SAE Technical Paper 860391, 1986, retrieved from http://papers.sae.org/860391/, accessed Mar. 20, 2015.

Klassen et al., "Sensor Development for Agricultural Vehicle Guidance", No. 932427. SAE Technical Paper, 1993, Abstract.

Kluge et al., "Representation and Recovery of Road Geometry in YARF," Carnegie Mellon University, Proceedings of the IEEE, pp. 114-119, 1992.

Knipling, "IVHS Technologies Applied to Collision Avoidance: Perspectives on Six Target Crash Types and Countermeasures," Technical Paper presented at Safety & Human Factors session of 1993 IVHS America Annual Meeting, Apr. 14-17, 1993, pp. 1-22.

Knipling et al., "Vehicle-Based Drowsy Driver Detection: Current Status and Future Prospects," IVHS America Fourth Annual Meeting, Atlanta, GA, Apr. 17-20, 1994, pp. 1-24.

Koller et al., "Binocular Stereopsis and Lane Marker Flow for Vehicle Navigation: Lateral and Longitudinal Control," University of California, Mar. 24, 1994.

Kowalick, "Proactive use of highway recorded data via an event data recorder (EDR) to achieve nationwide seat belt usage in the 90th percentile by 2002" "Seat belt event data recorder (SB-EDR)"Transportation Recording: 2000 and Beyond., May 3-5, 1999, pp. 173-198, 369.

Kozlowski et al., "Comparison of Passive and Active Pixel Schemes for CMOS Visible Imagers," Proceedings of SPIE Conference on Infrared Readout Electronics IV, vol. 3360, Apr. 1998.

Krotkov, "An agile stereo camera system for flexible image acquisition", IEEE Journal on Robotics and Automation, Feb. 18, 1988.

Kuan et al., "Autonomous Robotic Vehicle Road Following", IEEE Transactions on Pattern Analysis and Machine Intelligence, vol. 10, No. 5, Sep. 1988, pp. 648-658, Abstract.

Kuehnle, "Symmetry-based recognition of vehicle rears", Pattern Recognition Letters 12, North-Holland, 1991.

Kuhnert, "A vision system for real time road and object recognition for vehicle guidance," in Proc. SPIE Mobile Robot Conf., Cambridge, MA, Oct. 1986, pp. 267-272.

Kweon et al., "Behavior-Based Intelligent Robot in Dynamic Indoor Environments", Proceedings of the 1992 IEEE/RSJ International Conference on Intelligent Robots and Systems, Jul. 7-10, 1992.

Lasky et al., "Automated Highway Systems (AHS) Classification by Vehicle and Infrastructure", AHMT Research Report, Jan. 25, 1994.

Leachtenauer, "Resolution requirements and the Johnson criteria revisited," Proceedings of SPIE, Infrared Imaging Systems: Design, Analysis, Modeling and Testing XIV, vol. 5076, 2003.

LeBlanc et al., "CAPC: A Road-Departure Prevention System", IEEE, Dec. 1996, pp. 61-71.

Lee et al., "Automatic recognition of a car license plate using color image processing", IEEE, Nov. 16, 1994.

Lee, "How to Select a Heat Sink", Electronics Cooling Magazine, Jun. 1, 1995.

Leen et al., "Digital networks in the automotive vehicle", Dec. 1999.

Lezin, "Video Gear in Police Cruisers Gets Mixed Reviews Critics Say It Violates Privacy Rights and Inhibits Officers From Doing Their Jobs Well", Mar. 17, 1997.

Linkwitz, "High Precision Navigation: Integration of Navigational and Geodetic Methods," Springer-Verlag, Jul. 5, 1989, Excerpt.

(56) References Cited

OTHER PUBLICATIONS

Lisowski et al., "Specification of a small electric vehicle: modular and distributed approach," IEEE 1997, pp. 919-924.

Litkouhi et al., "Estimator and Controller Design for LaneTrak, a Vision-Based Automatic Vehicle Steering System," Proceedings of the 32nd Conference on Decision and Control, San Antonio, Texas, Dec. 1993, pp. 1868-1873.

Litwiller, "CCD vs. CMOS: Facts and Fiction," Photonics Spectra, Jan. 2001.

Liu Xianghong, "Development of a vision-based object detection and recognition system for intelligent vehicle", 2000.

Lockwood, "Design of an obstacle avoidance system for automated guided vehicles", Doctoral thesis, University of Huddersfield, Oct. 1991.

Lowenau et al., "Adaptive light control a new light concept controlled by vehicle dynamics and navigation", SAE Technical Paper Series, Feb. 23-26, 1998.

Lu et al., "On-chip Automatic Exposure Control Technique, Solid-State Circuits Conference", ESSCIRC '91. Proceedings—17th European (vol. 1) Abst. Sep. 11-13, 1991.

Lucas Demonstrates Intelligent Cruise Control, Detroit Feb. 27, 1995 available at http://www.thefreelibrary.com/LUCAS+DEMONSTRATES+INTELLIGENT+CUISE+CONTROL=a016602459.

Luebbers et al., "Video-image-based neural network guidance system with adaptive view-angles for autonomous vehicles", Applications of Artificial Neural Networks II. International Society for Optics and Photonics, 1991, Abstract.

Lumia, "Mobile system for measuring retroreflectance of traffic signs", Optics, Illumination, and Image Sensing for Machine Vision, Mar. 1, 1991, Abstract.

Mackey et al., "Digital Eye-Witness Systems", Transportation Recording: 2000 and Beyond, May 3-5, 1999, 271-284.

Malik et al., "A Machine Vision Based System for Guiding Lane-change Maneuvers", California Path Program, Institute of Transportation Studies, University of California, Berkeley, Sep. 1995.

Manigel et al., "Computer control of an autonomous road vehicle by computer vision"—Industrial Electronics, Control and Instrumentation, Proceedings. IECON '91, 1991 International Conference on, p. 19-24 vol. 1, 1991.

Manigel et al., "Vehicle control by computer vision," Industrial Electronics, IEEE Transactions on, vol. 39, Issue 3, 181-188, Jun 1992.

Martel-Brisson et al., "Moving cast shadow detection from a Gaussian mixture shadow model", Proceeding of IEEE Computer Society Conference on Computer Vision and Pattern Recognition, vol. 2, 2005.

Masaki, "Vision-based vehicle guidance", Industrial Electronics, Control, Instrumentation, and Automation, 1992. Power Electronics and Motion Control, Proceedings of the 1992 International Conference on. IEEE, 1992.

Mason et al., "The Golem Group I UCLA Autonomous Ground Vehicle in the DARPA Grand Challenge", Jun. 12, 2006.

Matthews, "Visual Collision Avoidance," Oct. 1994, University of Southampton, PhD submission.

Maurer et al., "VaMoRs-P: an advanced platform for visual autonomous road vehicle guidance", 1995.

Maurer, "Flexible Automatisierung von Straßenfahrzeugen mit Rechnersehen" Universitat der Buneswehr Milnchen Dissertation, Jul. 27, 2000.

MC68331 User's Manual, "Freescale Semiconductor", Inc., 1994.

McKenna et al., "Tracking Groups of People", Computer Vision and Image Understanding, vol. 80, p. 42-56, 2000.

McTamaney, "Mobile Robots Real-Time Intelligent Control", FMC Corporation, Winter 1987.

Mei Chen et al., "AURORA: A Vision-Based Roadway Departure Warning System, The Robotics Institute", Carnegie Mellon University, published, Aug. 5-9, 1995.

Mendis et al., "A 128×128 CMOS active pixel image sensor for highly integrated imaging systems", Dec. 8, 1993.

Mendis et al., "CMOS Active Pixel Image Sensor," IEEE Transactions on Electron Devices, vol. 41, No. 3, Mar. 1994.

Metzler, "Computer Vision Applied to Vehicle Operation", Paper from Society of Automotive Engineers, Inc., 1988.

Mikic et al., "Moving shadow and object detection in traffic scenes", Proceeding of IEEE International Conference on Pattern Recognition, vol. 1, 2000.

Miller, "Evaluation of vision systems for teleoperated land vehicles," IEEE Control Systems Magazine, Jun. 28, 1988.

Mimuro et al., "Functions and Devices of Mitsubishi Active Safety ASV" Proceedings of the 1996 IEEE Intelligent Vehicles Symposium, Sep. 19-20, 1996, Abstract.

Mironer et al., "Examination of Single Vehicle Roadway Departure Crashes and Potential IVHS Countermeasures," U.S. Department of Transportation, Aug. 1994.

Miura et al., "Towards Vision-Based Intelligent Navigator: Its Concept and Prototype", IEEE Transactions on Intelligent Transportation Systems, Jun. 2002.

Miura et al., "Towards intelligent navigator that can provide timely advice on safe and efficient driving" Intelligent Transportation Systems Proceedings, Oct. 5-8, 1999, pp. 981-986.

Mobileye N.V. Introduces EyeQ™ Vision System-On-A-Chip High Performance, Low Cost Breakthrough for Driver Assistance Systems, Detroit, Michigan, Mar. 8, 2004.

Moini, "Vision Chips or Seeing Silicon," Third Revision, Mar. 1997.

Moravec, "Obstacle Avoidance and Navigation in the Real World by a Seeing Robot Rover", Computer Science Department, Stanford University, Ph.D. Thesis, Sep. 1980.

Morgan et al., "Road edge tracking for robot road following: a real-time implementation," vol. 8, No. 3, Aug. 1990.

Mori et al., "Shadow and Rhythm as Sign patterns of Obstacle Detection", Industrial Electronics, 1993. Conference Proceedings, ISIE'93—Budapest, IEEE International Symposium on. IEEE, 1993, Abstract.

Morris, "E-Z-Pass and transmit using electronic toll tags for traffic monitoring" National Traffic Data Acquisition Conference, PDF pp. 54-63, 1996, 289-298, Abstract.

Muirhead, "Developments in CMOS Camera Technology," The Institution of Electrical Engineers, Dec. 5, 1994.

Nadimi et al., "Physical models for moving shadow and object detection in video", IEEE Transactions on Pattern Analysis and Machine Intelligence, vol. 26, No. 8, Aug. 2004.

Najm, "Comparison of alternative crash-avoidance sensor technologies", Jan. 6, 1995, Abstract.

Nashman et al., "Real-time Visual Processing for Autonomous Driving," in Proceedings of the IEEE Intelligent Vehicles, vol. 93, Jun. 1993, pp. 14-16.

Nathan, "Digital Video Data Handling," NASA JPL Tech Report 32-877, Pasadena, CA, Jan. 5, 1966.

Navon, "SoC IP Qualification & Emulation Environment", Dec. 8-9, 2004.

Nguyen et al., "Obstacle detection using bi-spectrum CCD camera and image processing", Proceedings of the Intelligent Vehicles '92 Symposium, Jun. 29-Jul. 1, 1992, p. 42-50.

Nixon et al., "128×128 CMOS Photodiode-Type Active Pixel Sensor With On-Chip Timing, Control and Signal Chain Electronics" 1995.

Nixon et al., "256×256 CMOS Active Pixel Sensor Camera-on-a-Chip," IEEE Journal of Solid-State Circuits, vol. 31, No. 12, Paper FA 11.1, 1996.

Nolan, "Survey of Electronic Displays", SAE Paper No. 750364, published Feb. 1, 1975.

Oldenburg, "Comments on the Autronic Eye", 2002.

Ortega et al., "An Interactive, Reconfigurable Display System for Automotive Instrumentation", SAE Paper No. 860173, published Mar. 1, 1986.

Otsuka, "Flat Dot Matrix Display Module for Vehicle Instrumentation", SAE Paper No. 871288, published Nov. 8, 1987.

Pacaud et al., "Ground Speed Sensing," Lucas International Symposium, Paris, France 1989.

(56) References Cited

OTHER PUBLICATIONS

Paetzold, "Interpretation of visually sensed urban environment for a self-driving car" Ruhr-Universitat Bochum, Dissertation, Sep. 2000.
Page et al., "Advanced technologies for collision avoidance," Eureka on Campus (Summer 1992).
Paradiso et al., "Wide-Range Precision Alignment for the Gem Muon System," Oct. 1993.
Paradiso, "Application of miniature cameras in video straightness monitor systems", Draper Laboratory, Jun. 1994.
Paradiso, "Electronics for precision alignment of the Gem Muon System", Proceedings of the 1994 LeCroy Electronics for Future Colliders Conference, May 1994.
Parent, "Automatic Driving for Small Public Urban Vehicles," Intelligent Vehicles Symposium, Tokyo, Jul. 14-16, 1993.
Parker (ed.), McGraw-Hill Dictionary of Scientific and Technical Terms Fifth Edition. (1993).
Parnell, "Reconfigurable Vehicle". No. 2002-01-0144. SAE Technical Paper, 2002. Xilinx WPI 53, Nov. 19, 2001.
Pelco Fixed Focal Length Lenses Product Specification, Apr. 1996.
Peng et al., "Experimental Automatic Lateral Control System for an Automobile," California Partners for Advanced Transit and Highways (PATH), Jan. 1, 1992.
Peng, "Vehicle Lateral Control for Highway Automation," Ph.D. Thesis—University of California Berkeley, 1992.
Philips Components, PCA82C200, Stand-alone CAN-controller, Jan. 22, 1991.
Philomin et al., "Pedestrain Tracking from a Moving Vehicle", Proceedings of the IEEE, Intelligent Vehicles Symposium, IV, 2000.
Piccioli et al., "Robust road sign detection and recognition from image sequences", 1994.
Pollard, "Evaluation of the Vehicle Radar Safety Systems' Rashid Radar Safety Brake Collision Warning System", U.S. Dept. of Transportation, National Highway Traffic Safety Administration, Feb. 29, 1988.
Pomerleau, "Alvinn: An Autonomous Land Vehicle in a Neural Network", Technical Report AIP-77 Department of Psychology, Carnegie Mellon University, Mar. 13, 1990.
Pomerleau, "RALPH: Rapidly Adapting Lateral Position Handler", The Robotics Institute, Carnegie Mellon University, Pittsburgh, PA, pp. 506-511., 1995.
Pomerleau et al., "Run-Off-Road Collision Avoidance Countermeasures Using IVHS Countermeasures TASK 3—vol. 1", U.S. Dept. of Transportation, National Highway Traffic Safety Administration, Final Report, Aug. 23, 1995.
Pomerleau et al., "Rapidly Adapting Machine Vision for Automated Vehicle Steering", pp. 19-27, Apr. 30, 1996.
Pomerleau, "Run-Off-Road Collision Avoidance Using Ivhs Countermeasures", Robotics Institute, Task 6 Interim Report, Sep. 10, 1996.
Porter et al., "Compositing Digital Images," Computer Graphics (Proc. Siggraph), vol. 18, No. 3, pp. 253-259, Jul. 1984.
Prasad, "Performance of Selected Event Data Recorders", National Highway Traffic Safety Administration. Washington, DC, Sep. 2001.
Prati et al., "Detecting moving shadows: algorithms and evaluation", IEEE Transactions on Pattern Analysis and Machine Intelligence, vol. 25, Jul. 1, 2003.
Pratt, "Digital Image Processing, Passage—Ed.3", John Wiley & Sons, US, Jan. 1, 2001, pp. 657-659, XP002529771.
Priese et al., "New Results on Traffic Sign Recognition", IEEE Proceedings of the Intelligent Vehicles 1994 Symposium.
Priese et al., "Traffic Sign Recognition Based on Color Image", Universität Koblenz-Landau, 1993, pp. 95-100.
Proceedings of the 1992 International Conference on Industrial Electronics, Control, Instrumentation, and Automation, 1992. Power Electronics and Motion Control, Date of Conference Nov. 9-13, 1992.
Proceedings of the Intelligent Vehicles Symposium, 1992-present.
Proceedings of the Intelligent Vehicles Symposium, Tokyo, Jul. 14-16, 1993.
Pynn et al., "Automatic identification of cracks in road surfaces" 7th International Conference on Image Processing and its Application, CP465, Jan. 1999, pp. 671-675, Abstract.
Raboisson et al., "Obstacle Detection in Highway Environment by Colour CCD Camera and Image Processing Prototype Installed in a Vehicle", Proceedings of the IEEE Intelligent Symposium 1994.
Radatz, "The IEEE Standard Dictionary of Electrical and Electronics Terms," Sixth Edition, Standards Coordinating Committee 10, Terms and Definitions, 1996.
Raglan Tribe Video-1994; 1994; Raglan Tribe; "Robot Car Raglan Tribe" http://www.youtube.com/watch?v=AILZhcnpXYI.
Ramesh et al., "Real-Time Video Surveillance and Monitoring for Automotive Applications", SAE Technical Paper 2000-01-0347, Mar. 6, 2000, Abstract.
Ran et al., "Development of Vision-based Vehicle Detection and Recognition System for Intelligent Vehicles", Department of Civil and Environmental Engineering, University of Wisconsin at Madison, 1999 TRB Annual Meeting, Nov. 16, 1998.
Raphael et al., "Development of a Camera-Based Forward Collision Alert System", SAE International, Apr. 12, 2011.
Rayner et al., "I-Witness Black Box Recorder" Intelligent Transportation Systems Program, Final Report for ITS-IDEA Project 84, Nov. 2001.
Redmill, "The OSU Autonomous Vehicle", 1997.
Regensburger et al., "Visual Recognition of Obstacles on Roads", Intelligent Robots and Systems, Elsevier, 1994.
Reichardt, "Kontinuierliche Verhaltenssteuerung eines autonomen Fahrzeugs in dynamischer Umgebung" Universitat Kaisserslautern Dissertation, Transation: Continuous behavior control of an autonomous vehicle in a dynamic environment, Jan. 1996.
Reid, "Vision-based guidance of an agriculture tractor", IEEE Control Systems Magazine, Apr. 30, 1987, Abstract.
Reisman et al., "Crowd Detection in Video Sequences", IEEE, Intelligent Vehicles Symposium, Jan. 1, 2004.
Ritter et al., "Traffic sign recognition using colour information", Math, Computing, Modelling, vol. 22, No. 4-7, pp. 149-161, Oct. 1995.
Ritter, "Traffic Sign Recognition in Color Image Sequences", Institute for Information Technology, 1992, pp. 12-17.
Roberts, "Attentive Visual Tracking and Trajectory Estimation for Dynamic Scene Segmentation", University of Southampton, PhD submission, Dec. 1994.
Rombaut et al., "Dynamic data temporal multisensory fusion in the Prometheus ProLab2 demonstrator", IEEE Paper, 1994.
Ross, "A Practical Stereo Vision System", The Robotics Institute, Carnegie Mellon University, Aug. 25, 1993.
Rowell, "Applying Map Databases to Advanced Navigation and Driver Assistance Systems", The Journal of Navigation 54.03 (2001): 355-363.
Sahli et al., "A Kalman Filter-Based Update Scheme for Road Following," IAPR Workshop on Machine Vision Applications, pp. 5-9, Nov. 12-14, 1996.
Salvador et al., "Cast shadow segmentation using invariant color features", Computer Vision and Image Understanding, vol. 95, 2004.
Sanders, "Speed Racers: Study to monitor driver behavior to determine the role of speed in crashes", Georgia Research Tech News, Aug. 2002.
Sayer et al., "The Effect of Lead-Vehicle Size on Driver Following Behavior", University of Michigan Transportation Research Institute, 2000-15, Jun. 2000.
Schneiderman et al., "Visual Processing for Autonomous Driving," IEEE Workshop on Applications of Computer Vision, Palm Springs, CA, Nov. 30-Dec. 2, 1992.
Schönfeld et al., Compact Hardware Realization for Hough Based Extraction of Line Segments in Image Sequences for Vehicle Guidance, IEEE Paper, 1993, Abstract.
Schumann et al., "An Exploratory Simulator Study on the Use of Active Control Devices in Car Driving," No. IZF-1992-B-2. Institute for Perception RVO-TNO Soesterber (Netherlands), May 1992.

(56) References Cited

OTHER PUBLICATIONS

Schwarzinger et al., "Vision-based car-following: detection, tracking, and identification", Jul. 1, 1992.
Scott, "Video Image on a Chip", Popular Science, vol. 237, No. 3, Sep. 1991, pp. 50.
Seelen et al., "Image Processing for Driver Assistance", 1998.
Seger et al., "Vision Assistance in Scenes with Extreme Contrast," IEEE Micro, vol. 13, No. 1, Feb. 1993.
Shafer, "Automation and Calibration for Robot Vision Systems", National Science Foundation, Carnegie Mellon University Research Showcase, May 12, 1988.
Shashua et al., "Two-body Segmentation from Two Perspective Views", IEEE Conference on Computer Vision and Pattern Recognition (CVPR), Hawaii, pp. 263-270, Dec. 2001, Abstract.
Shashua et al., "Direct Estimation of Motion and Extended Scene Structure from a Moving Stereo Rig", IEEE Conference on Computer Vision and Pattern Recognition (CVPR), Jun. 1998, pp. 211-218.
Shashua et al., "Illumination and View Position in 3D Visual Recognition", Advances in Neural Information Processing Systems, Morgan Kauffman Publishers, CA 1992 (Proc. of NIPS '91), pp. 404-411.
Shashua et al., "Image-Based View Synthesis by Combining Trilinear Tensors and Learning Techniques", ACM Conference on Virtual Reality and Systems (VRST), Sep. 1997, pp. 140-145.
Shashua et al., "Novel View Synthesis by Cascading Trilinear Tensors", IEEE Transactions on Visualization and Computer Graphics. vol. 4, No. 4, Oct.-Dec. 1998.
Shashua et al., "On Degeneracy of Linear Reconstruction from Three Views: Linear Line Complex and Applications", IEEE Transactions on Pattern Analysis and Machine Intelligence (PAMI), vol. 21 (3), 1999, pp. 244-251.
Shashua et al., "3D Reconstruction from Tangent-of-Sight ", European Conference on Computer Vision (ECCV), Jun. 2000, Dublin, Ireland, pp. 220-234.
Shashua et al., "A Geometric Invariant for Visual Recognition and 3D Reconstruction From Two Perspective/Orthographic Views", Proceedings of the IEEE 2nd Qualitative Vision Workshop, Jun. 1993, New York, NY, pp. 107-117.
Shashua et al., "A Parallel Decomposition Solver for SVM: Distributed Dual Ascend using Fenchel Duality", Conf. on Computer Vision and Pattern Recognition (CVPR), Jun. 2008, Anchorage, Alaska.
Shashua et al., "A Unifying Approach to Hard and Probabilistic Clustering", International Conference on Computer Vision (ICCV), Beijing, China, Oct. 2005.
Shashua et al., "Affine 3-D Reconstruction from Two Projective Images of Independently Translating Planes", International Conference on Computer Vision (ICCV), Jul. 2001, Vancouver, Canada, pp. 238-244.
Shashua et al., "Algebraic Functions for Recognition", IEEE Transactions on Pattern Analysis and Machine Intelligence (PAMI) vol. 17(8), Jan. 1994 pp. 779-789.
Shashua et al., "Ambiguity from Reconstruction From Images of Six Points", International Conference on Computer Vision (ICCV), Jan. 1998, Bombay India, pp. 703-708.
Shashua et al., "Convergent Message-Passing Algorithms for reference over General Graphs with Convex Free Energies", Conf. on Uncertainty in AI (UAI), Helsinki, Jul. 2008.
Shashua et al., "Doubly Stochastic Normalization for Spectral Clustering", Advances in Neural Information Processing Systems (NIPS), Vancouver, Canada, Dec. 2006.
Shashua et al., "Duality of multi-point and multi-frame geometry: Fundamental shape matrices and tensors", European Conference on Computer Vision (ECCV), Apr. 1996, Cambridge United Kingdom, pp. 217-227.
Shashua et al., "Dynamic $P^n$ to $P^n$ Alignment", In Handbook of Computational Geometry for Pattern Recognition, Computer Vision. Neuro computing and Robotics. Eduardo Bayro-Corrochano (eds.), Springer-Verlag, 2004.
Shashua et al., "Feature Selection for Unsupervised and Supervised Inference: the Emergence of Sparsity in a Weight-based Approach", Journal of Machine Learning Research (JMLR), 6(11):1885-1887, 2005, pp. 1885-1887.
Shashua et al., "Grouping Contours by Iterated Pairing Network", Advances in Neural Information Processing Systems 3, (Proc. of NIPS '90), Morgan Kaufmann Publishers, CA, 1991, pp. 335-341.
Shashua et al., "Homography Tensors: On Algebraic Entities That Represent Three Views of Static or Moving Planar Points", European Conference on Computer Vision (ECCV), Jun. 2000, Dublin, Ireland, pp. 163-177.
Shashua et al., "Join Tensors: on 3D-to-3D Alignment of Dynamic Sets", International Conference on Pattern Recognition (ICPR), Jan. 2000, Barcelona, Spain, pp. 99-102.
Shashua et al., "Kernel Feature Selection with Side Data using a Spectral Approach", Proc. of the European Conference on Computer Vision (ECCV), May 2004, Prague, Czech Republic.
Shashua et al., "Kernel Principal Angles for Classification Machines with Applications to Image Sequence Interpretation", IEEE Conference on Computer Vision and Pattern Recognition (CVPR), Jun. 2003, Madison.
Shashua et al., "Latent Model Clustering and Applications to Visual Recognition", International Conference on Computer Vision (ICCV), Rio, Brazil, Oct. 2007.
Shashua et al., "Learning over Sets using Kernel Principal Angles", Journal of Machine Learning Research, 2003, pp. 913-931.
Shashua et al., "Linear Image Coding for Regression and Classification using the Tensor-rank Principle", IEEE Conference on Computer Vision and Pattern Recognition (CVPR), Dec. 2001, Hawaii, pp. 42-49, Abstract.
Shashua et al., "Manifold Pursuit: A New Approach to Appearance Based Recognition", International Conference on Pattern Recognition (ICPR), Aug. 2002, Quebec, Canada.
Shashua et al., "Multi-frame Infinitesimal Motion Model for the Reconstruction of (Dynamic) Scenes with Multiple Linearly Moving Objects", International Conference on Computer Vision (ICCV), Jul. 2001 Vancouver, Canada, pp. 592-599.
Shashua et al., "Multiple View Geometry of Non-planar Algebraic Curves", International Conference on Computer Vision (ICCV), Vancouver, Canada, pp. 592-599.
Shashua et al., "Structural Saliency: the Detection of Globally Salient Structures Using a Locally Connected Network", International Conference on Computer Vision (ICCV), Tarpon Springs, Florida, pp. 321-327, Jul. 1988.
Shashua et al., "The Study of 3D-from-2D using Elimination", International Conference on Computer Vision (ICCV), Jun. 1995, Boston, MA, pp. 473-479.
Shashua et al., "Multiple-view Geometry and Photometry, In Recent Progress in Computer Vision", Springer-Verlag, LNCS series, Invited papers of ACCV'95, Singapore Dec. 1995, 225-240, Abstract.
Shashua et al., "Multiple-view geometry of general algebraic curves", International Journal of Computer Vision (IJCV), 2004.
Shashua et al., "Multi-way Clustering Using Super-symmetric Nonnegative Tensor Factorization", Proc. of the European Conference on Computer Vision (ECCV), Graz, Austria, May 2006.
Shashua et al., "Nonnegative Sparse PCA", Advances in Neural Information Processing Systems (NIPS), Vancouver, Canada, Dec. 2006.
Shashua et al., "Non-Negative Tensor Factorization with Applications to Statistics and Computer Vision", International Conference on Machine Learning (ICML), Bonn, Germany, Aug. 2005.
Shashua et al., "Norm-Product Belief Propagation: Primal-Dual Message-Passing for Approximate Inference", IEEE Trans. on Information Theory, Jun. 28, 2010.
Shashua et al., "Novel View Synthesis in Tensor Space", IEEE Conference on Computer Vision and Pattern Recognition (CVPR), Jun. 1997, pp. 1034-1040.
Shashua et al., "Off-road Path Following using Region Classification and Geometric Projection Constraints", IEEE Conference on Computer Vision and Pattern Recognition (CVPR), Jun. 2006, NY.

(56) References Cited

OTHER PUBLICATIONS

Shashua et al., "Omni-Rig Sensors: What Can be Done With a Non-Rigid Vision Platform?", Workshop on Applications of Computer Vision (W ACV), pp. 174-179, Princeton, Oct. 1998, pp. 174-179.

Shashua et al., "Omni-rig: Linear Self-recalibration of a Rig with Varying Internal and External Parameters," International Conference on Computer Vision (ICCV), Jul. 2001, Vancouver, Canada, pp. 135-141.

Shashua et al., "On calibration and reconstruction from planar curves", European Conference on Computer Vision (ECCV), pp. 256-270, Jun. 2000, Dublin, Ireland, pp. 256-270.

Shashua et al., "On Geometric and Algebraic Aspects of 3D Affine and Projective Structures from Perspective 2D Views", In Applications of Invariance in Computer Vision, Springer-Verlag LNCS No. 825, 1994, 127-143.

Shashua et al., "On Photometric Issues in 3D Visual Recognition from a Single 2D Image", International Journal of Computer Vision (IJCV), 21(½), 1997 pp. 99-122.

Shashua et al., "On Projection Matrices $P^k$-$P^2$, k=3, 6, and their Applications in Computer Vision", International Journal of Computer Vision (IJCV), 2002, pp. 53-67.

Shashua et al., "On the Reprojection of 3D and 2D Scenes Without Explicit Model Selection", European Conference on Computer Vision (ECCV), Jun. 2000, Dublin, Ireland, pp. 468-482.

Shashua et al., "On the Structure and Properties of the Quadrifocal Tensor", European Conference on Computer Vision (ECCV), Jun. 2000, Dublin, Ireland, pp. 354-368.

Shashua et al., "On the Synthesis of Dynamic Scenes from Reference Views", IEEE Conference on Computer Vision and Pattern Recognition (CVPR), Jun. 2000, pp. 133-139.

Shashua et al., "pLSA for Sparse Arrays With Tsallis Pseudo-Additive, Divergence: Noise Robustness and Algorithm", International Conference on Computer Vision (ICCV), Rio, Brazil, Oct. 2007.

Shashua et al., "Principal Component Analysis Over Continuous Subspaces and Intersection of Half-spaces", European Conference on Computer Vision (ECCV), May 2002, Copenhagen, Denmark, pp. 133-147.

Shashua et al., "Probabilistic Graph and Hypergraph Matching", Conf. on Computer Vision and Pattern Recognition (CVPR), Jun. 2008, Anchorage, Alaska.

Shashua et al., "Projective Structure from Uncalibrated Images: Structure from Motion and Recognition", IEEE Transactions on Pattern Analysis and Machine Intelligence (P AMI), (vol. 16(8), 1994, pp. 778-790.

Shashua et al., "Q-warping: Direct Computation of Quadratic Reference Surfaces", IEEE Transactions on Pattern Analysis and Machine Intelligence (P AMI), vol. 23(8), 2001, pp. 920-925.

Shashua et al., "Relative Affine Structure: Canonical Model for 3D from 2D Geometry and Applications," IEEE, Transactions on Pattern Analysis and Machine Intelligence (P AMI) vol. 18(9), pp. 873-883, Jun. 1994.

Shashua et al., "Relative Affine Structure: Theory and Application for 3D Reconstruction From Perspective Views," IEEE Conference on Computer Vision and Pattern Recognition (CVPR), Seattle, Washington, pp. 483-489, Jun. 1994.

Shashua et al., "Revisiting Single-view Shape Tensors: Theory and Applications," EP Conference on Computer Vision (ECCV), Copenhagen, DK, pp. 256-270, May 2002.

Shashua et al., "Robust Recovery of Camera Rotation from Three Frames," IEEE Conference on Computer Vision and Pattern Recognition (CVPR), San Francisco, CA, pp. 796-802, Jun. 1996.

Shashua et al., "Shape Tensors for Efficient and Learnable Indexing", Proceedings of the workshop on Scene Representations, Jun. 1995, Cambridge, MA, pp. 58-65.

Shashua et al., "ShareBoost: Efficient Multiclass Learning with Feature Sharing, Neural Information and Processing Systems (NIPS)", Dec. 2011.

Shashua et al., "Sparse Image Coding using a 3D Non-negative Tensor Factorization", International Conference on Computer Vision (ICCV), Beijing, China, Oct. 2005.

Shashua et al., "Taxonomy of Large Margin Principle Algorithms for Ordinal Regression Problems", Advances in Neural Information Processing Systems (NIPS), Vancouver, Canada, Dec. 2002.

Shashua et al., "Tensor Embedding of the Fundamental Matrix", Kluwer Academic Publishers, Boston, MA, 1998.

Shashua et al., "The Quadric Reference Surface: Applications in Registering Views of Complex 3D Objects", European Conference on Computer Vision (ECCV), May 1994, Stockholm, Sweden, pp. 407-416.

Shashua et al., "The Quadric Reference Surface: Theory and Applications", 1994.

Shashua et al., "The Rank 4 Constraint in Multiple (≥3) View Geometry", European Conference on Computer Vision (ECCV), Apr. 1996, Cambridge, United Kingdom, pp. 196-206.

Shashua et al., "The Semi-Explicit Shape Model for Multi-object Detection and Classification", Proc. of the European Conference on Computer Vision (ECCV), Crete, Greece, pp. 336-349, Sep. 2010.

Shashua et al., "Threading Fundamental Matrices", IEEE Transactions on Pattern Analysis and Machine Intelligence (PAMI), vol. 23(1), Jan. 2001, pp. 73-77.

Shashua et al., "Threading Kernel functions: on Bridging the Gap between Representations and Algorithms", Advances in Neural Information Processing Systems (NIPS), Vancouver, Canada, Dec. 2004.

Shashua et al., "Time-varying Shape Tensors for Scenes with Multiply Moving Points", IEEE Conference on Computer Vision and Pattern, pp. 623-630, Dec. 2001, Hawaii.

Shashua et al., "Trajectory Triangulation over Conic Sections", International Conference on Computer Vision (ICCV), Greece, 1999, pp. 330- 337.

Shashua et al., "Trajectory Triangulation: 3D Reconstruction of Moving Points from a Monocular Image Sequence", IEEE Transactions on Pattern Analysis and Machine Intelligence (PAMI), vol. 22(4), 2000, pp. 348-357.

Shashua et al., "Trilinear Tensor: The Fundamental Construct of Multiple-view Geometry and its Applications", International Workshop on Algebraic Frames for the Perception Action Cycle (AFPAC97), Kiel Germany, Sep. 8-9, 1997. Proceedings appeared in Springer-Verlag, LNCS series, 1997, 190-206.

Shashua et al., "Trilinearity in Visual Recognition by Alignment", European Conference on Computer Vision (ECCV), May 1994, Stockholm, Sweden, pp. 479-484.

Shashua et al., "Projective Depth: A Geometric Invariant for 3D Reconstruction From Two Perspective/Orthographic Views and for Visual Recognition," International Conference on Computer Vision (ICCV), May 1993, Berlin, Germany, pp. 583-590.

Shashua et al., "The Quotient Image: Class Based Recognition and Synthesis Under Varying Illumination Conditions", IEEE Conference on Computer Vision and Pattern Recognition (CVPR), Jun. 1999, pp. 566-573.

Shashua et al., "The Quotient Image: Class Based Re-rendering and Recognition With Varying Illuminations", IEEE Transactions on Pattern Analysis and Machine Intelligence (PAMI), vol. 23(2), 2001, pp. 129-139.

Shashua et al., "Pedestrian Detection for Driving Assistance, Systems: Single-Frame Classification and System Level, Performance", IEEE Intelligent Vehicles Symposium, Jan. 1, 2004.

Shashua, "On the Relationship Between the Support Vector Machine for classification and Sparsified Fisher's Linear Discriminant," Neural Processing Letters, 1999, 9(2): 129-139.

Shimizu et al., "A moving image processing system for personal vehicle system", Nov. 9, 1992, Abstract.

Shirai, "Robot Vision", Future Generation Computer Systems, 1985.

Shladover et al., "Automatic Vehicle Control Developments in the PATH Program," IEEE Transaction on Vehicular Technology, vol. 40, No. 1, Feb. 1991, pp. 114-130.

Shladover, "Research and Development Needs for Advanced Vehicle Control Systems," Micro, IEEE, vol. 13, No. 1, Feb. 1993, pp. 11-19.

(56) References Cited

OTHER PUBLICATIONS

Shladover, "Highway Electrification and Automation," California Partners for Advanced Transit and Highways (PATH), Jan. 1, 1992.
Siala et al., "Moving shadow detection with support vector domain description in the color ratios space", Proceeding of IEEE International Conference on Pattern Recognition. vol. 4, 2004.
Siegle, "Autonomous Driving on a Road Network," Proceedings of the Intelligent Vehicles '92 Symposium Detroit, Michigan, ISBN 0-7803-0747-X; Jun. 29-Jul. 1, 1992.
Smith et al., "An Automotive Instrument Panel Employing Liquid Crystal Displays", SAE Paper No. 770274, published Feb. 1, 1977.
Smith et al., "Optical sensors for automotive applications", May 11, 1992.
Smith et al., "Vision sensing for intelligent vehicle and highway systems", Proceedings of the 1994 IEEE International Conference on Multisensor Fusion and Integration for Intelligent Systems, Las Vegas, NV, Oct. 5, 1994.
Soatto et al., "The Golem Group/University of California at Los Angeles Autonomous Ground Vehicle in the DARPA Grand Challenge", Journal of Field Robotics 23(8), 2006, pp. 527-553.
Solder et al., "Visual Detection of Distant Objects", Intelligent Robots and Systems' 93, IROS'93. Proceedings of the 1993 IEEE/RSJ International Conference on. vol. 2. IEEE, 1993, Abstract.
Sole et al., "Solid or not solid: vision for radar target validation", IEEE Intelligent Vehicles Symposium, 2004.
Sony Operating Manual CCD Color Video Camera Model: DXC-151A, 1993.
Sparks et al., "Multi-Sensor Modules with Data Bus Communication Capability" SAE Technical Paper 1999-01-1277, Mar. 1, 1999, doi: 10.4271/1999-01-1277, http://papers.sae.org/1999-01-1277/, Abstract.
Sridhar, "Multirate and event-driven Kalman filters for helicopter flight", IEEE Control Systems, Aug. 15, 1993.
Standard J2284/3, "High-Speed CAN (HSC) for Vehicle Applications at 500 Kbps," issued May 30, 2001.
Stauder et al., "Detection of moving cast shadows for object segmentation", IEEE Transactions on Multimedia, vol. 1, No. 1, Mar. 1999.
Stein et al., "A Computer Vision System on a Chip: a case study from the automotive domain", IEEE Computer Society Conference on Computer Vision and Pattern Recognition, 2005.
Stein et al., "Challenges and solutions for Bundling Multiple DAS Applications on a Single Hardware Platform", Procs. Vision 2008.
Stein et al., "Direct Methods for Estimation of Structure and Motion from three views", A.I. Memo No. 1594, MA Inst. of Tech., Nov. 1996.
Stein et al., "Internal Camera Calibration using Rotation and Geometric Shapes", Submitted to the Dept. of Electrical Engineering and Computer Science at MA Inst. of Tech., Masters Thesis, M.I.T., Feb. 1993.
Stein et al., "Model-based brightness constraints: on direct estimation of structure and motion," IEEE Transactions on Pattern Analysis and Machine Intelligence, vol. 22, Issue 9, Sep. 2000.
Stein et al., "Stereo-assist: Top-down stereo for driver assistance systems", IEEE Intelligent Vehicles Symposium, 2010.
Stein et al., "Vision-based ACC with a single camera: bounds on range and range rate accuracy", IEEE Intelligent Vehicles Symposium, 2003.
Stein et al., "A robust method for computing vehicle ego-motion", Proceedings of the IEEE Intelligent Vehicles Symposium, 2000.
Stein, "Accurate Internal Camera Calibration using Rotation, with Analysis of Sources of Error", Computer Vision, Proceedings Fifth International Conference on. IEEE, 1995.
Stein, "Geometric and photometric constraints: motion and structure from three views", Mass. Inst. of Tech., Doctoral Dissertation, 1998.
Stein, "Lens Distortion Calibration Using Point Correspondences", A.I. Memo No. 1595, M.I.T. Artificial Intelligence Laboratory, Nov. 1996.
Stein, "Tracking from multiple view points: Self-calibration of space and time", IEEE Computer Society Conference on Computer Vision and Pattern Recognition, Jun. 1999.
Stein et al., "Monitoring Activities from Multiple Video Streams: Establishing a Common Coordinate Frame," A.I. Memo No. 1655, M.I.T. Artificial Intelligence Laboratory, Apr. 1999.
Steiner et al., "Future applications or microsystem technologies in automotive safety systems" Advanced Microsystems for Automotive Applications '98, 1998, pp. 21-42.
Stengel et al., "Intelligent Guidance for Headway and Lane Control", Princeton University, Department of Mechanical and Aerospace Engineering, New Jersey, 1989.
Stickford, "Candid cameras come to Park", Grosse Pointe News, Mar. 7, 1996.
Stiller et al., "Multisensor obstacle detection and tracking", Image and Vision Computing 18, Elsevier, 2000, pp. 389-396.
Sukthankar, "RACCOON: A Real-time Autonomous Car Chaser Operating Optimally at Night", Oct. 1992.
Sun et al., "On-road vehicle detection using optical sensors: a review", 2004.
Sun et al., "A Real-time Precrash Vehicle Detection System", 2002.
Szeliski, "Image Mosaicing for Tele-Reality Applications", DEC Cambridge Research Laboratory, CRL 94/2, May 1994.
Taktak et al., "Vehicle detection at night using image processing and pattern recognition", Centre de Recherche en Automatique de Nancy, 1994.
Taylor, "CCD and CMOS Imaging Array Technologies: Technology Review," Xerox Research Centre Europe, Technical Report EPC-1998-106, 1998.
Thomanek et al., "Multiple object recognition and scene interpretation for autonomous road vehicle guidance" Oct. 1994.
Thomas, "Real-time vision guided navigation", Engineering Applications of Artificial Intelligence, Jan. 31, 1991, Abstract.
Thongkamwitoon et al., "An adaptive real-time background subtraction and moving shadows detection", Proceeding of IEEE International Conference on Multimedia and Expo. vol. 2, 2004.
Thorpe et al., "Perception for Outdoor Navigation First Year Report", Defense Advanced Research Projects Agency, Carnegie Mellong University, Dec. 31, 1990.
Thorpe, "Vision and Navigation for the Carnegie-Mellon Navlab", IEEE Transactions on Pattern Analysis and Machine Intelligence, vol. 10, No. 3, May 1998.
Thorpe, "1988 Year End Report for Road Following at Carnegie Mellon", Carnegie Mellon University, May 31, 1989.
Thorpe et al., "Toward autonomous driving: the CMU Navlab. I. Perception", IEEE Paper, Aug. 1991.
Thorpe et al., "The 1997 Automated Highway Free Agent Demonstration", 1997 pp. 496-501, 1997.
Tokimaru et al., "CMOS Rear-View TV System with CCD Camera", National Technical Report vol. 34, No. 3, pp. 329-336, Jun. 1988, Japan.
Toth et al., "Detection of moving shadows using mean shift clustering and a significance test", Proceeding of IEEE International Conference on Pattern Recognition, vol. 4, 2004.
Toyota Motor Corporation, "Present and future of safety technology development at Toyota." 2004.
Trainor et al., "Architectural Synthesis of Digital Signal Processing Algorithms Using 'IRIS'", Journal of VLSI Signal Processing Systems for Signal, Image and Video Technology, vol. 16, No. 1, 1997.
Tremblay et al., "High resolution smart image sensor with integrated parallel analog processing for multiresolution edge extraction", Robotics and Autonomous Systems 11, pp. 231-242, with abstract, 1993.
Tribe et al., "Collision Avoidance," Advances, Issue No. 4, May 1990.
Tribe et al., "Collision Avoidance," Lucas International Symposium, Paris, France, 1989.
Tribe et al., "Collision Warning," Autotech '93, Seminar 9, NEC Birmingham, UK, Nov. 1993.
Tribe, "Intelligent Autonomous Systems for Cars, Advanced Robotics and Intelligent Machines," Peter Peregrinus, Nov. 1994.

(56) References Cited

OTHER PUBLICATIONS

Trivdei et al., "Distributed Video Networks for Incident Detection and Management", Computer Vision and Robotics Research Laboratory, 2000.
Tsugawa et al., "An automobile with artificial intelligence," in Proc. Sixth IJCAI, 1979.
Tsugawa et al., "Vision-based vehicles in japan; machine vision systems and driving control systems", IEEE Transactions on Industrial Electronics, vol. 41, No. 4, Aug. 1994.
Tsutsumi et al., "Vehicle Distance Interval Control Technology" Mitsubishi Electric Advance, Technical Reports, vol. 78, pp. 10-12, Mar. 1997.
Turk et al., "VITS—A Vision System for Autonomous Land Vehicle Navigation," IEEE Transactions on Pattern Analysis and Machine Intelligence, vol. 10, No. 3, May 3, 1988.
Tzomakas and von Seelen, "Vehicle Detection in Traffic Scenes Using Shadows," Internal report, Institut Für Neuroinformatik Bochum, Internal Report 98-06.
Ulmer, "VITA II—active collision avoidance in real traffic" Proceedings of the Intelligent Vehicles '94 Symposium, Oct. 24-26, 1994, Abstract.
Valeo Infos News, "Valeo's revolutionary Lane Departure Warning System makes debut on Nissan Infiniti vehicles", 04.08 found at http://www.valeo.com/cwscontent/www.valeo.com/medias/fichiers/journalistes/en/CP/Idws_uk.pdf, Mar. 31, 2004.
Van Leeuwen et al., "Motion Estimation with a Mobile Camera for Traffic Applications", IEEE, US, vol. 1, pp. 58-63, Oct. 3, 2000.
Van Leeuwen et al., "Motion Interpretation for In-Car Vision Systems", IEEE, US, vol. 1, , p. 135-140, Sep. 30, 2002.
Van Leeuwen et al., "Real-Time Vehicle Tracking in Image Sequences", IEEE, US, vol. 3, pp. 2049-2054, XP010547308, May 21, 2001.
Van Leeuwen et al., "Requirements for Motion Estimation in Image Sequences for Traffic Applications", IEEE, pp. 354-359, XP002529773, 2000.
Van Leeuwen et al., "Requirements for Motion Estimation in Image Sequences for Traffic Applications", IEEE, US, vol. 1, pp. 145-150, XP010340272, May 24, 1999.
Vellacott, "CMOS in Camera," IEE Review, pp. 111-114, May 1994.
Vlacic et al., "Intelligent Vehicle Technologies, Theory and Applications", Society of Automotive Engineers Inc., edited by SAE International, 2001.
Vosselman et al., "Road traceing by profile matching and Kalman filtering", Faculty of Geodetic Engineering, 1995.
Wallace et al., "Progress in Robot Road-Following," Proceedings of the 1986 IEEE International Conference on Robotics and Automation, vol. 3, pp. 1615-1621, 1986.
Wan et al., "A New Edge Detector for Obstacle Detection with a Linear Stereo Vision System", Proceedings of the Intelligent Vehicles '95 Symposium, Abstract.
Wang et al., "CMOS Video Cameras", article, 4 pages, University of Edinburgh, UK, 1991.
Wang et al., "A probabilistic method for foreground and shadow segmentation", Proceeding of IEEE International Conference on Image Processing, Pattern Recognition, vol. 3, Oct. 2, 2003.
Wang, "Camera Calibration by Vanishing Lines for 3-D Computer Vision", IEEE Transactions on Pattern Analysis and Machine Intelligence, vol. 13, No. 4, Apr. 15, 1991.
Weisser et al., "Autonomous driving on vehicle test tracks: Overview, implementation and vehicle diagnosis" Intelligent Transportation Systems, pp. 62-67, Oct. 5-8, 1999, Abstract.
Wierwille et al., "Research on Vehicle-Based Driver Status/Performance Monitoring, Part III" Final Report, Sep. 1996.
Wilson, "Technology: A little camera with big ideas—The latest smart vision system," Financial Times, Jun. 17, 1993.
Wolberg, "Digital Image Warping", IEEE Computer Society Press, 1990.
Wolberg, "A Two-Pass Mesh Warping Implementation of Morphing," Dr. Dobb's Journal, No. 202, Jul. 1993.
Wördenweber, "Driver assistance through lighting." ESV: 17th International Technical Conference on the Enhanced Safety of Vehicles. Report. No. 476. 2001.
Wright, "Take your hands off that car!", Edn. vol. 42, No. 26, Dec. 18, 1997, Abstract.
Wüller et al., "The usage of digital cameras as luminance meters", Proc. SPIE 6502, Digital Photography III, 65020U, Feb. 20, 2007; doi:10.1117/12.703205.
Wyatt et al., "Analog VLSI systems for Image Acquisition and Fast Early Vision Processing", International Journal of Computer Vision, 8:3, pp. 217-223, 1992.
Xie et al., "Active and Intelligent Sensing of Road Obstacles: Application to The European Eureka-Prometheus Project", Fourth International Conference on Computer Vision, IEEE, 1993, Abstract.
Xu et al., "3 DOF modular eye for smart car" School of Mechanical & Production Engineering Nanyang Technologies University, Intelligent Transportation Systems, 1999. Proc., Oct. 5-8, 1999, pp. 501-505.
Xu et al., "Cast shadow detection in video segmentation", Pattern Recognition Letters, vol. 26, Nov. 4, 2003.
Yadid-Pecht et al., "Wide Intrascene Dynamic Range CMOS APS Using Dual Sampling," IEEE Transactions on Electron Devices, vol. 44, No. 10, Oct. 1997.
Yamada et al., "Wide Dynamic Range Vision Sensor for Vehicles," 1994 Vehicle Navigation & Information Systems Conference Proceedings, pp. 405-408, 1994.
Yazigi, "Technology: Promethean Plans for Next Generation of Cars", The New York Times, Sep. 13, 1992.
Yee, "Portable Camera Mount", Feb. 1986, Abstract.
Yeh et al., "Image-Based Dynamic Measurement for Vehicle Steering Control", Proceedings of the Intelligent Vehicles '94 Symposium, 1994, Abstract.
Yerazunis et al. "An inexpensive, all solid-state video and data recorder for accident reconstruction" Mitsubishi Technical Report TR-99-29 (Presented at the 1999 SAE International Congress and Exposition, Detroit, MI, Mar. 3, 1999.), Apr. 24, 1999.
Yoneyama et al., "Moving cast shadow elimination for robust vehicle extraction based on 2D joint vehicle/shadow models", Proceeding of IEEE International Conference on Advanced Video and Signal Based Surveillance, 2003.
Yoneyama et al., "Robust vehicle and traffic information extraction for highway surveillance", EURASIP Journal on Applied Signal Processing, pp. 2305-2321, 2005.
Young et al., "Cantata: Visual Programming Environment for the Khoros System, ACM SIGGRAPH Computer Graphics-Special focus: modular visualization environments (MVEs)", vol. 29, issue 2, Mar. 16, 1995.
Young et al., "Improved Obstacle Detection by Sensor Fusion", IEEE Colloquium on "Prometheus and Drive", Oct. 15, 1992, Abstract.
Yu et al., "Vehicles Recognition by Video Camera" 1995.
Yu, "Road tracking, lane segmentation and obstacle recognition by mathematical morphology," Intelligent Vehicles '92 Symposium, Proceedings of the IEEE 1992 Conference, p. 166-172.
Yuji et al., "Accidents and Near-Misses Analysis by Using Video Drive-Recorders in a Fleet Test", Proceedings of the 17th International Technical Conference on the Enhanced Safety of Vehicles (ESV) Conference, Jun. 4-7, 2001 Amsterdam, The Netherlands, National Highway Traffic Safety Administration, Washington, DC. HS 809 20, Jun. 2001.
Zheng et al., "An Adaptive System for Traffic Sign Recognition," IEEE Proceedings of the Intelligent Vehicles '94 Symposium, pp. 165-170, Oct. 1994.
Zidek, "Lane Position Tracking", Aerospace and Electronics Conference, National Proceedings of the IEEE 1994, Abstract.
Zigman, "Light Filters to Improve Vision", Optometry and Vision Science, vol. 69, No. 4, pp. 325-328, Apr. 15, 1992.

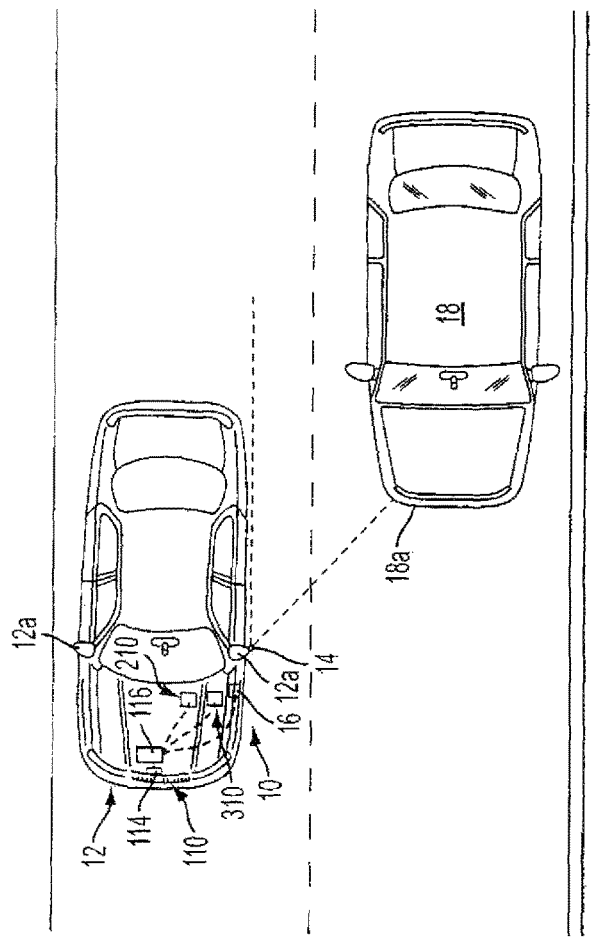
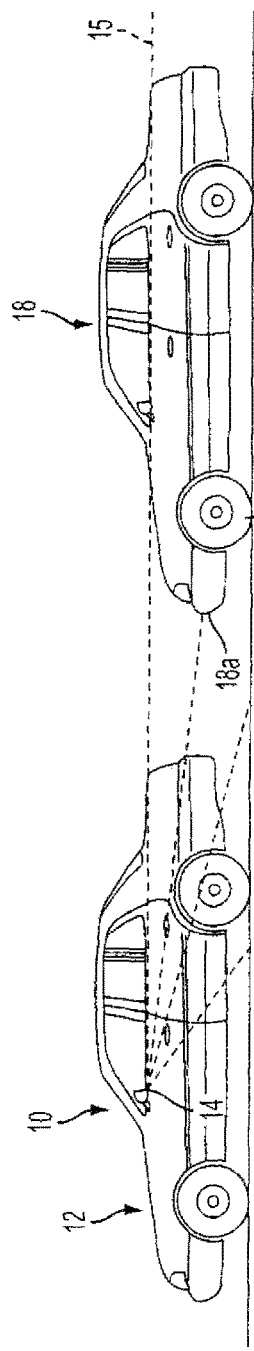

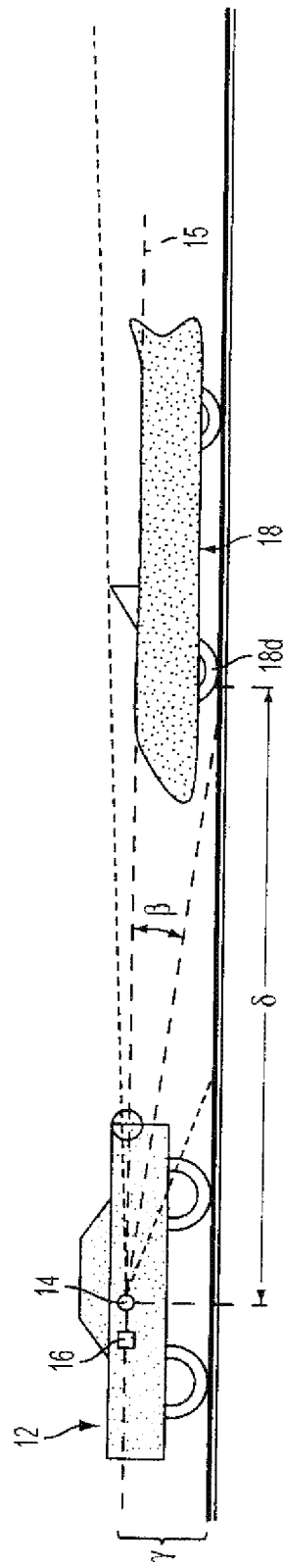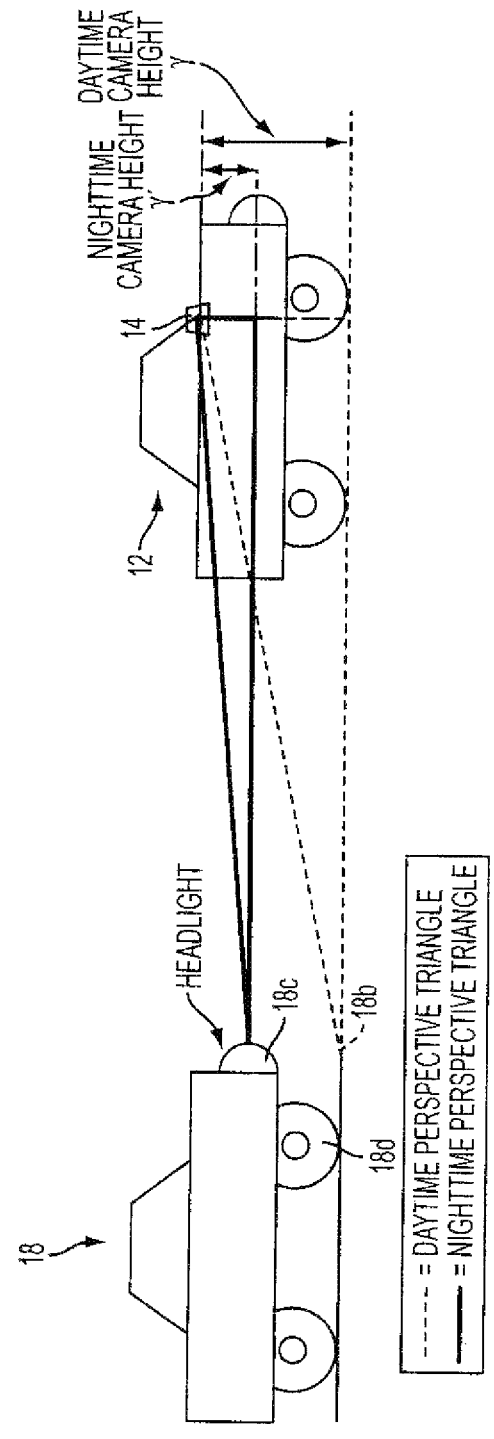

| -00002 | +00000 | +00002 | +00003 | +00004 |
|---|---|---|---|---|
| -00001 | +00000 | +00001 | +00002 | +00003 |
| -00001 | +00000 | +00001 | +00002 | +00003 |
| -00001 | +00000 | +00001 | +00002 | +00003 |
| -00002 | +00000 | +00002 | +00003 | +00004 |
| -00002 | +00000 | +00002 | +00003 | +00004 |
| -00003 | +00000 | +00003 | +00004 | +00005 |
| -00003 | +00000 | +00003 | +00004 | +00006 |

FIG. 11F

VEHICULAR CONTROL SYSTEM USING CAMERAS AND RADAR SENSOR

CROSS REFERENCE TO RELATED APPLICATIONS

The present application is a continuation of U.S. patent application Ser. No. 15/155,350, filed May 16, 2016, now U.S. Pat. No. 9,555,803, which is a continuation of U.S. patent application Ser. No. 14/922,640, filed Oct. 26, 2015, which is a continuation of U.S. patent application Ser. No. 14/195,137, filed Mar. 3, 2014, now U.S. Pat. No. 9,171,217, which is a continuation of U.S. patent application Ser. No. 13/651,659, filed Oct. 15, 2012, now U.S. Pat. No. 8,665,079, which is a continuation of U.S. patent application Ser. No. 12/559,856, filed Sep. 15, 2009, now U.S. Pat. No. 8,289,142, which is a divisional application of U.S. patent application Ser. No. 12/329,029, filed Dec. 5, 2008, now U.S. Pat. No. 7,679,498, which is a divisional application of U.S. patent application Ser. No. 11/408,776, filed Apr. 21, 2006, now U.S. Pat. No. 7,463,138, which is a divisional application of U.S. patent application Ser. No. 10/427,051, filed Apr. 30, 2003, now U.S. Pat. No. 7,038,577, which claims priority of U.S. provisional applications, Ser. No. 60/433,700, filed Dec. 16, 2002; and Ser. No. 60/377,524, filed May 3, 2002, which are all hereby incorporated herein by reference in their entireties.

FIELD OF THE INVENTION

The present invention relates generally to vision or imaging systems for vehicles and is related to object detection systems and, more particularly, to imaging systems which are operable to determine if a vehicle or object of interest is adjacent to, forward of or rearward of the subject vehicle to assist the driver in changing lanes or parking the vehicle. The present invention also relates generally to a lane departure warning system for a vehicle.

BACKGROUND OF THE INVENTION

Many lane change aid/side object detection/lane departure warning devices or systems and the like have been proposed which are operable to detect a vehicle or other object that is present next to, ahead of or rearward of the equipped vehicle or in an adjacent lane with respect to the equipped vehicle. Such systems typically utilize statistical methodologies to statistically analyze the images captured by a camera or sensor at the vehicle to estimate whether a vehicle or other object is adjacent to the equipped vehicle. Because such systems typically use statistical methodologies to determine a likelihood or probability that a detected object is a vehicle, and for other reasons, the systems may generate false positive detections, where the system indicates that a vehicle is adjacent to, forward of or rearward of the subject vehicle when there is no vehicle adjacent to, forward of or rearward of the subject vehicle, or false negative detections, where the system, for example, indicates that there is no vehicle adjacent to the subject vehicle when there actually is a vehicle in the adjacent lane.

Such known and proposed systems are operable to statistically analyze substantially all of the pixels in a pixelated image as captured by a pixelated image capture device or camera. Also, such systems may utilize algorithmic means, such as flow algorithms or the like, to track substantially each pixel or most portions of the image to determine how substantially each pixel or most portions of the image has changed from one frame to the next. Such frame by frame flow algorithms and systems may not be able to track a vehicle which is moving at generally the same speed as the equipped vehicle, because there may be little or no relative movement between the vehicles and, consequently, little or no change from one frame to the next. Because the systems may thus substantially continuously analyze substantially every pixel for substantially every frame captured and track such pixels and frames from one frame to the next, such systems may require expensive processing controls and computationally expensive software to continuously handle and process substantially all of the data from substantially all of the pixels in substantially each captured image or frame.

Many automotive lane departure warning (LDW) systems (also known as run off road warning systems) are being developed and implemented on vehicles today. These systems warn a driver of a vehicle when their vehicle crosses the road's land markings or when there is a clear trajectory indicating they will imminently do so. The warnings are typically not activated if the corresponding turn signal is on, as this implies the driver intends to make a lane change maneuver. Additionally, the warning systems may be deactivated below a certain vehicle speed. The driver interface for these systems may be in the form of a visual warning (such as an indicator light) and/or an audible warning (typically a rumble strip sound). One application warns a driver with an indicator light if the vehicle tire is crossing the lane marker and no other vehicle is detected in the driver's corresponding blind spot; and/or further warns the driver with an audible warning if the vehicle is crossing into the adjacent lane and there is a vehicle detected in the driver's blind spot.

There is concern that the current systems will be more of a driver annoyance or distraction than will be acceptable by the consumer market. Using the turn signal as the principle means of establishing to the warning system that the maneuver is intentional does not reflect typical driving patterns and, thus, many intended maneuvers will cause a warning. As a driver gets annoyed by warnings during intended maneuvers, the driver will likely begin to ignore the warnings, which may result in an accident when the warning is appropriate.

Therefore, there is a need in the art for an object detection system, such as a blind spot detection system or lane change assist system or lane departure warning system or the like, which overcomes the short comings of the prior art.

SUMMARY OF THE PRESENT INVENTION

The present invention is intended to provide an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, which is operable to detect and/or identify a vehicle or other object of interest at the side, front or rear of the vehicle equipped with the object detection system. The object detection system of the present invention, such as a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

In accordance with the present invention, portions or subsets of the image data of the captured image which are representative of areas of interest of the exterior scene where a vehicle or object of interest is likely to be present are weighted and utilized more than other portions or other subsets of the image data of the captured image representative of other areas of the exterior scene where such a vehicle or object of interest is unlikely to be present. Thus, in accordance with the present invention, a reduced set or subset of captured image data is processed based on where geographically vehicles of interest are realistically expected to be in the field of view of the image capture device. More specifically, for example, the control may process and weight the portion of the captured image data set that is associated with a lower portion of the image capture device field of view that is typically directed generally toward the road surface. Preferably, less than approximately 75% of the image data captured by the multi-pixel camera arrangement is utilized for object detection, more preferably, less than approximately 66% of the image data captured by the multi-pixel camera arrangement is utilized for object detection, and most preferably, less than approximately 50% of the image data captured by the multi-pixel camera arrangement is utilized for object detection.

It is further envisioned that the control may process or weight image data within the reduced set or subset which is indicative of physical characteristics of a vehicle or object of interest more than other image data within the reduced set which is not likely indicative of or cannot be indicative of such a vehicle or object of interest. The control thus may further reduce the processing requirements within the reduced set or sets of image data of the captured image.

Preferably, a multi-pixel array is utilized, such as a CMOS sensor or a CCD sensor or the like, such as disclosed in commonly assigned U.S. Pat. Nos. 5,550,677; 5,670,935; 5,796,094 and 6,097,023, and U.S. patent application Ser. No. 09/441,341, filed Nov. 16, 1999, now U.S. Pat. No. 7,339,149, which are hereby incorporated herein by reference, or such as an extended dynamic range camera, such as the types disclosed in U.S. provisional application Ser. No. 60/426,239, filed Nov. 14, 2002, which is hereby incorporated herein by reference. Because a multi-pixel array is utilized, the image or portion of the image captured by a particular pixel or set of pixels may be associated with a particular area of the exterior scene and the image data captured by the particular pixel or set of pixels may be processed accordingly.

According to an aspect of the present invention, an object detection system for a vehicle comprises a pixelated imaging array sensor and a control. The imaging array sensor is directed generally exteriorly from the vehicle to capture an image of a scene occurring exteriorly, such as toward the side, front or rear, of the vehicle. The control comprises an edge detection algorithm and is responsive to an output of the imaging array sensor in order to detect edges of objects present exteriorly of the vehicle. The control is operable to process and weight and utilize a reduced image data set or subset representative of a target area of the exterior scene more than other image data representative of other areas of the exterior scene. The target area or zone comprises a subset or portion of the image captured by the imaging array sensor and is representative of a subset or portion of the exterior scene within the field of view of the imaging array sensor. The control thus processes a reduced amount of image data and reduces processing of image data that is unlikely to indicate a vehicle or other object of interest. The imaging array sensor may be directed partially downwardly such that an upper portion of the captured image is generally at or along the horizon.

The control may be operable to process portions of the captured image representative of a target area of the scene and may reduce processing or reduce utilization of other portions of the captured image representative of areas outside of the target area and, thus, reduce the processing of edges or pixels which detect areas where detected edges are likely indicative of insignificant objects or which are not or cannot be indicative of a vehicle or significant object. The control is thus operable to process and weight and utilize image data from certain targeted portions of the captured image more than image data from other portions which are outside of the targeted portions or the target zone or area of interest.

The control may determine whether the detected edges within the target area are part of a vehicle in an adjacent lane in response to various characteristics of the detected edges which may be indicative of a vehicle or a significant object. For example, the control may be operable to process certain areas or portions or subsets of the captured image data or may be operable to process horizontal detected edges and filter out or substantially ignore vertical detected edges. The control may also or otherwise be operable to process detected edges which have a concentration of the edge or edges in a particular area or zone within the captured image. The control thus may determine that one or more detected edges are part of a vehicle in the adjacent lane in response to the edges meeting one or more threshold levels. Also, the control may adjust the minimum or maximum threshold levels in response to various characteristics or driving conditions or road conditions. For example, the control may be operable to process or substantially ignore detected edges in response to at least one of a size, location, intensity, distance, and/or speed of the detected edges relative to the vehicle, and may adjust the minimum or maximum threshold levels or criteria in response to a distance between the detected edges and the subject vehicle, a road curvature, lighting conditions and/or the like.

According to another aspect of the present invention, an imaging system for a vehicle comprises an imaging array sensor having a plurality of photo-sensing or accumulating or light sensing pixels, and a control responsive to the imaging array sensor. The imaging array sensor is positioned at the vehicle and operable to capture an image of a scene occurring exteriorly of the vehicle. The control is operable to process the captured image, which comprises an image data set representative of the exterior scene. The control is operable to apply an edge detection algorithm to the image captured by the imaging array sensor to detect edges or objects present exteriorly of the vehicle. The control may be operable to determine whether the detected edges or objects are indicative of a significant object or object of interest. The control is operable to process a reduced data set or subset of the image data set, which is representative of a target zone or area of the exterior scene, more than other image data representative of areas of the exterior scene which are outside of the target zone. The control thus may process image data of the reduced data set or subset, such as by applying an edge detection algorithm to the reduced data set, and substantially discount or limit processing of the other image data which is outside of the reduced data set or subset of the image or of the target zone of the exterior scene.

The control may be operable to adjust the reduced data set or subset and the corresponding target zone in response to various threshold criterion. The control may be operable to adjust the reduced data set or target zone in response to a distance to a detected edge or object. The control may approximate a distance to a portion of a detected edge or object in response to a location of the pixel or pixels capturing the portion in the captured image. The pixel location may be determined relative to a target pixel which may be directed generally at the horizon and along the direction of travel of the vehicle. For example, the control may be operable to approximate the distance using spherical trigonometry in response to a pixel size, pixel resolution and field of view of the imaging array sensor. The control may access an information array which provides a calculated distance for each pixel within the reduced data set or target zone to approximate the distance to the portion of the detected edge or object.

In order to determine if a detected edge or detected edges is/are part of or indicative of a vehicle, the control may be operable to determine if the detected edge or edges is/are associated with an ellipse or partial ellipse, since the ellipse or partial ellipse may be indicative of a tire of a vehicle near the equipped vehicle, such as a vehicle in a lane adjacent to the equipped vehicle. The control may also be operable to track one or more of the detected edges between subsequent frames captured by the imaging array sensor to classify and/or identify the object or objects associated with the detected edge or edges.

The object detection system or imaging system may comprise a lane change assist system operable to detect vehicles or objects of interest sidewardly of the vehicle. Optionally, the control may be in communication with a forward facing imaging system. The forward facing imaging system may communicate at least one of oncoming traffic information, leading traffic information and lane marking information to the control of the lane change assist system to assist the lane change assist system in readily identifying vehicles at the side of the subject vehicle or adjusting a reduced data set or an area or zone of interest within the captured image. The control may be operable to adjust the reduced data set or target zone in response to the forward facing imaging system.

Optionally, the object detection system or imaging system may comprise a forward facing imaging system, such as a lane departure warning system. The lane departure warning system may provide a warning or alert signal to the driver of the vehicle in response to a detection of the vehicle drifting or leaving its occupied lane.

Optionally, the forward facing imaging system may include or may be in communication with a passive steering system which is operable to adjust a steering direction of the vehicle in response to a detection by the imaging system of the vehicle drifting or leaving its occupied lane. Optionally, the forward facing imaging system may include or may be in communication with an adaptive speed control which is operable to adjust a cruise control or speed setting of the vehicle in response to road conditions or traffic conditions detected by the imaging system. Optionally, the imaging system may be in communication with a remote receiving device to provide image data to a display system remote from the vehicle such that a person remote from the vehicle may receive and view the image data with the remote receiving device to determine the location and/or condition of the vehicle or its occupants.

According to another aspect of the present invention, a lane change assist system for a vehicle comprises an imaging sensor and a control. The imaging sensor is positioned at the vehicle and directed generally sidewardly from the vehicle to capture an image of a scene occurring toward the side of the vehicle. The control is operable to process the image captured by the imaging array sensor to detect objects sidewardly of the vehicle. The captured image comprises an image data set representative of the exterior scene. The control is operable to process a reduced image data set of the image data set more than other image data of the image data set. The reduced image data set is representative of a target zone of the captured image.

The control may be operable to adjust the reduced data set or subset or target zone in response to an adjustment input. In one form, the adjustment input comprises an output from an ambient light sensor, a headlamp control and/or a manual control. The control may be operable to adjust the reduced data set or subset or target zone between a daytime zone and a nighttime zone in response to the output. The control may be operable to adjust a height input for the imaging array sensor such that the daytime zone is generally along the road surface and the nighttime zone is generally at a height of headlamps of vehicles.

In another form, the control may be operable to adjust the reduced data set or subset or target zone in response to a detection of the vehicle traveling through or along a curved section of road. The adjustment input may comprise an output from a forward facing imaging system or a detection by the imaging sensor and control that the vehicle is traveling through a curved section of road, such as by the imaging sensor and control detecting and identifying curved lane markers or the like along the road surface.

It is further envisioned that many aspects of the present invention are suitable for use in other vehicle vision or imaging systems, such as other side object detection systems, forward facing vision systems, such as lane departure warning systems, forward park aid systems or the like, rearward facing vision systems, such as back up aid systems or rearward park aid systems or the like, or panoramic vision systems and/or the like.

The present invention may also or otherwise provide a lane departure warning system that reduces and may substantially eliminate the provision of an unwarranted and/or unwanted visual or audible warning signals to a driver of a vehicle when the driver intends to perform the driving maneuver.

According to another aspect of the present invention, a lane departure warning system includes an imaging sensor mounted at a forward portion of a vehicle and operable to capture an image of a scene generally forwardly of the vehicle, and a control for providing a warning signal to a driver of the vehicle in response to an image captured by the imaging sensor. The control is operable to process the image captured to detect at least one of a lane marking, a road edge, a shoulder edge and another vehicle or object. The lane departure warning system provides the warning signal in response to a detected object or marking and further in response to the vehicle speed or other parameters which provide additional information concerning the likelihood that a warning signal is necessary.

Therefore, the present invention provides an object detection system or imaging system, such as a lane change assist system or other type of object detection or imaging system, which is operable to detect and identify vehicles or other objects of interest exteriorly, such as sidewardly, rearwardly, and/or forwardly of the subject vehicle. The imaging system may primarily process image data within a reduced data set or subset of the captured image data, where the reduced data set is representative of a target zone or area of interest within the field of view of the imaging system, and may adjust the reduced data set or zone or area in response to various inputs or characteristics, such as road conditions, lighting or driving conditions and/or characteristics of the detected edges or objects. The imaging system of the present invention is operable to detect edges of objects, and particularly horizontal edges of objects, to provide improved recognition or identification of the detected objects. The imaging system of the present invention may be operable to limit processing of or to filter or substantially eliminate or reduce the effect of edges or characteristics which are indicative of insignificant objects, thereby reducing the level of processing required on the captured images.

The edge detection process or algorithm of the lane change assist system of the present invention thus may provide for a low cost processing system or algorithm, which does not require the statistical methodologies and computationally expensive flow algorithms of the prior art systems. Also, the edge detection process may detect edges and objects even when there is little or no relative movement between the subject vehicle and the detected edge or object. The present invention thus may provide a faster processing of the captured images, which may be performed by a processor having lower processing capabilities then processors required for the prior art systems. The lane change assist system may also provide a low cost and fast approximation of a longitudinal and/or lateral and/or total distance between the subject vehicle and a detected edge or object exteriorly of the vehicle and may adjust a threshold detection level in response to the approximated distance.

These and other objects, advantages, purposes and features of the present invention will become apparent upon review of the following specification in conjunction with the drawings.

BRIEF DESCRIPTION OF THE DRAWINGS

FIG. 1 is a top plan view of a vehicle equipped with a lane change assist system in accordance with the present invention, as the vehicle travels along a section of road;

FIG. 2 is a side elevation of the vehicle of FIG. 1;

FIG. 3 is a schematic of a vehicle equipped with the lane change assist system of the present invention as the vehicle travels along a section of road;

FIG. 4 is another schematic of the vehicle and depicts how the lane change assist system of the present invention adapts between daytime and nighttime driving conditions;

FIGS. 11A-F are diagrams of a virtual camera and characteristics thereof useful in calculating a distance from the camera of the lane change assist system to an object detected in the field of view of the camera;

DESCRIPTION OF THE PREFERRED EMBODIMENTS

Figure 9:
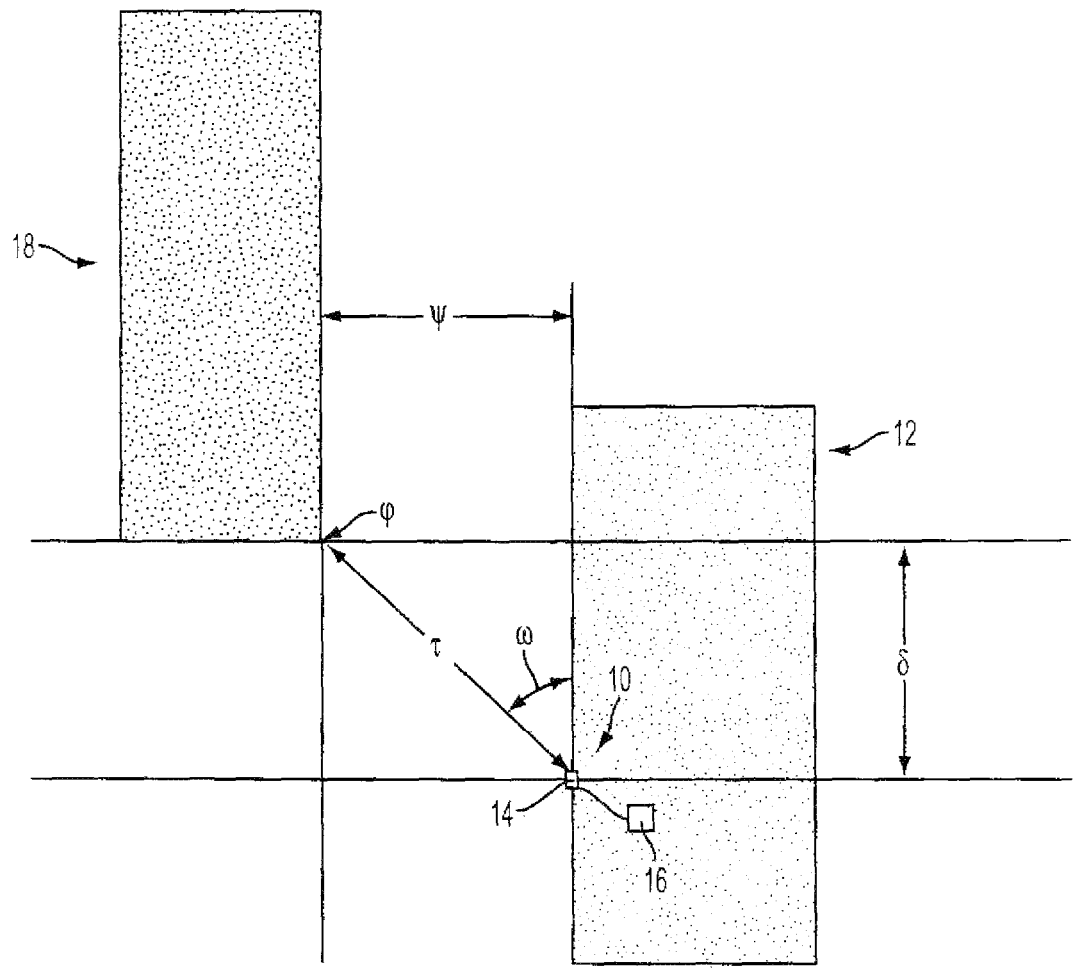
FIG. 9 is a block diagram of a top plan view of a vehicle equipped with the lane change assist system of the present invention and another vehicle as they travel along a section of road in adjacent lanes to one another.
Figure 10:
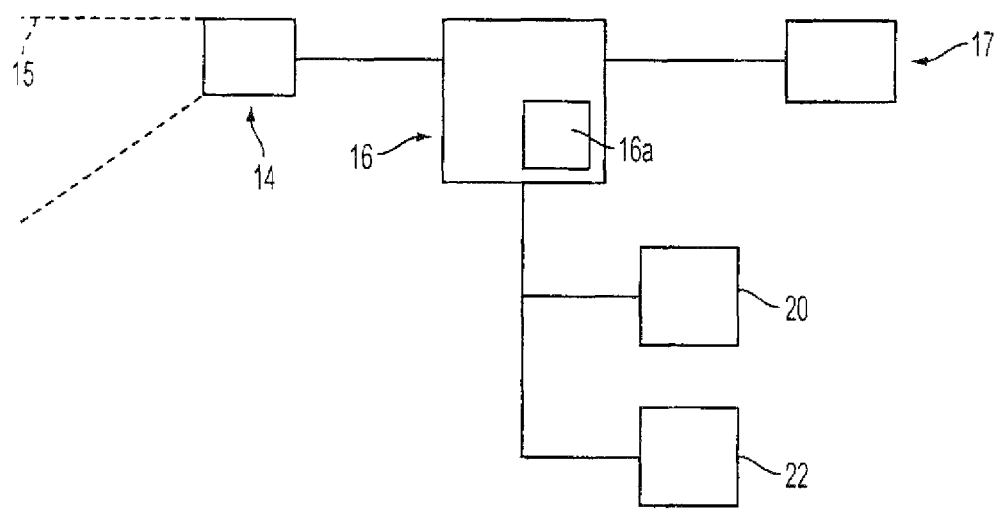
FIG. 10 is a block diagram of a lane change assist system in accordance with the present invention.

Referring now to the drawings and the illustrative embodiments depicted therein, an object detection system or imaging system, such as a lane change assist or aid system 10, is positioned at a vehicle 12 and is operable to capture an image of a scene occurring sidewardly and rearwardly at or along one or both sides of vehicle 12 (FIGS. 1-4 and 6). Lane change assist system 10 comprises an image capture device or sensor or camera 14 and a control 16 (FIGS. 3, 9 and 10). Camera 14 captures an image of the scene occurring toward a respective side of the vehicle 12, and control 16 processes the captured image to determine whether another vehicle 18 is present at the side of vehicle 12, as discussed below. Control 16 may be further operable to activate a warning indicator or display or signal device 17 (FIG. 10) to alert the driver of vehicle 12 that another vehicle is present at the side of vehicle 12. The warning or alert signal may be provided to the driver of vehicle 12 in response to another vehicle being detected at the blind spot area (as shown in FIG. 1) and may only be provided when the driver of vehicle 12 actuates a turn signal toward that side or begins turning the subject vehicle 12 toward that side to change lanes into the lane occupied by the other detected vehicle 18.

Camera or imaging sensor 14 of object detection system or lane change assist system 10 is operable to capture an image of the exterior scene within the field of view of the camera. The captured image comprises an image data set, which is representative of the exterior scene, and which is received by control 16. Control 16 is operable to process image data within a reduced data set or subset of the image data set more than other image data of the image data set to reduce the processing requirements of the control. The reduced data set or subset or subsets is/are representative of a target zone or area or areas in the exterior scene where a vehicle or other object of interest may realistically be expected to be present within the exterior scene. The control is thus operable to primarily process the significant or relevant area or areas of the scene more than less relevant areas, and may limit or reduce processing of or substantially ignore the image data representative of some areas of the exterior scene where it is not likely that a vehicle or other object of interest would be present or where a vehicle cannot be present.

Camera or imaging sensor 14 may comprise an imaging array sensor, such as a CMOS sensor or a CCD sensor or the like, such as disclosed in commonly assigned U.S. Pat. Nos. 5,550,677; 5,670,935; 5,796,094 and 6,097,023, and U.S. patent application Ser. No. 09/441,341, filed Nov. 16, 1999, now U.S. Pat. No. 7,339,149, which are hereby incorporated herein by reference, or an extended dynamic range camera, such as the types disclosed in U.S. provisional application Ser. No. 60/426,239, filed Nov. 14, 2002, which is hereby incorporated herein by reference. The imaging sensor 14 may be implemented and operated in connection with other vehicular systems as well, or may be operable utilizing the principles of such other vehicular systems, such as a vehicle headlamp control system, such as the type disclosed in U.S. Pat. No. 5,796,094, which is hereby incorporated herein by reference, a rain sensor, such as the types disclosed in commonly assigned U.S. Pat. Nos. 6,353,392; 6,313,454 and/or 6,320,176, which are hereby incorporated herein by reference, a vehicle vision system, such as a forwardly or sidewardly or rearwardly directed vehicle vision system utilizing the principles disclosed in U.S. Pat. Nos. 5,550,677; 5,670,935 and 6,201,642, and/or in U.S. patent application Ser. No. 09/199,907, filed Nov. 25, 1998, now U.S. Pat. No. 6,717,610, which are hereby incorporated herein by reference, a traffic sign recognition system, a system for determining a distance to a leading vehicle or object, such as utilizing the principles disclosed in U.S. Pat. No. 6,396,397, which is hereby incorporated herein by reference, and/or the like.

Camera 14 preferably comprises a pixelated imaging array sensor which has a plurality of photon accumulating light sensors or pixels 14a. The camera includes circuitry which is operable to individually access each photosensor pixel or element of the array of photosensor pixels and to provide an output or image data set associated with the individual signals to the control 16, such as via an analog to digital converter (not shown). As camera 14 receives light from objects and/or light sources in the target scene, the control 16 may then be operable to process the signal from at least some of the pixels to analyze the image data of the captured image, as discussed below.

Camera 14 may be positioned along one or both sides of vehicle 12, such as at or within the exterior rearview mirror 12a at either or both sides of vehicle 12. However, camera 14 may be positioned elsewhere along either or both sides and/or at the rear of the vehicle and directed sidewardly and rearwardly from the vehicle to capture an image at either side of the vehicle, without affecting the scope of the present invention. Camera 14 may be positioned at vehicle 12 and oriented or angled downwardly so as to capture an image which has an upper edge or region generally at the horizon 15, as can be seen with reference to FIGS. 2, 3 and 11C. Positioning or orienting the camera 14 in such a manner provides for an increased horizontal pixel count across the captured image at the important areas along the side of vehicle 12, since any vehicle or significant object positioned at or along a side of the subject vehicle will be substantially below the horizon and thus substantially within the captured image. The lane change assist system of the present invention thus may provide an increased portion of the captured image or increased pixel count at important or significant or relevant areas of the exterior scene, since the area well above the road or horizon is not as significant to the detection of a vehicle at or along a side of the subject vehicle. Additionally, positioning the camera to be angled generally downwardly also reduces the adverse effects that the sun and/or headlamps of other vehicles may have on the captured images. Camera 14 thus may be operable to capture substantially an entire image of the sideward scene below the horizon.

Control 16 is responsive to camera 14 and processes the signals received from at least some of the pixels of camera 14 to determine what is in the captured image. The present invention utilizes physical characteristics of vehicles and roads to reduce or filter out or substantially eliminate the signals from some of the pixels and to reduce or eliminate signals or detected images indicative of certain insignificant or unimportant objects detected within the captured image, as discussed below. For example, control 16 may primarily process the image data from pixels of camera 14 that are within a reduced data set or subset of the image data of the captured image. The reduced data set of the captured image may be representative of a targeted area or zone of interest of the exterior scene being captured by the camera. The targeted zone may be selected because it encompasses a geographic area of the exterior scene where a vehicle or other object of interest is likely to be present, while the other image data or areas or portions of the captured image may be representative of areas in the exterior scene where a vehicle or other object of interest is unlikely to be present or cannot be present, as discussed below. The present invention thus may provide for a quicker response time by control 16, since the control 16 does not continually process the signals from substantially all of the pixels 14a of camera 14. Preferably, less than approximately 75% of the image data captured by the camera is utilized for object detection, more preferably, less than approximately 66% of the captured image data is utilized for object detection, and most preferably, less than approximately 50% of the captured image data is utilized for object detection.

Control 16 may include a microprocessor having an edge detection algorithm or function 16a (FIG. 10) which is operable to process or is applied to the image data received from the individual pixels to determine whether the image captured by the pixels defines an edge or edges of a significant object, such as an edge or edges associated with or indicative of a bumper 18a of a vehicle 18 or the like. The edge detection function or algorithm 16a of control 16 allows lane change assist system 10 to interrogate complex patterns in the captured image and separate out particular patterns or edges which may be indicative of a vehicle in the adjacent lane, and to substantially ignore or limit processing of other edges or patterns which are not or cannot be indicative of a vehicle and thus are insignificant to lane change assist system 10. Other information or image data in the captured image or frame which is not associated with edges or which is not associated with significant edges (e.g. edges indicative of a portion of a vehicle), may then be substantially ignored or filtered out by control 16 via various filtering processes or mechanisms discussed below to reduce the information or image data being processed by control 16 and to reduce the possibility of a false positive detection by control 16. The edge detection function or algorithm 16a may comprise a Sobel gradient edge detection algorithm or other edge detection algorithms commercially available, and such as disclosed in U.S. Pat. Nos. 6,353,392 and 6,313,454, which are hereby incorporated herein by reference.

Control 16 may be operable to determine which edges detected are horizontal or generally horizontal edges and to limit processing of or to partially filter out or substantially ignore vertical edges. This may be preferred, since many edges in a vehicle in an adjacent lane will be horizontal or parallel to the road surface, such as edges associated with bumper lines, grills, fenders, and/or the like. Control 16 may thus reject or substantially ignore edges which are non-horizontal, thereby reducing the data to be processed. The edge detection algorithm 16a may also provide digital polarization of the captured images to determine horizontal gradients and to substantially ignore the effects of vertical gradients of the detected edges. For example, the edge detection algorithm may use a convolution matrix (such as a one by three matrix or other small matrix or array) which may be processed or applied to the image data in a single pass across the data received from the pixels 14a of the camera 14 to provide horizontally polarized edge detection through the captured image or a portion thereof. Such horizontal polarization greatly reduces the possibility that road signs and/or guardrails and/or the like will be processed and analyzed by the control of the lane change assist system of the present invention, thereby reducing the processing requirements and reducing the possibility of a false positive signal by the control.

Additionally, the edge detection algorithm 16a of control 16 may function to detect and determine if there is more than one vehicle present at the side of the subject vehicle 12. For example, control 16 may distinguish between edges constituting the fronts of different vehicles and edges constituting the front and side of the same vehicle, since the vehicle fronts typically will have more horizontal edges than the vehicle sides.

In order to further reduce the processing requirements and the possibility of a false positive indication, and thus enhance the response time and system performance, control 16 may process signals or image data from pixels that are oriented or targeted or arranged or selected to capture images of objects or items that are at least partially positioned within a predetermined or targeted area or zone of interest. The zone of interest may be defined by an area or region at the side of the subject vehicle where another vehicle or significant object may be positioned, such as in the blind spot region of that side of the vehicle, which would be significant or important to lane change assist system 10. For example, the zone of interest or "polygon of interest" may be directed rearward from the camera and toward or around the center of the adjacent lane. By substantially isolating the zone of interest, or substantially filtering out or substantially ignoring or reducing utilization of edges or signals or image data of the captured image which are representative of areas outside of the zone or area of interest, the system of the present invention may reduce the image data or information to be processed by control 16 and may substantially reduce the possibility that a false positive signal will occur. For example, if an object is detected substantially to one side or the other or substantially at the bottom of the captured image, such an object is not likely to be a vehicle positioned within the blind spot area of the subject vehicle 12, whereby control 16 may reduce processing of or may not process image data from the pixels capturing that area of the scene or may substantially ignore such a detected edge or object in subsequent processing of the image data captured by the pixels 14a of camera 14.

It is further envisioned that control 16 may process the image data of pixels capturing images representative of an area within the zone of interest and may not indicate a positive signal of a vehicle or other significant object in the adjacent lane unless a detected edge within the reduced image data set or subset or zone of interest is greater than a minimum size threshold, or spans a threshold number of pixels. Optionally, control 16 may require that a detected edge span or include a threshold number of pixels that are within a predetermined "hot zone" or specific targeted area within the zone of interest before the edge will be considered significant for further processing. The targeted zone or hot zone may be defined as a reduced zone or area near the center of the zone of interest or targeted road space or adjacent lane. The control 16 thus may require a substantial portion of the detected edge or edges to be within the smaller hot zone before the control may consider the edges to constitute a portion of a vehicle in the adjacent lane or other significant object. This also may substantially reduce the processing requirements and may substantially reduce the possibility of a false positive signal being generated by control 16.

The reduced image data set of the captured image which is representative of the zone of interest of the exterior scene may be adjusted by control 16 in response to various road or driving conditions, lighting conditions, and/or characteristics of the detected edges or objects. The reduced data set or zone of interest thus may be adaptable to various conditions encountered by the vehicle, such that the control may further reduce the processing requirements and enhance the efficiency of the system by primarily processing image data from some pixels and ignoring image data from other pixels depending on the present conditions surrounding the vehicle.

For example, as shown in FIG. 4, control 16 may be operable to adjust or adapt the image data subset or zone or area of interest between daytime and nighttime driving conditions. During daytime driving conditions, detecting the edge of the front horizontal shadow 18b (FIG. 4) of a vehicle 18 or the bumper 18b of a vehicle 18 may be the method for significant object or vehicle detection by the lane change assist system of the present invention. However, during nighttime driving conditions, where such vehicle characteristics may not be visible to the camera 14, the primary detection characteristic may be the headlights 18c of a vehicle 18 approaching from the rear of the subject vehicle. Control 16 may thus adjust or adapt the reduced data set or target zone in response to an output or signal from an ambient light sensor (which detects the ambient light intensity present at or around the subject vehicle), a headlamp control, a headlamp switch, a manual control or input and/or the like (shown generally at 20 in FIG. 10). More particularly, the reduced data set or zone of interest may be raised to correspond to the typical height or range of height of a headlight of a typical vehicle, so that control 16 may primarily process image data from pixels which receive light from headlamps of vehicles in the adjacent lane.

As shown in FIG. 4, the adjustment of the reduced data set or zone may be adjusted mathematically by changing the height ($\gamma$, $\gamma'$) of the camera as input to the control (such as between a daytime camera height shown generally at $\gamma$ and a nighttime camera height shown generally at $\gamma'$), such that all of the geometry of the zone of interest is adjusted upward. Because headlights of vehicles are generally within a certain distance or range above the road surface, the control may be operable to adjust the reduced data set or zone of interest to adapt to this geometric change in the detection characteristic. A daytime perspective triangle associated with the camera is shown generally at D in FIG. 4, while a nighttime perspective triangle associated with the camera is shown generally at N in FIG. 4.

Figure 6:
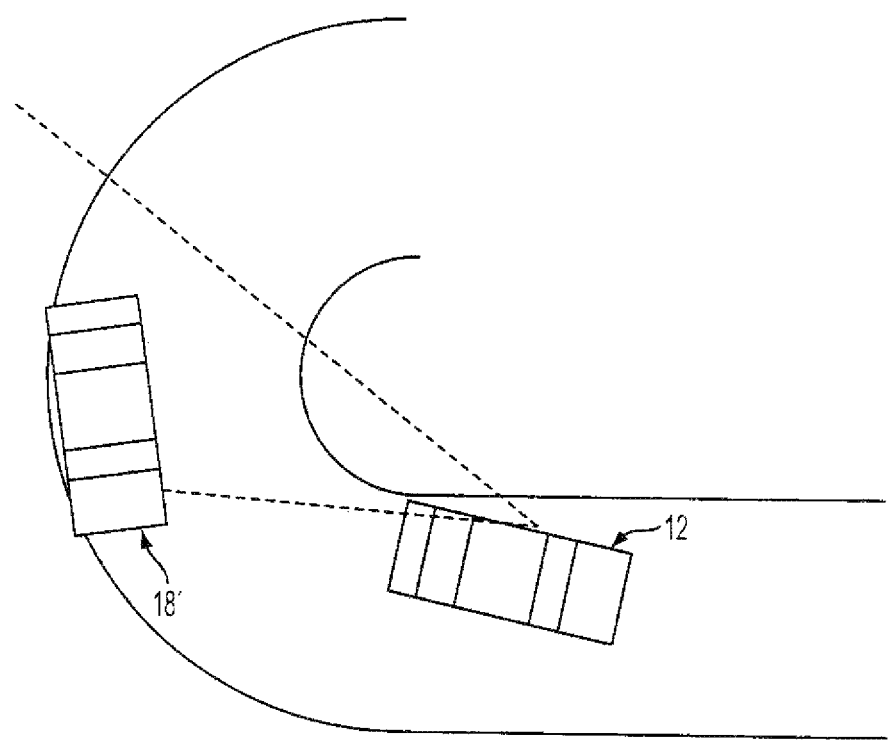
FIG. 6 is a top plan view of a vehicle equipped with the lane change assist system of the present invention, as the vehicle travels around a sharp curve in a section of road.
Figure 7:
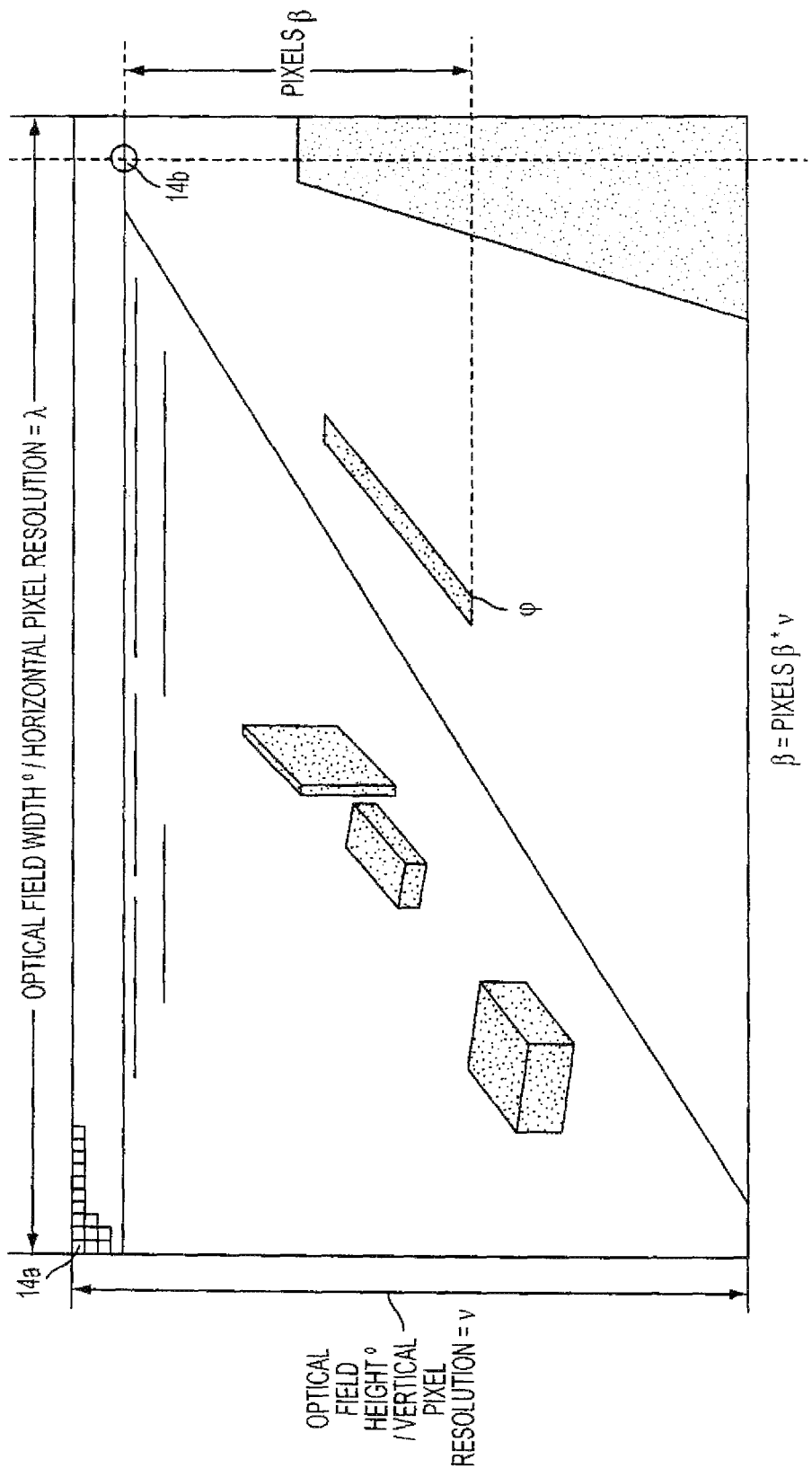
FIG. 7 is a schematic of a pixelated image as may be captured by a camera or image sensor of a lane change assist system in accordance with the present invention.
Figure 8:
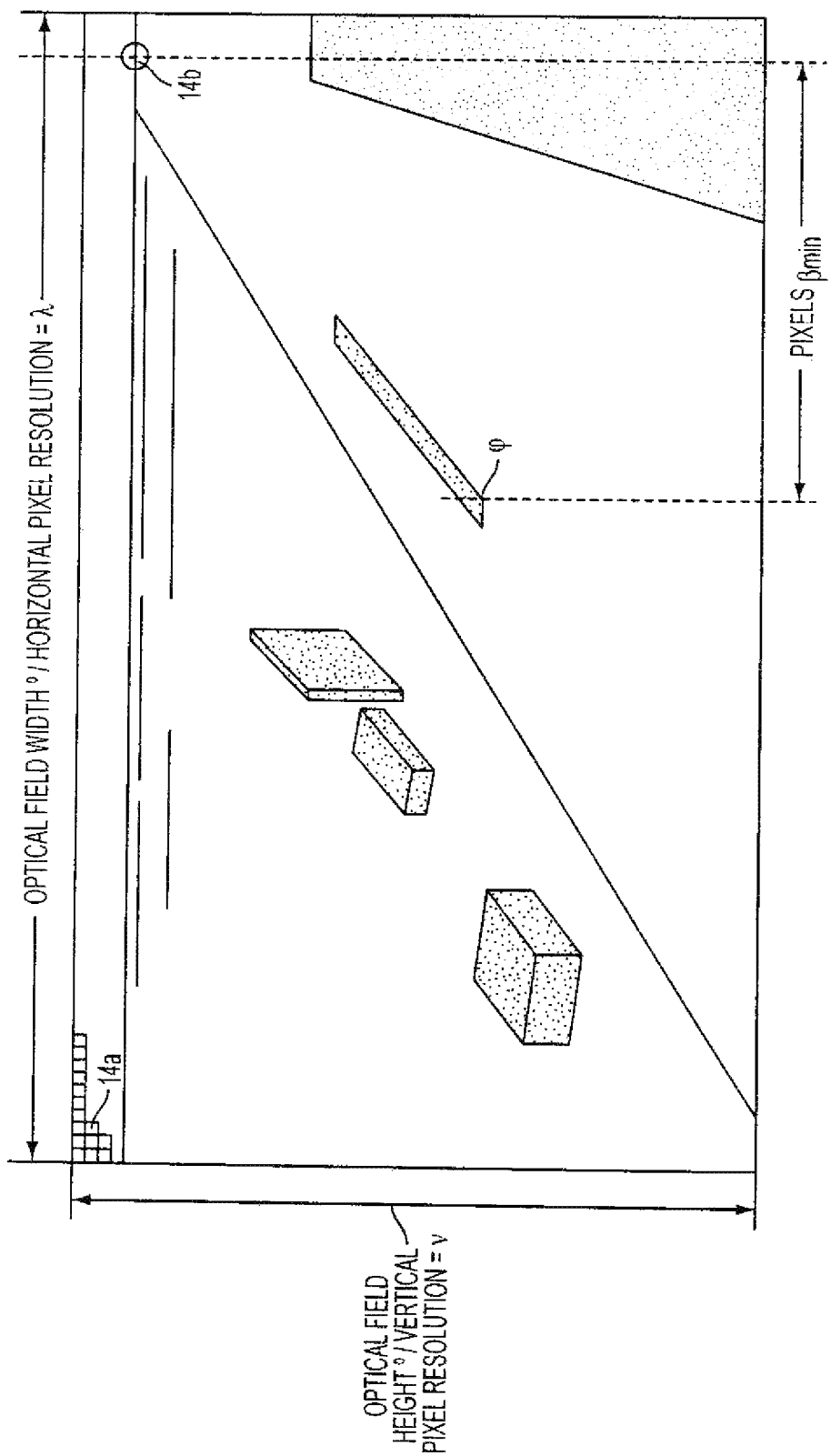
FIG. 8 is a schematic of another pixelated image similar to FIG. 7.

It is further envisioned that the reduced data set or area or zone of interest may be changed or adapted to accommodate sharp curves in the road that the subject vehicle 12 is traveling through or has traveled through. In situations where a vehicle travels along a sharp curve in the road, a lane change assist system may consider a guardrail or vehicle 18' in another lane to be a vehicle or object of interest in the adjacent lane, since the other vehicle or object may be positioned generally at or near the zone of interest of the lane change assist system, as can be seen in FIG. 6. Control 16 may be operable to process the image data or signals from the pixels 14a of camera 14 to determine lane markers along the road, or a shoulder of the road or the like, in order to determine the road curvature as the vehicle 12 travels along the section of road. In situations where a sharp curve in the road is detected, control 16 may be operable to alter or reshape the reduced data set or area or zone of interest and/or to adjust the distance thresholds (discussed below) or to adjust other filtering characteristics or criteria or thresholds to accommodate such a curve in the road. The lane change assist system of the present invention thus may use road curvature information to adjust how far back and/or where the camera and/or control may look for significant objects or vehicles. The lane change assist system thus substantially avoids providing a false positive signal upon detection of another vehicle 18' or guardrail or the like which is not in the adjacent lane, since such a vehicle or object may not be within the adjusted zone of interest of the lane change assist system.

Optionally, control 16 may be further operable to substantially eliminate or substantially ignore image data representative of objects or edges which are too large or too small to be considered part of a vehicle in the adjacent lane. If a detected edge is too small, such as if the horizontal pixel span or vertical pixel span is very small, the control may reduce processing of the edge or the edge may be removed from further processing, since it does not represent a significant edge to the lane change assist system 10. Likewise, if an edge is too large, the control may reduce processing of the edge or it may also be removed from further processing since it does not represent a vehicle in the adjacent lane. The threshold size of the detected edge or object may also vary in response to the distance to the edge or object, as discussed below.

Additionally, lane change assist system 10 may be operable to determine whether a detected edge or object is a vehicle in an adjacent lane in response to one or more other detection thresholds or criteria. Further, control 16 may be operable to vary one or more detection thresholds or criteria at which a detected edge or object is considered a vehicle or significant object. The threshold values may thus be variable and may be adjusted in response to driving conditions, road curvature, location of the detected edges and/or the distance between the camera and the detected object and/or the like. For example, the threshold value or values may be adjusted in response to the distance so that control 16 more readily accepts and processes detected edges as the object they are representative of gets closer to or approaches the subject vehicle.

For example, control 16 may have a minimum gradient threshold at which control 16 determines whether or not a detected edge is to be included in further processing of the captured image. Control 16 thus may be operable to determine the vertical and/or horizontal gradient of the detected edges and may substantially eliminate or filter out edges with a gradient below a threshold gradient level, since such edges cannot be representative of a vehicle or object which is significant to the lane change assist system. The control thus may further substantially preclude false positive signals and reduce further processing of the pixel signals.

However, as an object or other vehicle approaches the subject vehicle 12, the detected edge or edges representative of the object tends to resolve or reduces and spreads out the gradient across multiple pixels, thereby reducing the gradient at a particular pixel. Control 16 thus may be further operable to adjust the minimum gradient threshold in response to the distance to the detected object. By using a calculated or estimated or approximated distance to the detected object or a table of perspective calculations or distance approximations, discussed below, the minimum gradient threshold may be reduced proportionally in response to the estimated or tabulated distance data to provide enhanced edge detection at closer ranges.

By detecting edges of objects within the reduced data set or zone or area of interest (and adjusting the zone of interest for particular driving conditions or situations), and by focusing on or concentrating on or primarily processing the horizontal edges detected or other edges which may be indicative of a vehicle or significant object, while substantially filtering out or substantially ignoring other image data or edges or information, the present invention substantially reduces the possibility of false positive signals. In order to further reduce the possibility of such false positive signals, control 16 may be operable to determine a distance between a detected object and the subject vehicle to further filter out or substantially eliminate objects that are not within a predetermined range or threshold distance from the subject vehicle and which, thus, may be insignificant to the lane change assist system of the present invention.

In a preferred embodiment, camera 14 and control 16 may be operable to approximate the distance to an object or vehicle in response to a pixel count of the number of pixels between the pixels capturing the object (or an edge of the object) and the pixels along an edge of the camera or directed toward and along the horizon of the captured image. More particularly, with the camera 14 oriented with the video frame horizontal scan lines or pixels being generally parallel to the horizon, perspective calculations may be made to provide a table of entries of particular distances which correspond to particular horizontal lines or pixels in the video frame which may detect or sense a forward edge of an adjacent vehicle at the ground level, such as an edge corresponding to a shadow of the front of the vehicle 18 or an edge corresponding to the intersection of the tire 18d of the vehicle 18 on the road surface or the like. The distance to an object captured by an edge detected in the captured image may then be approximated by determining a vertical pixel count and retrieving the appropriate distance entry corresponding to that particular horizontal line or pixel count or position. The present invention thus provides for a quick and inexpensive means for determining or estimating or approximating the distance between the subject vehicle and an object or edge detected in the area or zone of interest by determining a horizontal line count from the horizon down to the pixels capturing the detected edge.

As can be seen with reference to FIGS. 3 and 7-9 and as discussed below, the location and distance of a closest point ϕ on a detected edge or object relative to camera 14 or subject vehicle 12 may be calculated based on known or assigned parameters of the location of camera 14 and a horizontal and vertical pixel count between a target or alignment point 14b (FIGS. 7 and 8) and the closest point ϕ. This may be accomplished because the lowest detected edge of a vehicle may be considered to be indicative of a forward shadow of the front bumper of the vehicle on the road surface or may be indicative of the intersection of the tire and the road surface. Because such edges are generally at or near the road surface, the distance to the detected object may be calculated using known geometrical equations given the height of the camera on the subject vehicle (as input to the control). Control 16 thus may quickly determine the distance to a detected object and may be easily calibrated for different applications of the lane change assist system. The calculated distances corresponding to at least some of the pixels 14a of camera 14 may be entered into a table or database, such that control 16 may be operable to quickly obtain an estimated distance between the camera and the closest point of a detected edge or object once at least the vertical pixel count between the closest point ϕ and the horizon or target or alignment point 14b is determined.

More particularly, in order to determine the total distance between camera 14 and the closest point of a detected edge or object, the lateral distance ψ and longitudinal distance δ may be calculated and used to obtain the total distance T. Because the lateral distance ψ should be approximately constant for an edge or vehicle detected in the zone or area corresponding to the adjacent lane, the lane change assist system 10 may only calculate or tabulate and access the longitudinal distance δ for the detected edges, whereby the distances may be calculated and tabulated for each horizontal line count down from the horizon or target point. More particularly, the longitudinal distance δ may be calculated or approximated by determining a pixel count (Pixels$_\beta$) downward from the horizon 15 to the detected edge or point ϕ. The pixel count may be used to obtain a value for the downward angle β (FIG. 3) between camera 14 and the detected object, which is derived from the following equation (1):

$$\beta = \text{Pixels}_\beta * v; \qquad (1)$$

where v is the vertical view angle per pixel of the camera and is obtained via the following equation (2):

$$v = (\text{Optical Field Height Degrees})/(\text{Vertical Pixel Resolution}); \qquad (2)$$

where the Optical Field Height Degrees is the vertical angle of view of the camera and the Vertical Pixel Resolution is the number of horizontal rows of pixels of the camera. The downward angle β is then calculated to determine the angle between the horizon and the forward edge of the detected object at the ground. The longitudinal distance δ between the vehicles may then be determined or approximated by the following equation (3):

$$\delta = \gamma * \tan(90° - \beta); \qquad (3)$$

where γ is the height of the camera 14 above the ground as input to the control 16, and as best shown with reference to FIG. 3. As discussed above, the height input to control 16 may be adjusted between γ and γ' (FIG. 4) to adjust the zone of interest for daytime versus nighttime driving conditions. Such an adjustment also adjusts the distance calculations to determine the distance to the detected headlamps, which are above the ground or road surface.

Likewise, if desired, the lateral or sideward location or distance ψ to the closest point ϕ on the detected edge or object may be calculated by obtaining a horizontal pixel count Pixel$_{\beta min}$, such as by counting or determining the pixels or pixel columns from the alignment point 14b horizontally across the captured image to the pixel column corresponding to the closest point ϕ. This pixel count value may be used to calculate the lateral distance to the detected edge or object, which may in turn be used to calculate or estimate the total distance to the detected object. More particularly, the lateral angle w (FIG. 9) between camera 14 at the side of vehicle 12 and the detected object may be determined by the following equation (4):

$$\omega = \text{Pixel}_{\beta min} * \lambda; \qquad (4)$$

where λ is the horizontal view angle per pixel of the camera and is obtained via the following equation (5):

$$\lambda = \text{Optical Field Width Degrees/Horizontal Pixel Resolution}; \qquad (5)$$

where the Optical Field Width Degrees of camera 14 is the angle of view of the camera and the Horizontal Pixel Resolution is the number of columns of pixels of camera 14.

Optionally, the lateral angle ω (FIG. 9) between camera 14 at the side of vehicle 12 and the detected object may be determined using spherical trigonometry, which may provide a more accurate lateral angle ω determination than equations 4 and 5 above. Using spherical trigonometry, discussed below, or the equations set forth above, a table (image space) of horizontal angles may be produced at initialization or startup of the lane change assist system 10 to determine the horizontal angle for each pixel position on the captured image. Because the horizontal angle is not independent of the vertical angle, an image space may be created and the horizontal view angle of every pixel may be stored therein. An example of such an image space or array is depicted in FIG. 11F.

In determining the perspective geometry, the parameters of a virtual camera 14' are determined or assigned and implemented (see FIGS. 11A-11E). The virtual camera 14' does not actually exist, but calculations may be made to determine an effective focal length (in pixels) of the virtual camera. To work with the perspective geometry, spherical trigonometry may be employed to determine where each pixel on the camera is directed toward. In spherical trigonometry, lateral angles may be calculated based on both horizontal and vertical pixel positions of the detected edge grouping or point. The relationship between horizontal angles and vertical angles may be used to calculate or generate a table of horizontal angles and/or distances to an edge or object detected by each pixel.

The virtual camera geometry may be calculated and used to determine the relationship between each pixel of the captured image and the location on the road surface that the pixel corresponds to. These calculations may be based on an assumption that lines perpendicular to the direction of travel of the subject vehicle may be on a plane which is generally parallel to the horizon and, thus, parallel to the image or pixel lines or rows, since the camera is positioned or oriented such that the horizontal rows of pixels are generally parallel to the horizon. This allows the control to determine the distance along the vehicle forward direction in response to the row of pixels on which the object has been detected, assuming that the camera is detecting an edge of the detected object or other vehicle (such as the front shadow edges, tires or the like) along the pavement or road surface.

Figure 11A:
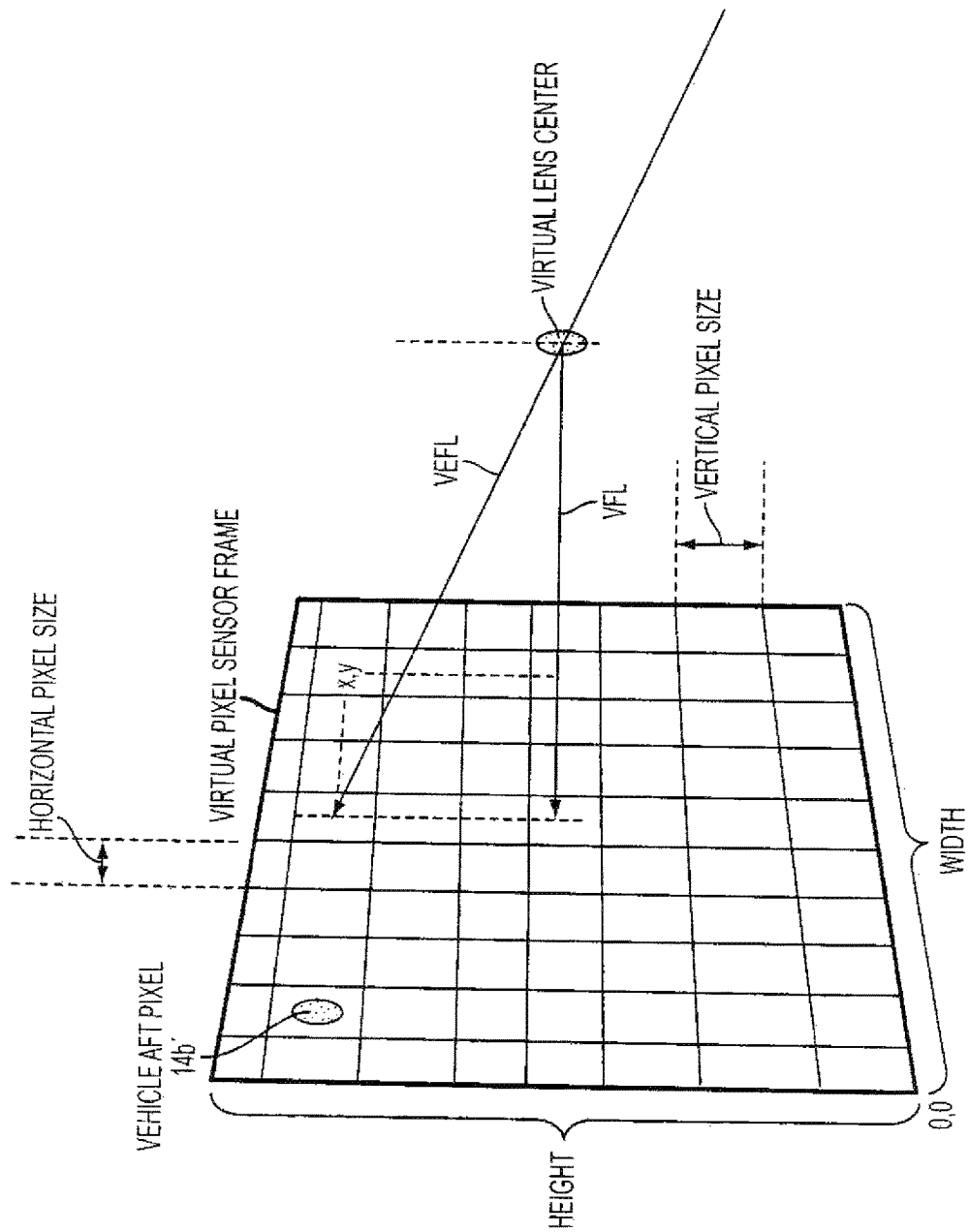
Figure 11B:
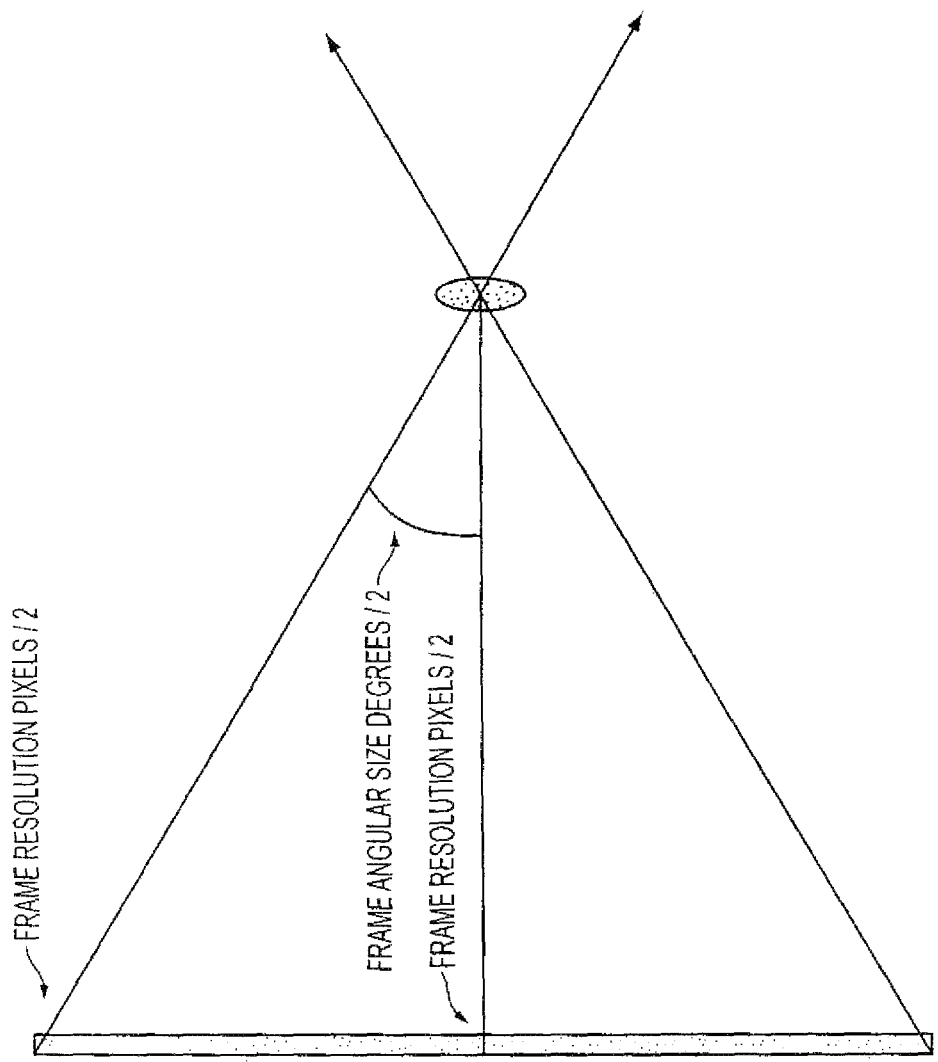
Figure 11C:
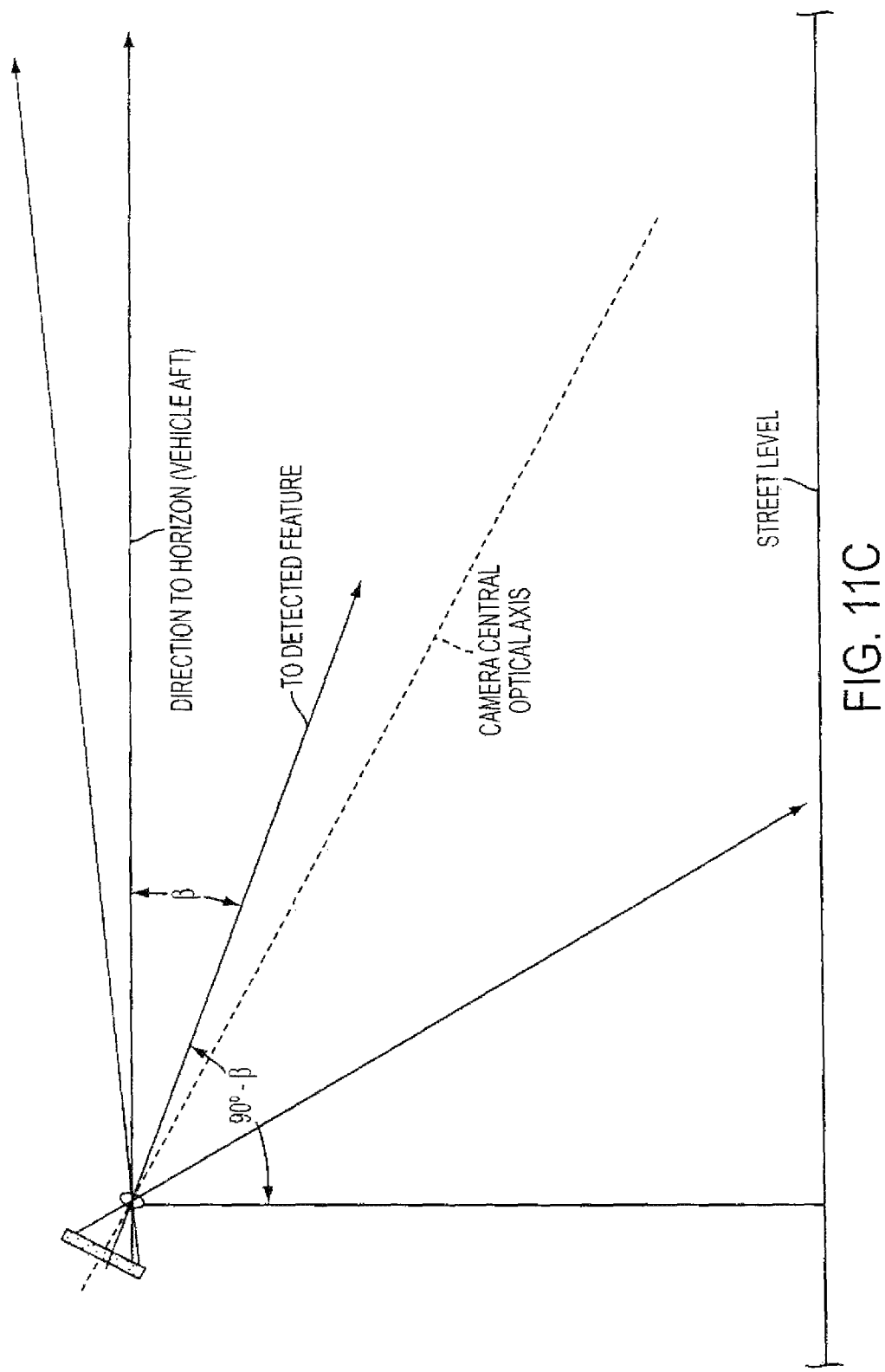
Figure 11D:
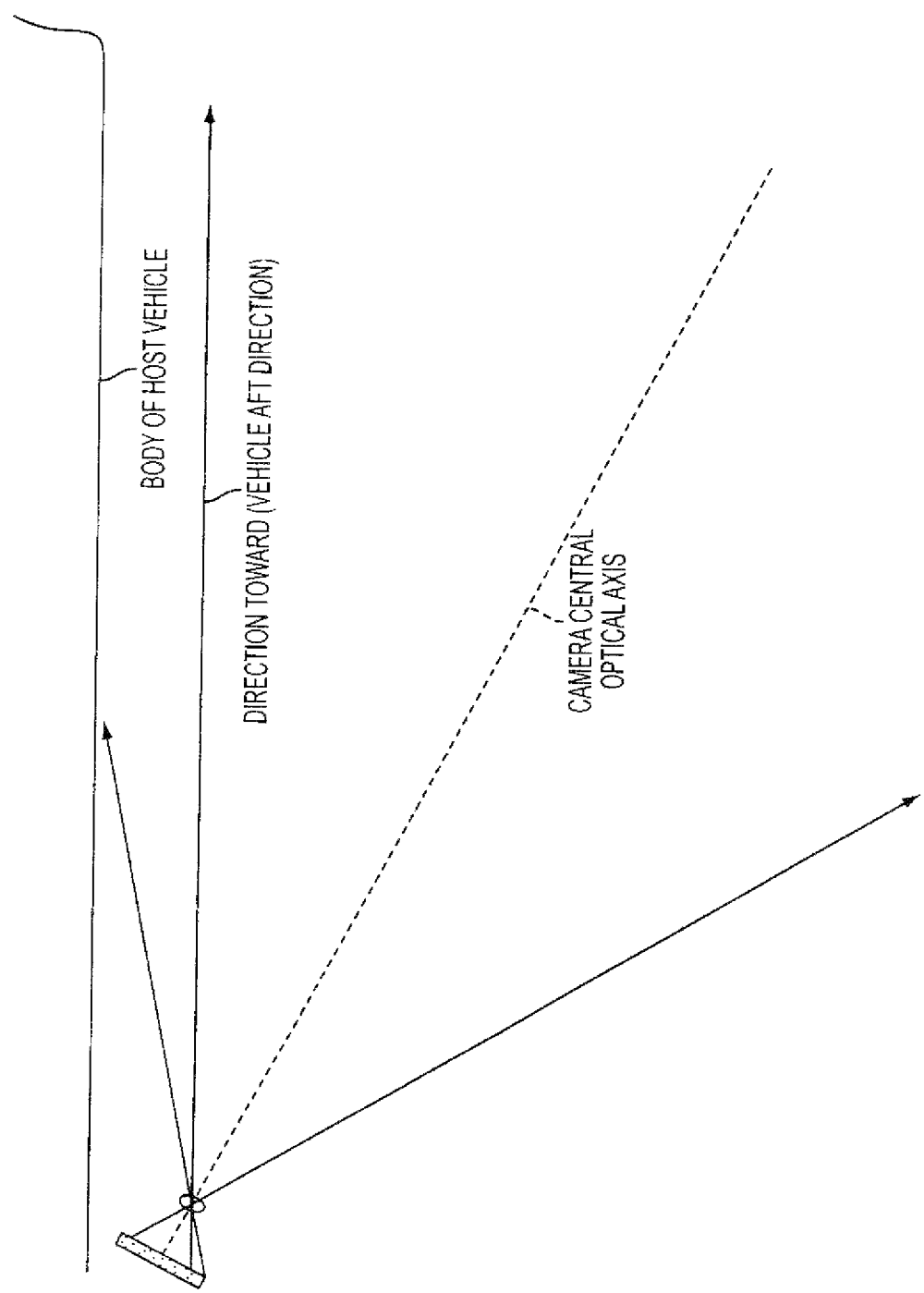
Figure 11E:
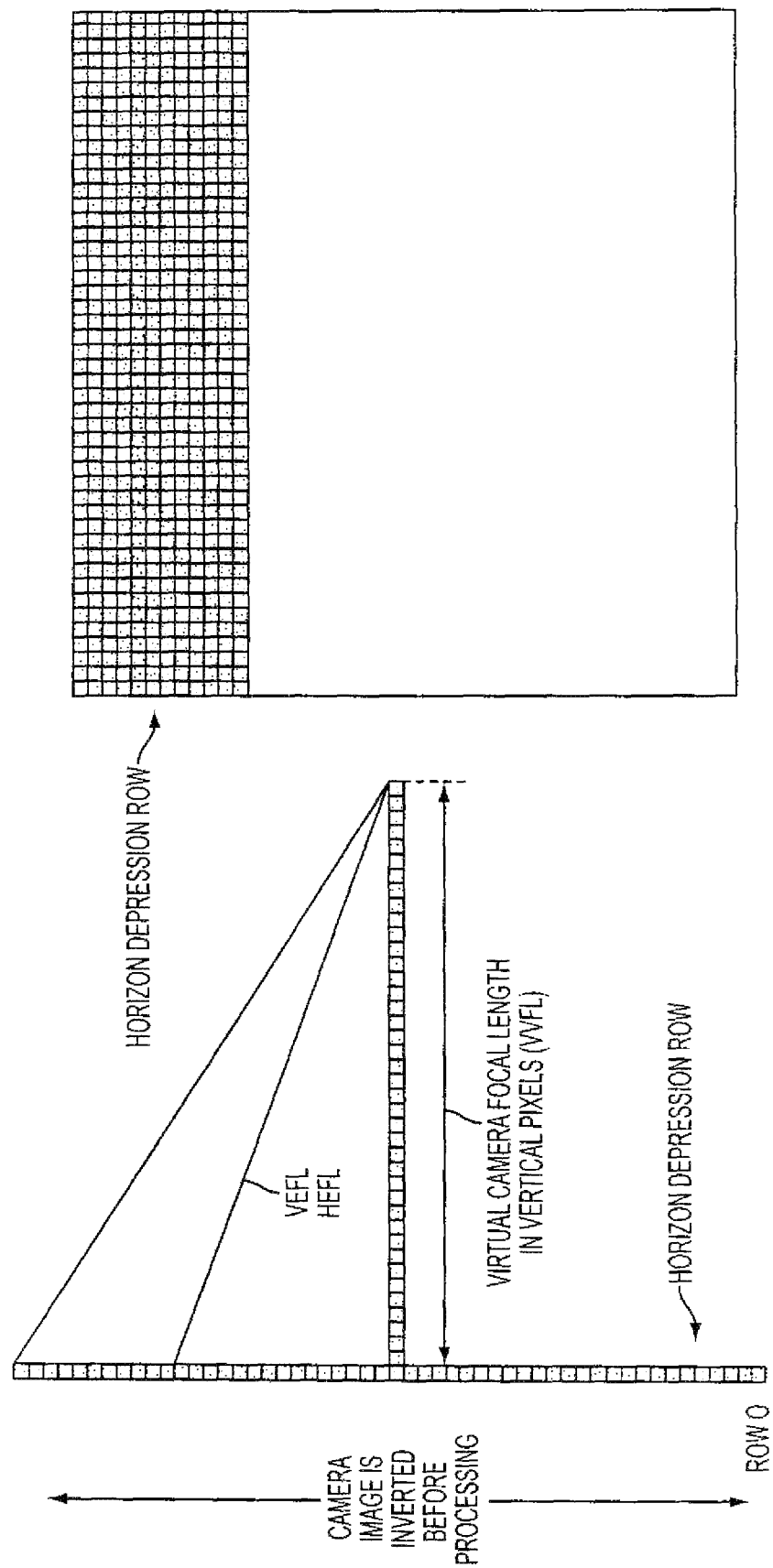

An array of pixels 14a' and a focal length (in pixels) vfl of the virtual camera 14' is shown in FIGS. 11A, 11B and 11E. The virtual focal length vfl at the frame center of the virtual camera 14' may be determined by the following equation (6):

$$vfl = (\text{Pixel Resolution}/2)/(\tan(\text{Frame Angular Size}/2)); \qquad (6)$$

where the Frame Angular Size is the angular field of view of the camera 14. This equation may be used to calculate the virtual focal length of an imaginary pinhole camera with an infinitely small pinhole lens in vertical pixels vvfl and the virtual focal length in horizontal pixels hvfl using the pixel resolutions and frame angular sizes in the vertical and horizontal directions, respectively. The virtual focal length is calculated in both vertical pixel units and horizontal pixel units because the vertical and horizontal sizes of the pixels may be different and the camera may have a different pixel resolution and frame angular size or field of view between the vertical and horizontal directions.

The vertical or downward view angle β to the object may be determined by the following equation (7):

$$\beta = \arctan(\text{Vertical Pixels})/(\text{vvfl}); \quad (7)$$

where Vertical Pixels is the number of pixels or rows of pixels down from the target row or horizon. The view angle thus may be calculated for any line of pixels according to equation (7). An array for each of the view angle values may be calculated and stored for rapid distance calculations. The downward angle β may then be used to calculate the longitudinal distance δ in a similar manner as discussed above. As discussed above, the longitudinal distance calculations assume that for a detected edge or object along a row of pixels, the longitudinal distance to the edge or object is the same for any pixel along the row, since the camera is oriented with the rows of pixels being generally parallel to the horizon and generally perpendicular to the direction of travel of the vehicle.

In order to determine the location and angle and distance to a detected object or edge (which may be represented by a point along an object, such as at coordinate x, y of the pixel array (FIG. 11A)), the effective focal length of the virtual camera for the point on the detected object may be calculated. As shown in FIG. 11E, the effective focal length in vertical pixels (vefl) may be calculated by the following equation (8):

$$\text{vefl} = (\text{vvfl}^2 + (y - \text{height}/2)^2)^{1/2}; \quad (8)$$

where height/2 is one-half of the vertical image height (in pixels) of the camera. The effective focal length in horizontal pixels (hefl) may then be calculated by converting the effective focal length in vertical pixel units to horizontal pixel units via the following equation (9):

$$\text{hefl} = \text{hvfl} \cdot \text{vefl}/\text{vvfl}. \quad (9)$$

The horizontal angle ω to the detected point in the image may be calculated via the following equation (10):

$$\omega = \arctan(\text{Horizontal Pixels}/\text{hefl}); \quad (10)$$

where Horizontal Pixels is the number of columns of pixels (or horizontal distance in pixels) that the point x, y is from the target or alignment or aft point or pixel. The Horizontal Pixels value may be counted or calculated by the control. The calculations for the Horizontal Pixels value may be different for the opposite sides of the vehicle in applications where the zero coordinate of the pixel array may be on the vehicle side of the array for a camera on one side of the vehicle, such as on the passenger side of the vehicle, and may be on the outside of the array for a camera on the other side of the vehicle, such as on the driver side of the vehicle. In the illustrated embodiment of FIG. 11A, the Horizontal Pixels may be calculated by subtracting the x-coordinate for the aft pixel or alignment point 14b' from the x-coordinate of the detected point x, y.

Such calculations may provide a more precise and true value for the lateral angle ω between the camera 14 and the detected object. The lateral distance ψ to the detected object may thus be calculated by the following equation (11):

$$\psi = \delta \cdot \tan(\omega). \quad (11)$$

Accordingly, the actual distance T between camera 14 and the closest point on the detected object may be obtained by the following equation (12):

$$T = (\delta^2 + \psi^2)^{1/2}. \quad (12)$$

Because the lateral, longitudinal and total distances are calculated using certain known or obtainable characteristics and geometrical relationships, such as the input height of camera 14 above the ground, the pixel resolution of camera 14, the field of view of the camera, and a pixel count in the horizontal and vertical direction with respect to a target point or alignment target and/or the horizon, the calculated distance and/or angle values for each pixel count or location may be entered into a table to provide a rapid response time for determining the distance to the detected edge or object once the pixel count or location of the detected edge is known.

As discussed above, the lane change assist system may only be concerned with the longitudinal distance δ to the detected edge. Control 16 may thus determine a vertical pixel count and approximate the longitudinal distance to the detected object or edge via equations (1), (2) and (3) or via the data table, thereby significantly reducing the processing requirements of control 16 to estimate or calculate the distance to the detected edges or objects.

Figure 5:
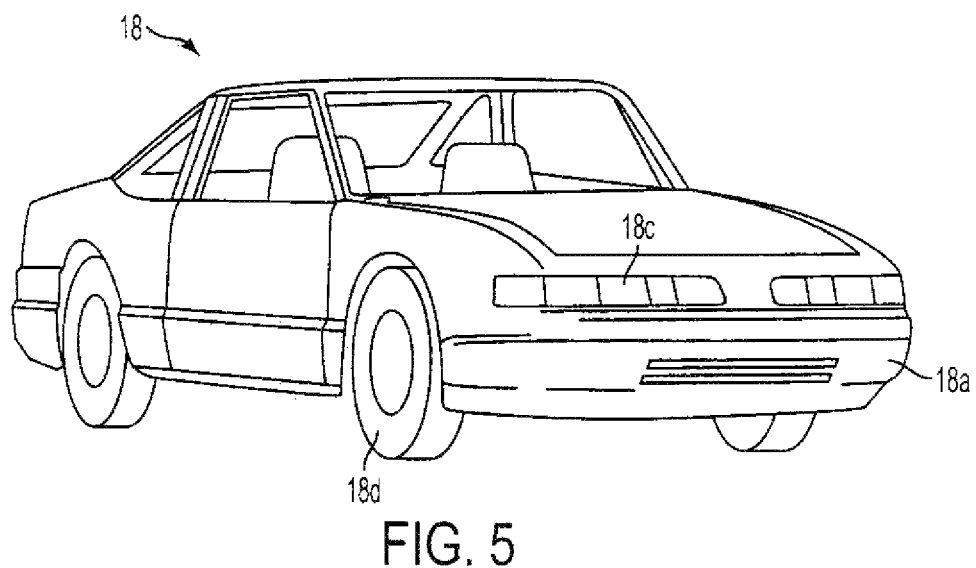
FIG. 5 is a perspective view of a vehicle as it may be viewed by a camera or image sensor of the lane change assist system of the present invention.

Additionally, control 16 may be operable to substantially eliminate or substantially ignore other forms or types of detected edges which are not likely or cannot be part of a vehicle in the adjacent lane. For example, as can be seen in FIG. 5, the tires and wheels 18d of an adjacent or approaching vehicle 18 are viewed as ellipses from a forward and sideward angle with respect to the adjacent vehicle. Because all vehicles on the road have tires, control 16 of lane change assist system 10 may be operable to process the signals from the pixels (such as the pixels directed toward the zone of interest) to detect the presence of one or more ellipses at or near the detected edges. If an ellipse or wheel is not detected, then the detected edges and associated object may be eliminated from processing by control 16, since it cannot be a vehicle in the adjacent lane. Detecting the presence of ellipses and wheels or portions thereof can thus assist in providing information regarding the existence of a vehicle and may assist in determining the position and/or velocity or relative position and/or relative velocity of the detected vehicle with respect to vehicle 12.

In order to further reduce the possibility of control 16 generating a false positive signal, control 16 of lane change assist system 10 may be operable to determine an intensity or brightness level associated with the detected edges and to substantially eliminate edges which do not significantly change in brightness level or intensity level from one side of the detected edge to the other. This is preferred, since lines in the road, thin branches on the road and/or many other small articles or objects may not resolve, and thus may result in single edges that do not significantly change in brightness or intensity (or color if a color system is used) across their detected edges. However, a significant change in brightness or intensity would be expected along a detected edge of an automotive body panel or bumper or other component or structure of a vehicle or the like. Accordingly, control 16 may substantially eliminate or substantially ignore edges or objects which do not have a significant brightness or intensity change thereacross, since an edge with an insignificant change in brightness or color signifies an insignificant edge which can be substantially eliminated. By substantially eliminating such insignificant edges, control 16 may further significantly reduce the computational requirements or processing requirements, while also significantly reducing the possibility of a false positive indication.

Control 16 may also be operable to compare image data from consecutive frames or images captured by camera 14 to confirm that a detected edge or object is representative of a vehicle in an adjacent lane and/or to determine the relative speed between the detected object or vehicle and the equipped or subject vehicle 12. By extracting collections of edges or points of interest, such as ellipses, bend maximums in edges and/or the like, from consecutive frames, and correlating such points of interest from one frame to the next, the lane change assist system of the present invention can more effectively verify the pairing of such characteristics or objects. The control may track or correlate the points of interest based on the placement or location of the edges within the captured images, the general direction of travel of the detected edges or groups of edges between consecutive frames, the dimensions, size and/or aspect ratio of the detected edges or objects and/or the like. Confirming such characteristics of edges and groups of edges and objects allows the lane change assist system to track the objects from one captured frame or image to the next. If the relative speed or movement of the detected edge or object is not indicative of the relative speed or movement of a vehicle in the adjacent lane, control 16 may filter out or substantially ignore such detected edges in further processing so as to reduce subsequent processing requirements and to avoid generation of a false positive signal. Lane change assist system 10 may also be operable to connect collections of such objects or edges based on relative motion between the subject vehicle and the detected object or edges. Such connected collections may provide information about the size and shape of the detected object for object classification and identification by control 16.

It is further envisioned that lane change assist system 10 may be operable in conjunction with a lane departure warning system or other forward facing imaging system 22 of vehicle 12, such as a lane departure warning system of the type discussed below or as disclosed in U.S. provisional application Ser. No. 60/377,524, filed May 3, 2002, which is hereby incorporated herein by reference, or any other lane departure warning system or the like, or a headlamp control system, such as disclosed in U.S. Pat. No. 5,796,094, which is hereby incorporated herein by reference, or any forwardly directed vehicle vision system, such as a vision system utilizing principles disclosed in U.S. Pat. Nos. 5,550,677; 5,670,935; 6,201,642 and 6,396,397, and/or in U.S. patent application Ser. No. 09/199,907, filed Nov. 25, 1998, now U.S. Pat. No. 6,717,610, which are hereby incorporated herein by reference. The forward facing imaging system may provide an input to lane change assist system 10 to further reduce any likelihood of a false positive signal from the lane change assist system.

For example, the forward facing imaging system may detect lane markers at the road surface to detect a curvature in the road that the subject vehicle is approaching and/or traveling along. Such information may be communicated to lane change assist system 10, so that control 16 may adapt or shape the reduced image data set or zone of interest as the subject vehicle 12 enters and proceeds along the detected road curvature, as discussed above. Also, the forward facing imaging system may detect headlamps of oncoming or approaching vehicles. If the lane forward and to the left of vehicle 12 has oncoming traffic, control 16 may substantially ignore the left side of the vehicle, since the lane change assist system would not be concerned with a lane change into oncoming traffic. Also, the forward facing imaging system may detect the tail lights or rear portion of a leading vehicle in another lane, and may track the leading vehicle relative to the subject vehicle. As the subject vehicle overtakes the leading vehicle, the lane change assist system may then be alerted as to the presence of the overtaken vehicle, such that edges detected in that lane a short period of time after the overtaken vehicle leaves the range of the forward facing imaging system (the period of time may be calculated based on the relative velocity between the subject vehicle and the overtaken vehicle) may be readily identified as the now overtaken and passed vehicle. By utilizing the vehicle information of a vehicle detected by a forward facing imaging system, the lane change assist system of the present invention (or other side object detection systems or the like) may reduce the amount of processing of the captured images or detected edges, since such a vehicle may be readily identified as the vehicle that was previously detected by the forward facing imaging system. This avoids a duplication of efforts by the forward facing imaging system and lane change assist system of the vehicle.

By primarily processing image data and detected edges in certain areas and/or processing image data and detected edges that meet certain thresholds or criteria, and substantially rejecting or substantially ignoring other information or image data or edges, such as detected edges that are substantially non-horizontal, or other edges that cannot be part of a vehicle, or image data that are not representative of a zone of interest of the exterior scene, the lane change assist system of the present invention substantially reduces the image data to be processed by control 16. It is envisioned that such a reduction in the amount of image data to be processed may allow the lane change assist system to have a control which comprises a micro-processor positioned at the camera. Accordingly, the lane change assist system may be provided as a module which may be positioned at either or both sides of the vehicle, and which may be connected to an appropriate power source or control or accessory of the vehicle.

Therefore, the present invention provides a lane change assist system which is operable to detect and identify vehicles or other objects of interest sidewardly and/or rearwardly of the subject vehicle. The lane change assist system of the present invention is operable to detect edges of objects, and particularly horizontal edges of objects, to provide improved recognition or identification of the detected objects and reduced false positive signals from the lane change assist system. The lane change assist system may primarily process information or image data from a reduced set or subset of image data which is representative of a target zone or area of interest within the exterior scene and may adjust the reduced data set or target zone in response to driving or road conditions or the like. The edge detection process or algorithm of the lane change assist system of the present invention provides for a low cost processing system or algorithm, which does not require the statistical methodologies and computationally expensive flow algorithms of the prior art systems. Also, the edge detection process may detect edges and objects even when there is little or no relative movement between the subject vehicle and the detected edge or object.

The lane change assist system of the present invention thus may be operable to substantially ignore or substantially eliminate or reduce the effect of edges or characteristics which are indicative of insignificant objects, thereby reducing the level of processing required on the captured images and reducing the possibility of false positive detections. The lane change assist system may also provide a low cost and fast approximation of a longitudinal and/or lateral and/or total distance between the subject vehicle and a detected edge or object at a side of the vehicle and may adjust a threshold detection level in response to the approximated distance. The lane change assist system of the present invention may be operable to substantially ignore certain detected edges or provide a positive identification signal depending on the characteristics of the detected object or edge or edges, the driving or road conditions, and/or the distance from the subject vehicle. The present invention thus may provide a faster processing of the captured images, which may be performed by a processor having lower processing capabilities then processors required for the prior art systems.

Although the present invention is described above as a lane change assist or aid system or side object detection system, it is envisioned that many aspects of the imaging system of the present invention are suitable for use in other vehicle vision or imaging systems, such as other side object detection systems, forward facing vision systems, such as lane departure warning systems, forward park aids, passive steering systems, adaptive cruise control systems or the like, rearward facing vision systems, such as back up aids or park aids or the like, panoramic vision systems and/or the like.

For example, an object detection system or imaging system of the present invention may comprise a forward facing lane departure warning system 110 (FIG. 1), which may include an image sensor or camera 114 and a control 116 positioned on or at vehicle 12. Lane departure warning system 110 is generally shown at the front of the vehicle 12 with camera 114 positioned and oriented to capture an image of the region generally forwardly of the vehicle. However, the camera may optionally be positioned elsewhere at the vehicle, such as within the vehicle cabin, such as at an interior rearview mirror assembly of the vehicle or at an accessory module or the like, and directed forwardly through the windshield of the vehicle, without affecting the scope of the present invention. Camera 114 is operable to capture an image of a scene occurring forwardly of the vehicle and control 116 is operable to process image data of the captured images or frames to detect and monitor or track lane markers or road edges or the like or oncoming or approaching vehicles or objects, and to provide a warning or alert signal to a driver of the vehicle in response to the detected images, such as in the manner disclosed in U.S. provisional application Ser. No. 60/377,524, filed May 3, 2002, which is hereby incorporated herein by reference.

Similar to camera 14 of lane change assist system 10, discussed above, camera 114 may be positioned at vehicle 12 and oriented generally downwardly toward the ground to increase the horizontal pixel count across the captured image at the important areas in front of vehicle 12, since any significant lane marking or road edge or the like, or other vehicle approaching or being approached by the subject vehicle, positioned in front of or toward a side of the subject vehicle will be substantially below the horizon and thus substantially within the captured image. The lane departure warning system of the present invention thus may provide an increased portion of the captured image or increased pixel count at important areas of the exterior scene, since the area well above the road or horizon is not as significant to the detection of lane markers and the like and/or other vehicles. Additionally, positioning the camera to be angled generally downwardly also reduces the adverse effects that the sun and/or headlamps of other vehicles may have on the captured images.

Control 116 of lane departure warning system 110 may include an edge detection algorithm or function, such as described above, which is operable to process or may be applied to the individual pixels to determine whether the image captured by the pixels defines an edge or edges of a lane marker or the like. The edge detection function or algorithm of control 116 allows lane departure warning system 110 to interrogate complex patterns in the captured image and separate out particular patterns or edges which may be indicative of a lane marker or the like, and to substantially ignore other edges or patterns which are not or cannot be indicative of a lane marker or the like and thus are insignificant to lane departure warning system 110. Other information in the captured image or frame, which is not associated with significant edges, may then be substantially ignored or filtered out by control 116 via various filtering mechanisms or processing limitations to reduce the information being processed by control 116.

Control 116 may be operable to determine which detected edges are angled or diagonal across and along the captured image and to partially filter out or substantially ignore or limit processing of vertical and/or horizontal edges. This may be preferred, since edges indicative of a lane marker may be angled within the captured image, as can be seen with reference to FIGS. 7 and 8. The control may thus process edges which are angled and which move diagonally through the scene from one frame to the next. Control 116 may be operable to skew or bias the rows of pixels in the pixelated array to simulate horizontal edges with the angled edges, such that control may detect and track such edges while substantially ignoring other edges. Control 116 may thus reject or substantially ignore edges which are not indicative of lane markers or the like (and which are not indicative of another vehicle forward of and approaching the subject vehicle), thereby reducing the data to be processed.

In order to further reduce the processing requirements and the possibility of a false detection or indication of a lane marker, and to enhance the response time and system performance, control 116 may primarily process signals or image data from pixels that are oriented or targeted or arranged or selected to capture images of objects or markers that are at least partially positioned within a predetermined or targeted area or zone of interest of the exterior scene. The zone of interest may be defined by an area or region forwardly and toward one or both sides of the subject vehicle where a lane marker or road side or edge may be positioned, which would be significant or important to lane departure warning system 110. By substantially isolating the reduced data set representative of the zone of interest, or substantially filtering out or substantially ignoring edges or signals or image data which are representative of areas outside of the zone or area of interest, the present invention may reduce the image data or information to be processed by control 116 and may substantially reduce the possibility that a false detection of a lane marker or the like will occur. Lane departure warning system 110 may also process edges or image data within a further reduced image data set representative of a targeted portion or hot zone of the zone of interest to further identify and confirm that the detected edge or edges are indicative of a lane marker or the like or a vehicle or object that is significant to the lane departure warning system, such as discussed above with respect to lane change assist system 10.

By detecting edges of objects (such as lane markers, road edges, vehicles and the like) within the zone or area of interest (and optionally adjusting the zone of interest for particular driving conditions or situations), and by focusing on or concentrating on or primarily processing the detected edges or image data which may be indicative of a lane marker or vehicle or significant object, while substantially filtering out or substantially ignoring other edges or information or image data, the present invention substantially reduces the possibility of falsely detecting lane markers or other significant vehicles or objects. Control 116 may be further operable to determine a distance between a detected object and the subject vehicle to further filter out or substantially eliminate objects that are not within a predetermined range or threshold distance from the subject vehicle and which, thus, may be insignificant to the lane departure warning system of the present invention, such as described above with respect to lane change assist system 10.

Control 116 may also be operable to determine or estimate the distance to the detected edge or object in response to the location of the pixel or pixels on the pixelated array which capture the detected edge or object, such as in the manner also discussed above. The distance may thus be determined by determining the pixel location and accessing a table or data list or array to determine the distance associated with the particular pixel.

Control 116 of lane departure warning system 110 may also be operable to determine an intensity or brightness level associated with the detected edges and to substantially eliminate edges which do not significantly change in brightness level or intensity level from one side of the detected edge to the other. This is preferred, since thin branches on the road and/or many other small articles or objects may not resolve, and thus may result in single edges that do not significantly change in brightness or intensity (or color if a color system is used) across their detected edges. However, a sharp or significant change in brightness or intensity would be expected at a detected edge of a lane marker (since a lane marker is typically a white or yellow line segment along a dark or black or gray road surface) or an automotive body panel or bumper or other component or structure of a vehicle or the like. Accordingly, control 16 may substantially eliminate or substantially ignore edges or objects which do not have a significant brightness or intensity change thereacross. By substantially eliminating such insignificant edges, control 16 may further significantly reduce the computational requirements or processing requirements, while also significantly reducing the possibility of a false detection of a lane marker or vehicle. It is further envisioned that lane departure warning system 110 may be capable of detecting lane markings and road edges and other vehicles and modifying the alert signal or process in response to the type of marking, surrounding vehicles or the like and/or the vehicle movement, such as disclosed in U.S. provisional application Ser. No. 60/377,524, filed May 3, 2002, which is hereby incorporated herein by reference.

Figure 12:
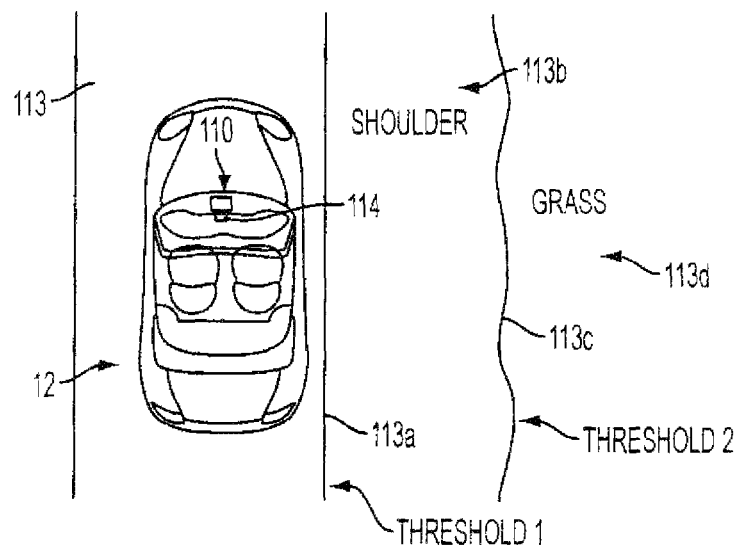
FIG. 12 is a top plan view of a vehicle driving along a road and incorporating a lane departure warning system of the present invention.
Figure 13:
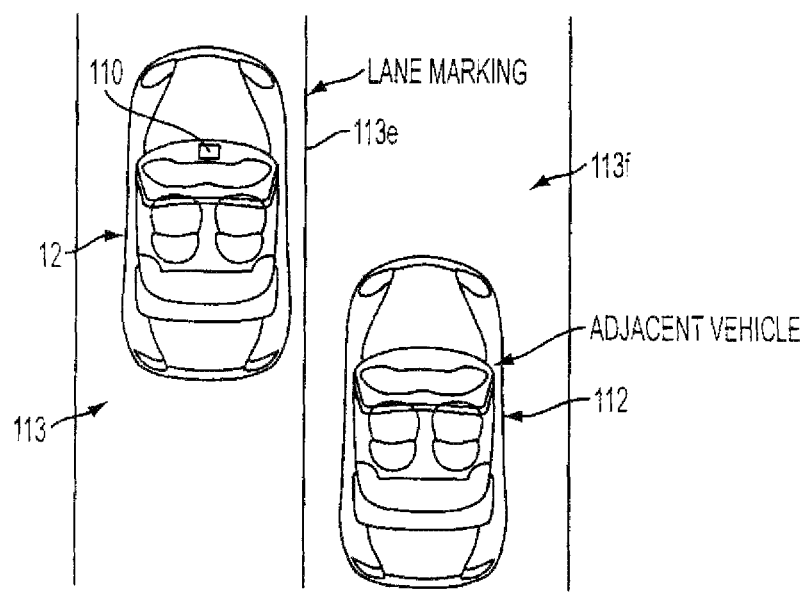
FIG. 13 is another top plan view of the vehicle driving along a road, with another vehicle in an adjacent lane.

With reference to FIGS. 12 and 13, lane departure warning system 110 may provide a warning signal to a driver of vehicle 12 when the vehicle is about to depart from its lane or road 113. The lane departure warning system 110 is operable in response to imaging sensor or camera 114 positioned at a forward portion of the vehicle 12 (and may be positioned at a vehicle bumper area or at a windshield area, such as at an interior rearview mirror or attachment thereto, without affecting the scope of the present invention) and having a field of view directed generally forwardly with respect to the direction of travel of vehicle 12. The imaging sensor 114 is operable to capture an image of a scene generally forwardly (and preferably at least partially sidewardly) of the vehicle. The lane departure warning system includes image processing controls or devices which may process the images captured to detect and identify various objects within the image.

The imaging sensor useful with the present invention is preferably an imaging array sensor, such as a CMOS sensor or a CCD sensor or the like, such as disclosed in commonly assigned U.S. Pat. Nos. 5,550,677; 5,670,935; 5,796,094 and 6,097,023, and U.S. patent application Ser. No. 09/441,341, filed Nov. 16, 1999, now U.S. Pat. No. 7,339,149, which are hereby incorporated herein by reference. The imaging sensor may be implemented and operated in connection with other vehicular systems as well, or may be operable utilizing the principles of such other vehicular systems, such as a vehicle headlamp control system, such as the type disclosed in U.S. Pat. No. 5,796,094, which is hereby incorporated herein by reference, a rain sensor, such as the types disclosed in commonly assigned U.S. Pat. Nos. 6,353,392; 6,313,454 and/or 6,320,176, which are hereby incorporated herein by reference, a vehicle vision system, such as a forwardly directed vehicle vision system utilizing the principles disclosed in U.S. Pat. Nos. 5,550,677; 5,670,935 and 6,201,642, and/or in U.S. patent application Ser. No. 09/199,907, filed Nov. 25, 1998, now U.S. Pat. No. 6,717,610, which are hereby incorporated herein by reference, a traffic sign recognition system, a system for determining a distance to a leading vehicle or object, such as using the principles disclosed in U.S. patent application Ser. No. 09/372,915, filed Aug. 12, 1999, now U.S. Pat. No. 6,396,397, which is hereby incorporated herein by reference, and/or the like.

The lane departure warning system of the present invention is operable to provide a warning signal to a driver of the vehicle under at least one of at least the following three conditions:

1) the vehicle is moving toward the edge of the road at a rapid speed indicating that the vehicle will actually depart from the pavement or shoulder;

2) the vehicle is moving into a lane with oncoming traffic present in that lane; and/or 3) the vehicle is moving into a lane with traffic flowing in the same direction and there is an adjacent vehicle in that lane (regardless of turn signal use).

The lane departure warning system may be operable in response to one or more of the detected conditions and may be further operable in response to various vehicle characteristics or parameters, such as vehicle speed, a distance to the lane marker, shoulder, other vehicle, or any other relevant distance, road conditions, driving conditions, and/or the like.

With respect to the first condition (shown in FIG. 12), the lane departure warning system may be operable in response to a single forward facing imaging sensor or camera, to establish and track the road edge as defined by two thresholds:

1) threshold 1: the edge 113a of the road or pavement 113 (the intersection of the pavement 113 and the shoulder 113b); and/or 2) threshold 2: the edge 113c of the shoulder 113b (the intersection of the shoulder 113b and the grass 113d).

The lane departure warning system of the present invention may then be operable to provide an audible warning, such as a rumble strip sound, when the vehicle is approaching threshold 1 and the vehicle is moving above an established speed. The lane departure warning system may then be operable to provide a more urgent audible warning, such as an alarm, when the vehicle is approaching threshold 2 and is moving above the established speed. If the road does not have a shoulder, such as on some rural roads, there is only one threshold and this may correspond to a threshold 2 warning. The lane departure warning system may be operable to provide the warning signal or signals in response to the vehicle being a particular distance from the detected lane or road or shoulder. The distances to the threshold markings at which the lane departure warning system initiates the warning signal or signals may vary depending on the speed of the vehicle, or other conditions surrounding the vehicle, such as road conditions, driving conditions, or the like.

With respect to the second condition, the lane departure warning system may be operable in response to a single forward facing camera to monitor the lane markings 113e along the road surface and monitor the potential presence of oncoming traffic in an adjacent lane or lanes. Once the presence of oncoming traffic has been established, the lane departure warning system may issue an urgent audible warning if the vehicle begins to cross the lane marking 113e. Furthermore, if the vehicle has already begun to cross into the oncoming traffic lane before oncoming traffic is detected, the lane departure warning system may issue the urgent warning when oncoming traffic is detected.

Similar to the first condition, the lane departure warning system may be operable in response to the second condition to initiate the warning signal in response to different distances between the subject vehicle and the approaching vehicle, depending on the speed of one or both vehicles, the driving conditions, the road conditions and/or the like.

With respect to the third condition (shown in FIG. 13), the lane departure warning system of the present invention may be operable in response to a single forward facing camera and at least one, and optionally two, rearward and/or sideward facing cameras, to monitor the lane markings and the potential presence of adjacent traffic or vehicle or vehicles 112 in an adjacent lane 113f, which may be traveling in the same direction as the subject vehicle 12. Once the presence of adjacent traffic has been established, the lane departure warning system may issue an urgent audible warning to the driver of the vehicle if the subject vehicle begins to cross the lane marking 113e. Furthermore, if the subject vehicle has already begun to cross into the adjacent lane and then subsequently an adjacent vehicle is detected, the lane departure warning system may issue the urgent warning signal to the driver of the vehicle.

Again, the lane departure warning system may be operable to initiate the warning signal or signals in response to varying threshold parameters, which may vary depending on the speed of the subject vehicle, the speed of the other detected vehicle, the relative speed of the vehicles, the driving conditions, the road conditions and/or the like. The lane departure warning system of the present invention may be operable to differentiate between the different types of lane markings along roads, such as between solid and dashed lines and double lines.

Optionally, the lane departure warning system may be further operable to detect and recognize stop lights and/or stop signs and/or other road or street signs or markings, and to provide a warning signal to the driver of the vehicle in response to such detection. It is further envisioned that the lane departure warning system of the present invention may be operable to provide an alarm or broadcast an alarm or warning signal on a safety warning band when the forward facing camera detects a stop light or stop sign and the system determines that the vehicle is not going to stop based on the vehicle's current speed and deceleration. This provides a signal or alarm to crossing drivers to warn them of an unsafe condition.

Optionally, the lane departure warning system of the present invention may be operable to determine the road conditions of the road on which the vehicle is traveling and/or the driving conditions surrounding the vehicle. The system may then provide the warning signal or signals in response to variable threshold values, such as different vehicle speeds or distances or the like. For example, wet or snowy roads would change the distance and/or speed thresholds at which the lane departure warning system would provide the warning signal or signals. Also, because darkened or raining conditions may affect visibility of lane markers, road edges and other vehicles, the lane departure warning system of the present invention may be operable to provide a warning signal sooner or at a greater distance from the marker, edge or vehicle in such low visibility conditions. This provides the driver of the subject vehicle a greater amount of time to respond to the warning in such conditions.

The lane departure warning system of the present invention may be integrated with a side object detection system (SOD). For example, the vehicle may be equipped with a camera or image-based side object detection system or a Doppler radar-based side object detection system or other such systems (such as mounted on the side rearview mirrors or at the side of the vehicle) for detecting objects and/or vehicles at one or both sides of the subject vehicle. The lane departure warning threshold level or sensitivity at which the lane departure warning system generates a warning signal may then be adjustable in response to detection of a vehicle or object at a side of the subject vehicle and determination of the location and speed of the detected vehicle. Optionally, the signal generated may increase or decrease in intensity or volume in response to the position or speed of an object or vehicle detected by the side object detection system. For example, the threshold level may take into account the approach speed of the other vehicle to the subject vehicle, and may provide a louder or brighter warning to the driver of the subject vehicle if the approach speed is above a particular threshold level or threshold levels.

The lane departure warning system may be provided with a multi-feature or multi-function forward facing imaging system. The imaging system may combine two or more functions, such as an intelligent headlamp controller (such as the type disclosed in U.S. Pat. Nos. 5,796,094 and 6,097,023, and U.S. patent application Ser. No. 09/441,341, filed Nov. 16, 1999, now U.S. Pat. No. 7,339,149, which are hereby incorporated herein by reference), an image-based smart wiper controller, a rain sensor (such as the types disclosed in commonly assigned U.S. Pat. Nos. 6,353,392; 6,313,454 and/or 6,320,176, which are hereby incorporated herein by reference), an image-based climate control blower controller, an image-based or image-derived or partially derived adaptive cruise-control system (where the imaging may be primary or secondary to a forward facing Doppler radar), and/or other vision systems (such as a forwardly directed vehicle vision system utilizing the principles disclosed in U.S. Pat. Nos. 5,550,677; 5,670,935 and 6,201, 642, and/or in U.S. patent application Ser. No. 09/199,907, filed Nov. 25, 1998, now U.S. Pat. No. 6,717,610, which are all hereby incorporated herein by reference), a traffic sign recognition system, a system for determining a distance to a leading vehicle or object (such as using the principles disclosed in U.S. patent application Ser. No. 09/372,915, filed Aug. 12, 1999, now U.S. Pat. No. 6,396,397, which is hereby incorporated herein by reference), and/or the like.

For example, an embodiment of the lane departure warning system of the present invention may be incorporated with or integrated with an intelligent headlamp control system (such as described in U.S. Pat. Nos. 5,796,094 and 6,097,023, and U.S. patent application Ser. No. 09/441,341, filed Nov. 16, 1999, now U.S. Pat. No. 7,339,149, which are hereby incorporated herein by reference) having an imaging array sensor feeding a signal or image to a microcontroller (which may comprise a microprocessor or microcomputer), which is operable to adjust a state of the headlamps in response to a captured image of the scene forwardly of the vehicle. The image captured by the imaging sensor may be analyzed for light sources of interest for the headlamp control, and also for lane markings, road edges, and other objects of interest (such as road signs, stop signs, stop lights and/or the like) for the lane departure warning system. Optionally, the lane departure warning system may be integrated with or tied to an existing headlamp control of the vehicle.

The lane departure warning system of the present invention thus may be implemented as part of one or more other imaging-based systems, and thus may share components, hardware and/or software with the other systems to reduce the incremental costs associated with the lane departure warning system and with the other systems as well. Accordingly, multiple systems may be provided by an automotive supplier as part of a common platform or module for each vehicle of a particular vehicle line or model. The vehicle manufacturer may then choose to activate or enable one or more of the systems of the module, depending on which options are selected on a particular vehicle. Therefore, the addition or selection of the lane departure warning system, or of one or more other imaging-based systems, is associated with an incremental addition of hardware and/or software, and thus of associated costs, in order to install and enable the system on a particular vehicle. The imaging array sensor or sensors of the module may then be interrogated by an appropriate processor or software to extract the light sources or objects of interest or pixels of interest for each respective system of the common or unitary module. For example, an image captured by the imaging array sensor or camera may be processed or analyzed one way for a headlamp control system, and then processed or analyzed another way for the lane departure warning system or for any other enabled functions or systems of the common module. The software may further include common blocks or functions or macros to further enhance the sharing of software between the systems.

Accordingly, a unitary module may be provided to a vehicle assembly plant and may include multiple features, systems or functions, such that the desired features, systems or functions may be enabled for a particular vehicle, with minimal additional software or components or hardware being associated with the features, systems or functions that are enabled. The anchor system of the common or unitary module or platform may be an intelligent headlamp controller, with the additional systems, such as the lane departure warning system of the present invention, being added to or integrated with the anchor system.

The lane departure warning system and any other associated imaging-based systems may be included as part of an interior rearview mirror assembly or as part of an electronic windshield module and/or accessory module assembly, such as disclosed in commonly assigned U.S. Pat. Nos. 6,243,003; 6,278,377 and 6,433,676; U.S. application Ser. No. 10/054,633, filed Jan. 22, 2002, now U.S. Pat. No. 7,195,381; and Ser. No. 09/792,002, filed Feb. 26, 2001, now U.S. Pat. No. 6,690,268; Ser. No. 09/585,379, filed Jun. 1, 2000; Ser. No. 09/466,010, filed Dec. 17, 1999, now U.S. Pat. No. 6,420,975; and Ser. No. 10/355,454, filed Jan. 31, 2003, now U.S. Pat. No. 6,824,281, which are all hereby incorporated herein by reference.

Therefore, the lane departure warning system of the present invention provides a warning signal or signals to a driver of a vehicle based on the detection of various objects, vehicles and conditions surrounding the vehicle. The lane departure warning system of the present invention is thus less likely to provide a warning signal to a driver of the vehicle when the driver intends to maneuver the vehicle in that manner, and thus where such a warning signal is not needed or wanted. The lane departure warning system of the present invention thus avoids annoying, unnecessary warnings, and thus provides improved responses by the driver of the vehicle, since the driver is less likely to ignore the signal provided by the lane departure warning system. The lane departure warning system of the present invention may be implemented with or integrated with one or more other imaging-based systems to reduce the incremental components, hardware, software and costs associated with the implementation of the lane departure warning system.

Optionally, the object detection system or imaging system of the present invention may be operable in conjunction with a passive steering system 210 (FIG. 1), which is operable to adjust or bias the steering direction of the vehicle toward a center region of a lane in response to detection of the lane markers or road edges or the like by the imaging system. Passive steering system 210 may be in communication with or connected to a steering system of the vehicle and may adjust or bias the steering direction of the vehicle slightly if the lane departure warning system detects a slow drifting of the vehicle out of its lane and may be further operable in response to a detected road curvature ahead of the vehicle. The passive steering system 210 may steer the vehicle back into its lane or keep the vehicle in its lane when such a drifting condition is detected. The passive steering system may function to bias the steering of the vehicle toward the center of the occupied lane, but may be easily overcome by manual steering of the vehicle by the driver, such that the driver at all times maintains ultimate control over the steering of the vehicle. The passive steering system thus may function as a lane detent which maintains the vehicle in its lane, but may be easily overcome or disabled if the steering wheel is manually turned or if a turn signal is activated or the like.

The passive steering assist system of the present invention thus may reduce driver fatigue from driving a vehicle under conditions which require constant driver steering input or adjustment, such as in windy conditions and the like. The passive steering assist system thus may reduce lane drift from side to side within a lane. Also, overall safety may be improved by the reduction in undesired lane maneuvers. Although described as being responsive to the imaging system of the present invention, the passive steering system of the present invention may be responsive to other types of lane departure warning systems or other types of vision or imaging systems, without affecting the scope of the present invention.

Optionally, the object detection system or imaging system of the present invention may be operable in connection with an adaptive speed control system 310 (FIG. 1), which may adjust the cruise control setting or speed of the vehicle in response to road or traffic conditions detected by the imaging system. For example, adaptive speed control system 310 may reduce the set speed of the vehicle in response to the imaging system (or other forward facing vision system) detecting a curve in the road ahead of the vehicle. The vehicle speed may be reduced to an appropriate speed for traveling around the curve without the driver having to manually deactivate the cruise control. The adaptive speed control may then resume the initial speed setting after the vehicle is through the turn or curve and is again traveling along a generally straight section of road. Adaptive speed control 310 may also reduce the speed of the vehicle or even deactivate the cruise control setting in response to a detection by the lane departure warning system or other vision system of taillights or headlamps of another vehicle detected in front of the subject vehicle and within a threshold distance of the subject vehicle or approaching the subject vehicle at a speed greater than a threshold approach speed, or in response to detection of other objects or conditions which may indicate that the speed of the vehicle should be reduced.

Additionally, because the imaging system, such as a forward facing lane departure warning system, may track the lane curvature, the system may also be able to determine if a vehicle which appears in front of the subject vehicle is actually in the same lane as the subject vehicle or if it is in an adjacent lane which is curving with the section of road. The imaging system and adaptive speed control system may then establish if the vehicle speed should be reduced in response to the road curvature and the presence of another vehicle at the curve. Although described as being responsive to the imaging system or lane departure warning system of the present invention, the adaptive speed control system of the present invention may be responsive to other types of lane departure warning systems or other types of vision or imaging systems, particularly other types of forward facing imaging systems, without affecting the scope of the present invention.

It is further envisioned that the imaging system, which may comprise an object detection system, a lane change assist system, a side object detection system, a lane departure warning system or other forward facing vision system, a rear vision system or park aid or panoramic view system, a passive steering system, an adaptive cruise control system or the like, may be in communication with a security monitoring system. The vision or image data from the imaging system may be transmitted to a remote device, such as the vehicle owner's computer monitor or other personal display system remote from the vehicle, so that the owner of the vehicle or other person may view the status of the area surrounding the vehicle when the owner or other person is not in the vehicle. Also, the vision or image data may be provided to or made available to the local police authorities or the like in the event of a theft of the vehicle or of an accident involving the vehicle or of the vehicle being otherwise inoperable (such as when the motorist is stranded). The police or emergency services or the like may use the vision or image data to determine the vehicle location and possibly the condition of the vehicle and/or the driver and/or the passengers. It is further envisioned that the vision or image data may be used in conjunction with the global positioning system (GPS) of the vehicle to precisely locate or pinpoint the vehicle location. The vision or image data may be transmitted to the remote device or to the emergency services or the like via various transmission devices or systems, such as utilizing Bluetooth technology or the like, without affecting the scope of the present invention.

Therefore, the present invention provides a vision or imaging system or object detection system which is operable to detect and process edges within a captured image or images to determine if the edges are indicative of a significant vehicle or object or the like at or near or approaching the subject vehicle. The imaging system may primarily process a reduced image data set representative of a zone of interest of the exterior scene and may process edges that are detected which are representative of an object within the zone of interest of the captured image. The imaging system may adjust the reduced data set or zone of interest in response to various conditions or characteristics or criteria. The imaging system may comprise an object detection system or a lane change assist system operable to detect objects or other vehicles at one or both sides of the subject vehicle. The object detection system may determine the distance to the detected object or edge and may adjust threshold criterion in response to the determined or estimated or calculated distance.

Optionally, the imaging system may comprise a forward facing lane departure warning system which may be operable to detect lane markers or the like and/or vehicles in front of the subject vehicle and to provide an alert signal to the driver of the vehicle that the vehicle is leaving its lane. The lane departure warning system may primarily process edges detected within a zone of interest within the captured image. The lane departure warning system may determine a distance to the detected edge or object and may vary or adjust threshold criterion in response to the determined or estimated or calculated distance.

The forward facing imaging system may be in communication with the lane change assist system of the vehicle and/or may be in communication with other systems of the vehicle, such as a side object detection system, a passive steering system or an adaptive speed control system or the like. The imaging system may communicate to the lane change assist system that the vehicle is approaching a curve in the road or that another vehicle is being approached and passed by the subject vehicle to assist in processing the image data captured by the sensor or camera of the lane change assist system. Optionally, a passive steering system may adjust a steering direction of the vehicle in response to the imaging system, or an adaptive speed control system may adjust a cruise control setting of the vehicle in response to the imaging system. Optionally, an output of the imaging system may be provided to or communicated to a remote receiving and display system to provide image data for viewing at a location remote from the subject vehicle.

Changes and modifications in the specifically described embodiments may be carried our without departing from the principles of the present invention, which is intended to limited only by the scope of the appended claims, as interpreted according to the principles of patent law.

The embodiments of the invention in which an exclusive property or privilege is claimed are defined as follows:

1. A vehicular control system, said vehicular control system comprising:

a plurality of cameras disposed at a vehicle equipped with said vehicular control system, wherein said plurality of cameras comprises at least three cameras;

said plurality of cameras at least comprising (i) a forward-viewing camera mounted at a front portion of the equipped vehicle and having a field of view at least forward of the equipped vehicle, said forward-viewing camera operable to capture image data, (ii) a driver side-viewing camera mounted at a driver-side portion of the equipped vehicle and having a field of view at least sideward and rearward of the equipped vehicle at the driver side of the equipped vehicle, said driver side-viewing camera operable to capture image data, and (iii) a passenger side-viewing camera mounted at a passenger-side portion of the equipped vehicle and having a field of view at least sideward and rearward of the equipped vehicle at the passenger side of the equipped vehicle, said passenger side-viewing camera operable to capture image data;

at least one radar sensor having a field of sensing exterior of the equipped vehicle and operable to sense radar data;

a control comprising a processor;

wherein image data captured by at least said forward-viewing camera, said driver side-viewing camera and said passenger side-viewing camera is provided to said control;

wherein radar data sensed by said at least one radar sensor is provided to said control;

wherein said control, responsive to processing of image data captured at least by said forward-viewing camera, detects at least one of (a) lane markers within the exterior field of view of at least said forward-viewing camera on a road being traveled by the equipped vehicle and (b) road edges within the exterior field of view of at least said forward-viewing camera on a road being traveled by the equipped vehicle;

wherein said control, based at least in part on detection of at least one of (a) lane markers via processing of captured image data and (b) road edges via processing of captured image data, determines curvature of the road being traveled by the equipped vehicle;

wherein said control processes captured image data provided thereto via an edge detection algorithm to detect vehicles present exteriorly of the equipped vehicle and within the exterior field of view of at least one of said forward-viewing camera, said driver side-viewing camera and said passenger side-viewing camera;

wherein said control processes sensed radar data provided thereto to detect vehicles present exteriorly of the equipped vehicle and within the exterior field of sensing of said at least one radar sensor;

wherein said control, based on processing of at least one of (i) captured image data and (ii) sensed radar data, detects another vehicle that is present exterior of the equipped vehicle and determines distance from the equipped vehicle to the detected other vehicle that is present exterior of the equipped vehicle; and wherein said control, based at least in part on said detection of another vehicle and said determination of distance from the equipped vehicle to the detected other vehicle, determines whether it is safe for the equipped vehicle to execute a lane change maneuver.

2. The vehicular control system of claim 1, wherein said vehicular control system is operable to wirelessly communicate data to a remote receiving device that is remote from the equipped vehicle.

3. The vehicular control system of claim 2, wherein said vehicular control system wirelessly communicates data to indicate at least one of (i) a location of the equipped vehicle and (ii) a condition of the equipped vehicle.

4. The vehicular control system of claim 3, wherein data is wirelessly communicated to said remote receiving device in response to an input from a transmitter associated with said remote receiving device.

5. The vehicular control system of claim 3, wherein data is wirelessly communicated to said remote receiving device via a limited-range wireless communication.

6. The vehicular control system of claim 5, wherein said limited-range wireless communication comprise a Bluetooth limited-range wireless communication.

7. The vehicular control system of claim 3, wherein data wirelessly communicated to said remote receiving device comprises data derived from image data captured by at least one of said forward-viewing camera, said driver side-viewing camera and said passenger side-viewing camera.

8. The vehicular control system of claim 7, wherein data wirelessly communicated to said remote receiving device comprises data relevant to the geographic location of the equipped vehicle.

9. The vehicular control system of claim 8, wherein said data relevant to the geographic location of the equipped vehicle is derived, at least in part, from a global positioning system (GPS) that pinpoints the location of the equipped vehicle.

10. The vehicular control system of claim 1, wherein said control is operable to determine whether detected edges constitute a portion of a vehicle and is operable to track at least one detected edge over multiple frames of captured image data.

11. The vehicular control system of claim 1, wherein said control controls a passive steering system of the equipped vehicle, and wherein said passive steering system of the equipped vehicle comprises a steering system operable to adjust a steering direction of the equipped vehicle.

12. The vehicular control system of claim 11, wherein, responsive at least in part to processing at said control of image data captured by at least one of said forward-viewing camera, said driver side-viewing camera and said passenger side-viewing camera, said control controls said steering system to adjust the steering direction of the equipped vehicle.

13. The vehicular control system of claim 12, wherein, responsive to a determination of the equipped vehicle inadvertently drifting out of its occupied lane, said control maintains the equipped vehicle in its occupied lane.

14. The vehicular control system of claim 13, wherein said control processes image data captured by said forward-viewing camera to estimate distance from the equipped vehicle to a detected leading vehicle that is present exteriorly of the equipped vehicle and within the exterior field of view of said forward-viewing camera, and wherein, when the detected leading vehicle is determined to be within a threshold distance from the equipped vehicle, speed of the equipped vehicle is reduced.

15. The vehicular control system of claim 14, wherein said forward-viewing camera is primary to said at least one radar sensor.

16. The vehicular control system of claim 11, wherein said steering system is manually controllable irrespective of said control.

17. The vehicular control system of claim 1, wherein, responsive at least in part to processing of captured image data at said control, speed of the equipped vehicle is adjusted in accordance with a road condition detected by said vehicular control system.

18. The vehicular control system of claim 1, wherein, responsive at least in part to processing of captured image data at said control, speed of the equipped vehicle is adjusted in accordance with a traffic condition detected by said vehicular control system.

19. The vehicular control system of claim 1, wherein said forward-viewing camera is attached at a windshield of the equipped vehicle, and wherein said forward-viewing camera, when attached at the windshield, views through the windshield exteriorly of the equipped vehicle.

20. The vehicular control system of claim 19, wherein image data captured by said forward-viewing camera is processed at said control one way for a headlamp control system of the equipped vehicle and is processed at said control another way for a lane keeping system of the equipped vehicle.

21. The vehicular control system of claim 19, wherein said control, responsive to processing of image data captured by said forward-viewing camera, detects headlights of oncoming vehicles within the exterior field of view of said forward-viewing camera when the equipped vehicle is operated under nighttime conditions.

22. The vehicular control system of claim 1, wherein said driver side-viewing camera is mounted at a driver-side exterior mirror assembly of the equipped vehicle, and wherein said passenger side-viewing camera is mounted at a passenger-side exterior mirror assembly of the equipped vehicle.

23. The vehicular control system of claim 22, wherein said control receives image data captured by a rear-viewing camera mounted at a rear portion of the equipped vehicle and having a field of view at least rearward of the equipped vehicle.

24. The vehicular control system of claim 23, wherein image data captured by one or more of said driver side-viewing camera at the driver-side exterior mirror assembly of the equipped vehicle and said passenger side-viewing camera at the passenger-side exterior mirror assembly of the equipped vehicle and said rear-viewing camera at the rear portion of the equipped vehicle is provided to a panoramic vision system of the equipped vehicle.

25. The vehicular control system of claim 1, wherein said control, responsive at least in part to processing of captured image data at said control, controls an adaptive cruise control system of the equipped vehicle.

26. The vehicular control system of claim 1, wherein said control processes image data captured by said forward-viewing camera for stop light recognition.

27. The vehicular control system of claim 1, wherein said control processes image data captured by said forward-viewing camera for traffic sign recognition.

28. The vehicular control system of claim 1, wherein, responsive at least in part to processing at said control of captured image data detecting a curve in the road ahead of the equipped vehicle, speed of the equipped vehicle is reduced to an appropriate speed for traveling around the detected curve, and wherein speed of the equipped vehicle increases after travelling around the detected curve to a speed appropriate for travelling along a generally straight section of road that comes after the curve.

29. The vehicular control system of claim 1, wherein, when the detected other vehicle that is present exterior of the equipped vehicle is determined by said control, based at least in part on processing of captured image data at said control, to be within a threshold distance from the equipped vehicle, speed of the equipped vehicle is reduced.

30. The vehicular control system of claim 1, wherein said control processes captured image data and sensed radar data for an adaptive cruise control system of the equipped vehicle, and wherein, during operation of said adaptive cruise control system, captured image data is primary to sensed radar data.

31. The vehicular control system of claim 1, wherein said control processes captured image data and sensed radar data for an adaptive cruise control system of the equipped vehicle, and wherein, during operation of said adaptive cruise control system, captured image data is secondary to sensed radar data.

32. The vehicular control system of claim 1, wherein said control, responsive to processing of image data captured by said forward-viewing camera, detects taillights of leading vehicles within the exterior field of view of said forward-viewing camera when the equipped vehicle is operated under nighttime conditions.

33. The vehicular control system of claim 1, wherein said control, responsive to a determination, based at least in part on processing of captured image data at said control, that the equipped vehicle is unintentionally drifting out of a traffic lane that the equipped vehicle is currently travelling in, controls a steering system of the equipped vehicle to adjust steering of the equipped vehicle to mitigate such drift out of the traffic lane the equipped vehicle is travelling in.

34. The vehicular control system of claim 33, wherein said steering system is manually controllable by a driver of the equipped vehicle irrespective of control by said control.

35. The vehicular control system of claim 1, wherein said at least one radar sensor having a field of sensing exterior of the equipped vehicle comprises a driver side-sensing radar sensor mounted at a driver-side portion of the equipped vehicle, said driver side-sensing radar sensor having a field of sensing at least sideward and rearward of the equipped vehicle, and wherein said at least one radar sensor having a field of sensing exterior of the equipped vehicle comprises a passenger side-sensing radar sensor mounted at a passenger-side portion of the equipped vehicle, said passenger side-sensing radar sensor having a field of sensing at least sideward and rearward of the equipped vehicle.

36. The vehicular control system of claim 35, wherein said at least one radar sensor having a field of sensing exterior of the equipped vehicle comprises a forward-sensing radar sensor mounted at a front portion of the equipped vehicle, said forward-sensing radar sensor having a field of sensing at least forward of the equipped vehicle.

37. The vehicular control system of claim 36, wherein said control, based on processing of at least image data captured by said forward-viewing camera, detects another vehicle that is present exterior of and ahead of the equipped vehicle and determines distance from the equipped vehicle to the detected other vehicle that is present exterior and ahead of the equipped vehicle.

38. The vehicular control system of claim 37, wherein said control, based on processing of at least radar sensor data sensed by said forward-sensing radar sensor, detects the other vehicle that is present exterior of and ahead of the equipped vehicle and determines distance from the equipped vehicle to the detected other vehicle that is present exterior of the equipped vehicle.

39. The vehicular control system of claim 1, wherein said control, responsive to processing of image data captured at least by said forward-viewing camera, detects road edges within the exterior field of view of at least said forward-viewing camera on a road being traveled by the equipped vehicle.

40. The vehicular control system of claim 1, wherein said at least one radar sensor comprises a Doppler radar sensor.

41. A vehicular control system, said vehicular control system comprising:
a plurality of cameras disposed at a vehicle equipped with said vehicular control system, wherein said plurality of cameras comprises at least three cameras;
said plurality of cameras at least comprising (i) a forward-viewing camera mounted at a front portion of the equipped vehicle and having a field of view at least forward of the equipped vehicle, said forward-viewing camera operable to capture image data, (ii) a driver side-viewing camera mounted at a driver-side portion of the equipped vehicle and having a field of view at least sideward and rearward of the equipped vehicle at the driver side of the equipped vehicle, said driver side-viewing camera operable to capture image data, and (iii) a passenger side-viewing camera mounted at a passenger-side portion of the equipped vehicle and having a field of view at least sideward and rearward of the equipped vehicle at the passenger side of the equipped vehicle, said passenger side-viewing camera operable to capture image data;

wherein said forward-viewing camera is attached at a windshield of the equipped vehicle, and wherein said forward-viewing camera, when attached at the windshield, views through the windshield exteriorly of the equipped vehicle;

a plurality of radar sensors, each having a field of sensing exterior of the equipped vehicle and operable to sense radar data, wherein said plurality of radar sensors comprises at least three radar sensors;

wherein said plurality of radar sensors comprises a driver side-sensing radar sensor mounted at a driver-side portion of the equipped vehicle, said driver side-sensing radar sensor having a field of sensing at least sideward and rearward of the equipped vehicle;

wherein said plurality of radar sensors comprises a passenger side-sensing radar sensor mounted at a passenger-side portion of the equipped vehicle, said passenger side-sensing radar sensor having a field of sensing at least sideward and rearward of the equipped vehicle;

wherein said plurality of radar sensors comprises a forward-sensing radar sensor mounted at a front portion of the equipped vehicle, said forward-sensing radar sensor having a field of sensing at least forward of the equipped vehicle;

a control comprising a processor;

wherein image data captured by at least said forward-viewing camera, said driver side-viewing camera and said passenger side-viewing camera is provided to said control;

wherein radar data sensed by said plurality of radar sensors is provided to said control;

wherein said control, responsive to processing of image data captured at least by said forward-viewing camera, detects at least one of (a) lane markers within the exterior field of view of at least said forward-viewing camera on a road being traveled by the equipped vehicle and (b) road edges within the exterior field of view of at least said forward-viewing camera on a road being traveled by the equipped vehicle;

wherein said control, based at least in part on detection of at least one of (a) lane markers via processing of captured image data and (b) road edges via processing of captured image data, determines curvature of the road being traveled by the equipped vehicle;

wherein said control processes captured image data provided thereto via an edge detection algorithm to detect vehicles present exteriorly of the equipped vehicle and within the exterior field of view of at least one of said forward-viewing camera, said driver side-viewing camera and said passenger side-viewing camera;

wherein said control processes sensed radar data provided thereto to detect vehicles present exteriorly of the equipped vehicle and within the exterior field of sensing of said plurality of radar sensors;

wherein said control, based on processing of at least one of (i) captured image data and (ii) sensed radar data, detects another vehicle that is present exterior of the equipped vehicle;

wherein said vehicular control system is operable to wirelessly communicate data to a remote receiving device that is remote from the equipped vehicle; and wherein said vehicular control system wirelessly communicates data to indicate at least one of (i) a location of the equipped vehicle and (ii) a condition of the equipped vehicle.

42. The vehicular control system of claim 41, wherein data wirelessly communicated to said remote receiving device comprises data relevant to the geographic location of the equipped vehicle.

43. The vehicular control system of claim 42, wherein data wirelessly communicated to said remote receiving device comprises data derived from image data captured by at least one of said forward-viewing camera, said driver side-viewing camera and said passenger side-viewing camera.

44. The vehicular control system of claim 43, wherein said data relevant to the geographic location of the equipped vehicle is derived, at least in part, from a global positioning system (GPS) that pinpoints the location of the equipped vehicle.

45. The vehicular control system of claim 41, wherein data is wirelessly communicated to said remote receiving device in response to an input from a transmitter associated with said remote receiving device.

46. The vehicular control system of claim 41, wherein data is wirelessly communicated to said remote receiving device via a limited-range wireless communication.

47. A vehicular control system, said vehicular control system comprising:

a plurality of cameras disposed at a vehicle equipped with said vehicular control system, wherein said plurality of cameras comprises at least three cameras;

said plurality of cameras at least comprising (i) a forward-viewing camera mounted at a front portion of the equipped vehicle and having a field of view at least forward of the equipped vehicle, said forward-viewing camera operable to capture image data, (ii) a driver side-viewing camera mounted at a driver-side portion of the equipped vehicle and having a field of view at least sideward and rearward of the equipped vehicle at the driver side of the equipped vehicle, said driver side-viewing camera operable to capture image data, and (iii) a passenger side-viewing camera mounted at a passenger-side portion of the equipped vehicle and having a field of view at least sideward and rearward of the equipped vehicle at the passenger side of the equipped vehicle, said passenger side-viewing camera operable to capture image data;

wherein said forward-viewing camera is attached at a windshield of the equipped vehicle, and wherein said forward-viewing camera, when attached at the windshield, views through the windshield exteriorly of the equipped vehicle;

a plurality of radar sensors, each having a field of sensing exterior of the equipped vehicle and operable to sense radar data;

wherein said plurality of radar sensors comprises a driver side-sensing radar sensor mounted at a driver-side portion of the equipped vehicle, said driver side-sensing radar sensor having a field of sensing at least sideward and rearward of the equipped vehicle;

wherein said plurality of radar sensors comprises a passenger side-sensing radar sensor mounted at a passenger-side portion of the equipped vehicle, said passenger side-sensing radar sensor having a field of sensing at least sideward and rearward of the equipped vehicle;

wherein said plurality of radar sensors comprises a forward-sensing radar sensor mounted at a front portion of the equipped vehicle, said forward-sensing radar sensor having a field of sensing at least forward of the equipped vehicle;

a control comprising a processor;

wherein image data captured by at least said forward-viewing camera, said driver side-viewing camera and said passenger side-viewing camera is provided to said control;

wherein radar data sensed by said plurality of radar sensors is provided to said control;

wherein said control, responsive to processing of image data captured at least by said forward-viewing camera, detects at least one of (a) lane markers within the exterior field of view of at least said forward-viewing camera on a road being traveled by the equipped vehicle and (b) road edges within the exterior field of view of at least said forward-viewing camera on a road being traveled by the equipped vehicle;

wherein said control, based at least in part on detection of at least one of (a) lane markers via processing of captured image data and (b) road edges via processing of captured image data, determines curvature of the road being traveled by the equipped vehicle;

wherein said control processes captured image data provided thereto via an edge detection algorithm to detect vehicles present exteriorly of the equipped vehicle and within the exterior field of view of at least one of said forward-viewing camera, said driver side-viewing camera and said passenger side-viewing camera;

wherein said control processes sensed radar data provided thereto to detect vehicles present exteriorly of the equipped vehicle and within the exterior field of sensing of said plurality of radar sensors;

wherein said control, based on processing of at least one of (i) captured image data and (ii) sensed radar data, detects another vehicle that is present exterior of the equipped vehicle;

wherein said control controls a passive steering system of the equipped vehicle, and wherein said passive steering system of the equipped vehicle comprises a steering system operable to adjust a steering direction of the equipped vehicle; and wherein, responsive at least in part to processing at said control of image data captured by at least one of said forward-viewing camera, said driver side-viewing camera and said passenger side-viewing camera, said control controls said steering system to adjust the steering direction of the equipped vehicle.

48. The vehicular control system of claim 47, wherein said control receives image data captured by a rear-viewing camera mounted at a rear portion of the equipped vehicle and having a field of view at least rearward of the equipped vehicle.

49. The vehicular control system of claim 48, wherein, responsive to a determination of the equipped vehicle inadvertently drifting out of its occupied lane, said control maintains the equipped vehicle in its occupied lane.

50. The vehicular control system of claim 47, wherein said control, responsive at least in part to processing of captured image data at said control, controls an adaptive cruise control system of the equipped vehicle.

51. The vehicular control system of claim 50, wherein said control processes image data captured by said forward-viewing camera for stop light recognition.

52. The vehicular control system of claim 50, wherein said control processes image data captured by said forward-viewing camera for traffic sign recognition.

53. The vehicular control system of claim 47, wherein, responsive at least in part to processing of captured image data at said control, speed of the equipped vehicle is adjusted in accordance with a road condition detected by said vehicular control system.

54. The vehicular control system of claim 47, wherein, responsive at least in part to processing of captured image data at said control, speed of the equipped vehicle is adjusted in accordance with a traffic condition detected by said vehicular control system.

* * * * *

UNITED STATES PATENT AND TRADEMARK OFFICE
CERTIFICATE OF CORRECTION

| | | |
|---|---|---|
| PATENT NO. | : 9,834,216 B2 | Page 1 of 1 |
| APPLICATION NO. | : 15/413462 | |
| DATED | : December 5, 2017 | |
| INVENTOR(S) | : John A. Pawlicki et al. | |

It is certified that error appears in the above-identified patent and that said Letters Patent is hereby corrected as shown below:

In the Specification

Column 12
Line 51, "$\gamma$)," should be --$\gamma'$),--

Column 15
Line 63, "angle w" should be --angle $\omega$--

Signed and Sealed this
Twenty-third Day of October, 2018

Andrei Iancu
*Director of the United States Patent and Trademark Office*